(12) United States Patent
Yamahara et al.

(10) Patent No.: US 7,811,467 B2
(45) Date of Patent: Oct. 12, 2010

(54) OPTICAL FILM

(75) Inventors: Motohiro Yamahara, Nara (JP); Hikaru Hasegawa, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 314 days.

(21) Appl. No.: 11/666,890

(22) PCT Filed: Nov. 9, 2005

(86) PCT No.: PCT/JP2005/020990
§ 371 (c)(1),
(2), (4) Date: May 2, 2007

(87) PCT Pub. No.: WO2006/052001
PCT Pub. Date: May 18, 2006

(65) Prior Publication Data
US 2007/0298191 A1 Dec. 27, 2007

(30) Foreign Application Priority Data
Nov. 11, 2004 (JP) .............................. 2004-327521
May 24, 2005 (JP) .............................. 2005-150673

(51) Int. Cl.
*C09K 19/00* (2006.01)
*C09K 19/06* (2006.01)
*C09K 19/52* (2006.01)
*G02F 1/03* (2006.01)

(52) U.S. Cl. .............................. 252/299.01; 252/299.6; 252/299.61; 252/299.62; 252/299.66; 252/299.67; 430/20; 428/1.1; 428/1.2; 428/1.3

(58) Field of Classification Search ............ 252/299.01, 252/299.6–299.62, 299.66–67; 428/1.1–1.3; 430/20
See application file for complete search history.

(56) References Cited

FOREIGN PATENT DOCUMENTS

| EP | 1 197 768 A1 | 4/2002 |
|---|---|---|
| EP | 1 471 112 A1 | 10/2004 |
| JP | 2000-053628 A | 2/2000 |
| JP | 2001-172339 A | 6/2001 |
| JP | 2001-259015 A | 9/2001 |
| JP | 2001-270914 A | 10/2001 |
| JP | 2002-14234 A | 1/2002 |
| JP | 2002-182188 A | 6/2002 |
| JP | 2003-313250 A | 11/2003 |
| JP | 2005-325331 A | 11/2005 |
| WO | WO-2003/064535 A1 | 8/2003 |

OTHER PUBLICATIONS

Partial Machine Translation of abstract and relevant portion of JP2000-53628A published on Feb. 22, 2000.
Partial Machine Translation of abstract and relevant portion of JP2001-172339A published on Jun. 26, 2001.
Partial Machine Translation of abstract and relevant portion of JP2001-259015A published on Sep. 25, 2001.
Partial Machine Translation of abstract and relevant portion JP2001-270914A published on Oct. 2, 2001.
Partial Machine Translation of abstract and relevant portion JP2002-182188A published on Jun. 26, 2002.
Partial Machine Translation of abstract and relevant portion JP2003-313250A published on Nov. 6, 2003.

*Primary Examiner*—Geraldina Visconti
(74) *Attorney, Agent, or Firm*—Birch, Stewart, Kolasch & Birch, LLP

(57) ABSTRACT

A composition comprising a polymerizable compound of the formula (1) and a rod-shaped polymerizable liquid crystal compound:

$$P2\text{-}E2\text{-}X2\text{-}B2\text{-}A2\text{-}(G2)t\text{-}Y\text{-}(G1)s\text{-}A1\text{-}B1\text{-}X1\text{-}E1\text{-}P1 \quad (1)$$

(in the formula (1), Y represents a di-valent group, s and t represent each independently an integer of 0 or 1, G1 and G2 when s and t are 1 represent each independently $-CR^1R^2-$, $R^1$ and $R^2$ represent each independently an alkyl group having 1 to 4 carbon atoms, halogen atom or hydrogen atom, A1 and A2 represent each independently a di-valent cyclic hydrocarbon group, di-valent heterocyclic group, methylenephenylene group, oxyphenylene group or thiophenylene group, B1 and B2 represent each independently a di-valent group, X1 and X2 represent each independently a di-valent group, E1 and E2 represent each independently an alkylene group having 2 to 25 carbon atoms, and P1 and P2 represent a hydrogen atom or polymerizable group, at least one of P1 and P2 being a polymerizable group.).

30 Claims, 4 Drawing Sheets

OPTICAL FILM

TECHNICAL FIELD

The present invention relates to an optical film.

BACKGROUND ART

Flat panel displays (FPD) such as liquid crystal displays (LCD) and organic electroluminescences (EL) and the like showing space saving and low powder consumption as compared with CRT, are widely spread as image planes of computers, televisions, portable telephones, car navigations or portable information ends. In FPD, various optical films are used for reflection reduction, wide viewing angle and the like. As such optical films, there are mentioned, for example, reflection reducing films such as antireflection (AR) films and the like which lower the surface reflection coefficient by an optical interference effect by making a multilayer structure composed of optical thin membranes of different refractive indices; polarizing films allowing permeation only of lights of specific vibration directions and blocking other lights; retardation films optically compensating colors of interference colors of LCD of STN mode, TN mode and the like; elliptic polarizing films obtained by integrating polarizing films and retardation films; wide-viewing-angle films which enlarge the visual field angle of LCD; and the like.

As the retardation film giving an optical compensation effect, a λ/4 plate is known. As one of optical properties of a retardation film, a wavelength dispersion property of retardation is known. Specifically, the wavelength dispersion property of a usual retardation film manifests a property of [Re(450)/Re(550)]>1>[Re(650)/Re(550)] (wherein, Re(λ) represents a retardation on a retardation film measured at a measuring light wavelength of λ nm). That is, the wavelength dispersion property of a usual retardation film is positive wavelength dispersion.

As the retardation film showing reverse wavelength dispersion, namely, a wavelength dispersion property of [Re(450)/Re(550)]<1<[Re(650)/Re(550)], a film of a mixture of two kinds of polymer A and polymer B is suggested using a polymer A and a polymer B of which difference between Re(450)/Re(550) when the polymer A is a retardation film and Re(450)/Re(550) when the polymer B is a retardation film is 0.05 or more, and specifically, films obtained by drawing the mixture are disclosed (Japanese Patent Application Laid-Open (JP-A) No. 2002-14234, [Claim 1], [0103], [0111], Examples 2 to 7). However, for changing the wavelength dispersion property, it is necessary not only to change the mixing ratio of the polymer A and the polymer B but also to change also the ratio of monomers used in a copolymer of the polymer A or the polymer B, and it is difficult to simply control the wavelength dispersion property, and additionally, a drawing process is also necessary for making a film. In general, polymers reveal poor mutual compatibility, thus, when they are mixed, there occurs problems of phase separation and increase in haze when optically observed.

Recently, with increase in the size of FPD, it has been clarified that when the whole display image plane is observed from wide angles, a display image is colored (called coloring phenomenon) and white and black are inverted (called inversion phenomenon), and when visual angle is inclined toward reverse visual angle direction which is an upper direction of a display image plane, there occurs a problem of decrease in contract. Optical films intending such wider visual field angle and higher display quality require improvement in visual field angle dependency and further improvement in the coloring phenomenon, in addition to the optical compensation effect and reflection reducing function. Further, since the wavelength dispersion property to be required varies depending on a difference in requirements in optical design of users and a difference in LCD mode, an optical film giving an arbitrary wavelength dispersion property is required.

DISCLOSURE OF THE INVENTION

The present invention has an object of providing an optical film which gives a desired retardation in a wider region even with a single optical film and additionally of which wavelength dispersion property can be arbitrarily controlled, a material suitable for this optical film, and a method for producing an optical film from this material.

That is, the present invention provides the following [1] to [30]:

[1] A composition containing a polymerizable compound of the formula (1) and a rod-shaped polymerizable liquid crystal compound:

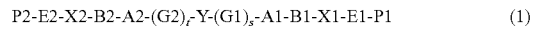

P2-E2-X2-B2-A2-(G2)$_t$-Y-(G1)$_s$-A1-B1-X1-E1-P1     (1)

(in the formula (1), Y represents a di-valent group, s and t represent each independently an integer of 0 or 1, G1 and G2 when s and t are 1 represent each independently —CR$^1$R$^2$—, R$^1$ and R$^2$ represent each independently an alkyl group having 1 to 4 carbon atoms, halogen atom or hydrogen atom, A1 and A2 represent each independently a di-valent cyclic hydrocarbon group, di-valent heterocyclic group, methylenephenylene group, oxyphenylene group or thiophenylene group, and to A1 and A2, an alkyl group having 1 to 5 carbon atoms, alkoxy group having 1 to 5 carbon atoms or halogen atom may be bonded, and B1 and B2 represent each independently a di-valent group selected from the group consisting of —CRR'—, —C≡C—, —CH═CH—, —CH$_2$—CH$_2$—, —O—, —S—, —C(═O), —C(═O)—O—, —O—C(═O)—, —O—C(═O)—O—, —C(═S)—, —C(═S)—O—, —O—C(═S)—, —O—C(═S)—O—, —CH═N—, —N═CH—, —N═N—, —N(→O)═N—, —N═N(→O)—, —C(═O)—NR—, —NR—C(═O)—, —OCH$_2$—, —NR—, —CH$_2$O—, —SCH$_2$—, —CH$_2$S—, —CH═CH—C(═O)—O—, —O—C(═O)—CH═CH—, and single bond, R and R' represent each independently a hydrogen atom or alkyl group having 1 to 4 carbon atoms, X1 and X2 represent each independently a di-valent group of the formula (2):

$$-\!\!+\!\!A3\!\!-\!\!B3\!\!+\!\!_n\!\!-$$     (2)

[in the formula (2), A3 represents a di-valent cyclic hydrocarbon group or heterocyclic group, B3 represents the same meaning as for the above-described B1 and B2, and n represents an integer of 1 to 4.]

E1 and E2 represent each independently an alkylene group having 2 to 25 carbon atoms, and to E1 and E2, an alkyl group having 1 to 5 carbon atoms, alkoxy group having 1 to 5 carbon atoms or halogen atom may further be bonded, and P1 and P2 represent a hydrogen atom or polymerizable group, at least one of P1 and P2 being a polymerizable group.).

[2] The composition according to [1], wherein Y is a di-valent group of the formula (7):

(7)

(wherein, C1 represents a quaternary carbon atom or quaternary silicon atom, D1 and D2 represent each independently a cyclic hydrocarbon group, heterocyclic group or hydrocarbon group having 1 to 5 carbon atoms, D1 and D2 may be connected via a hydrocarbon group having 1 to 5 carbon atoms, amino group, ether group, thioether group, aminoalkyl group, carbonyl group or single bond, and to groups constituting D1 and D2, a hydroxyl group, amino group, thiol group, cyclic hydrocarbon group, linear or branched alkyl group having 1 to 5 carbon atoms, linear or branched alkoxy group having 1 to 5 carbon atoms, trifluoromethyl group, trifluoromethyloxy group, nitrile group, nitro group or halogen atom may be bonded.).

[3] The composition according to [1] or [2] containing a polymerizable compound (1) wherein, in the formula (1), s and t represent 0, and B1 and B2 represent —CRR'—, —O—, —S— or —NR— (wherein, R and R' represent the same meanings as described above).

[4] The composition according to [1] or [2] containing a polymerizable compound (1) wherein, in the formula (1), (G1)s and (G2)t represent a methylene group, and B1 and B2 represent a single bond, —C≡C—, —O—C(=O)—O—, —O—C(=O)— or —O—C(=O)—O—.

[5] The composition according to any of [1] to [4] wherein Y in the formula (1) represents a di-valent group selected from the group consisting of the formulae (D-1) to (D-18):

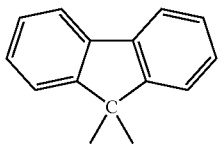

(D-1)

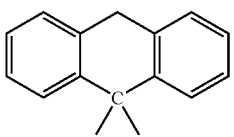

(D-2)

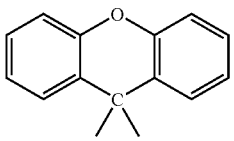

(D-3)

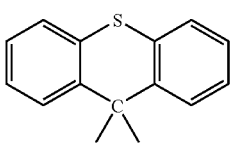

(D-4)

-continued

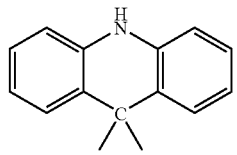

(D-5)

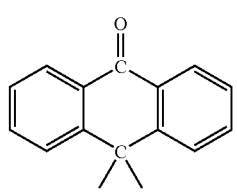

(D-6)

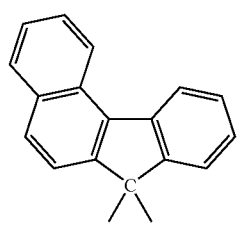

(D-7)

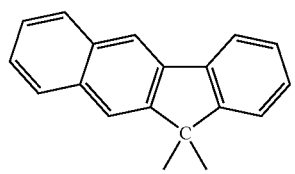

(D-8)

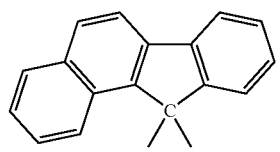

(D-9)

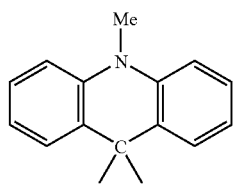

(D-10)

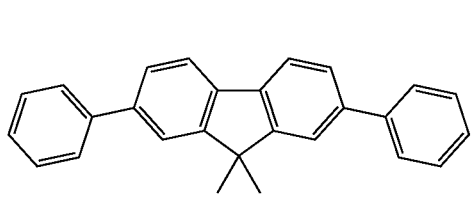
(D-11)
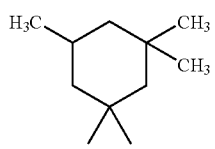
(D-16)
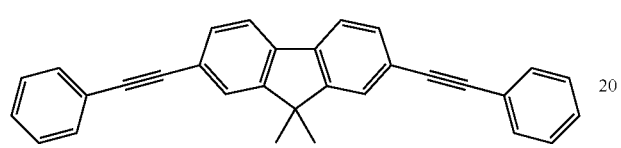
(D-12)
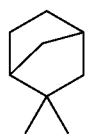
(D-17)
(D-18)
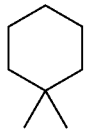
(D-15)
[6] The composition according to any of [1] to [5] wherein the polymerizable group in the formula (1) is an acryloyl group or methacryloyl group.
[7] The composition according to any of [1] to [6] wherein the polymerizable compound (1) is at least one compound selected from the group consisting of the following formulae:
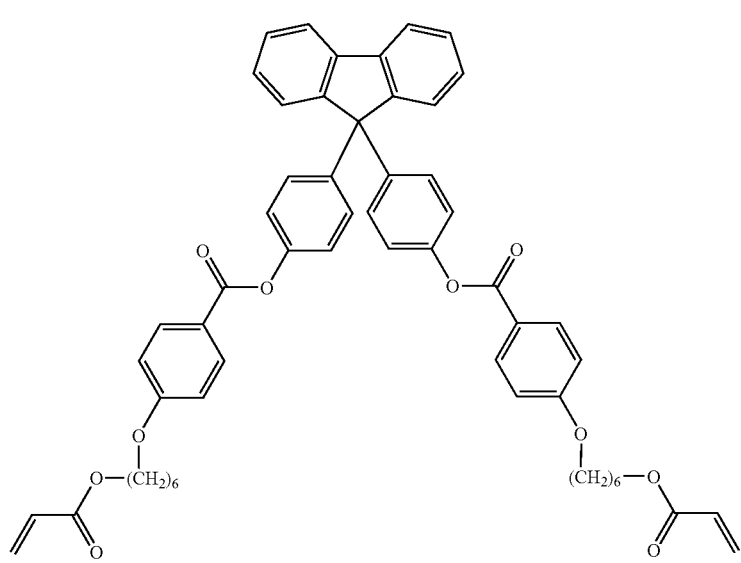
(1-1)

-continued
(1-2)
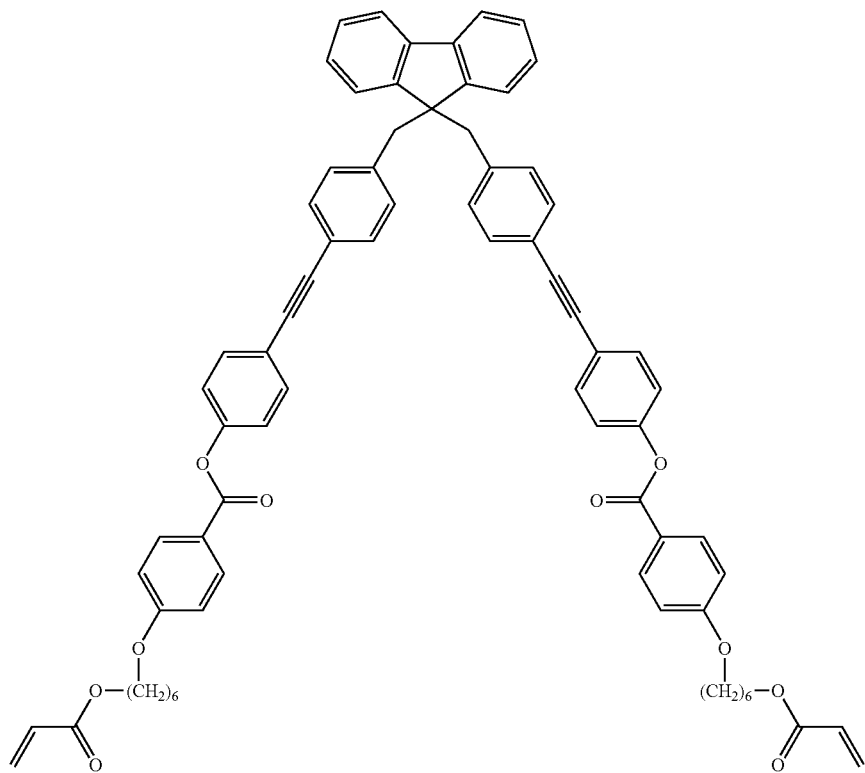
(1-3)
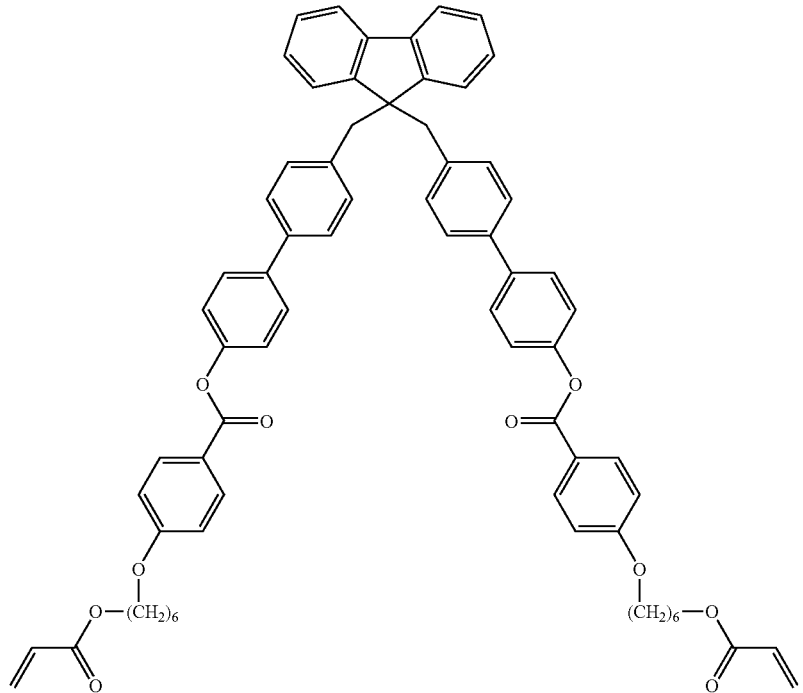

-continued
(1-5)
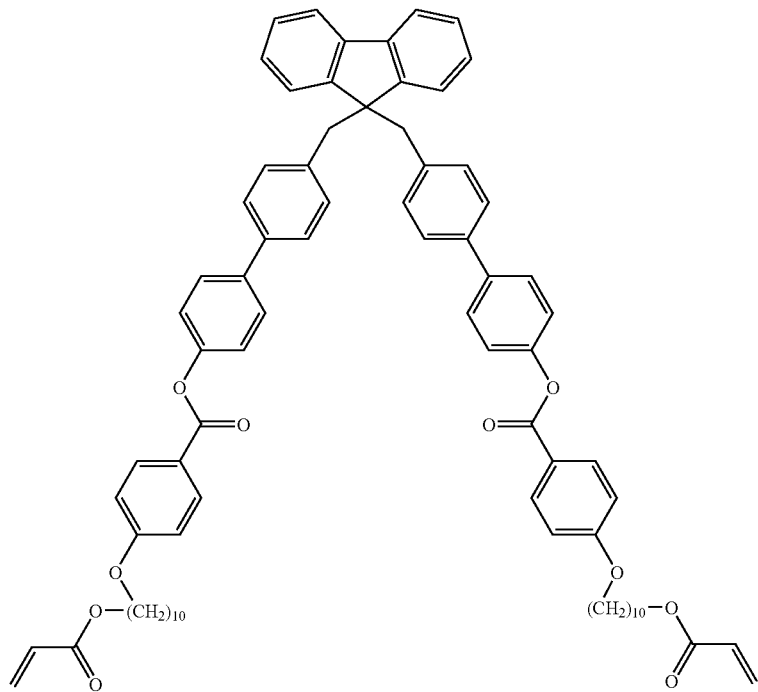
(1-4)
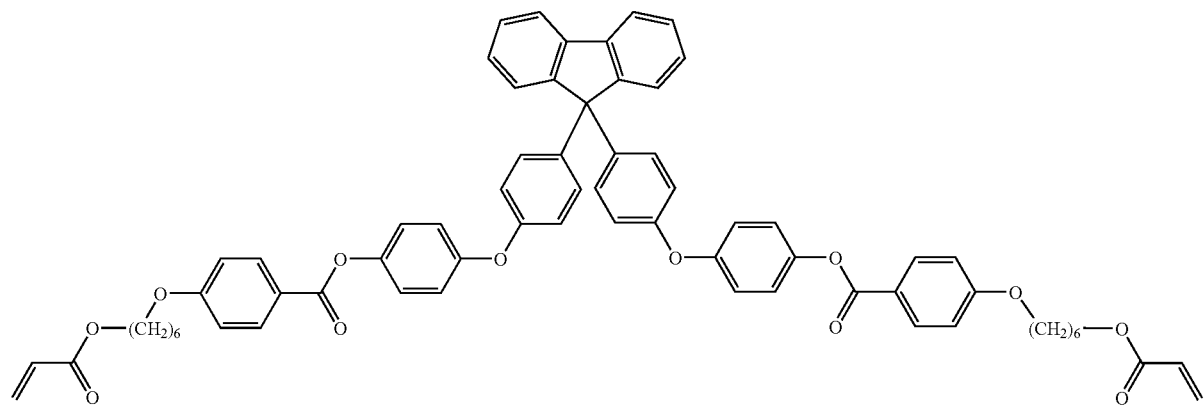
(1-45)
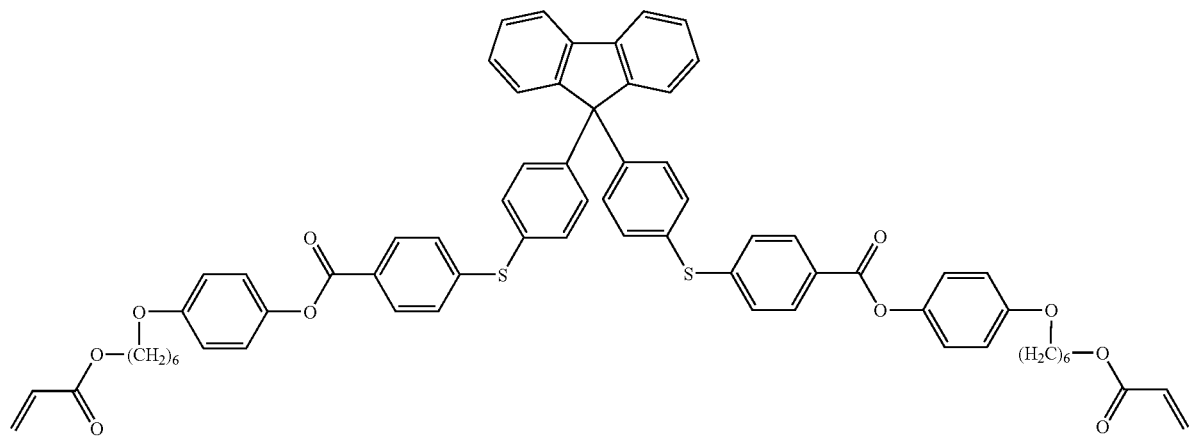

-continued

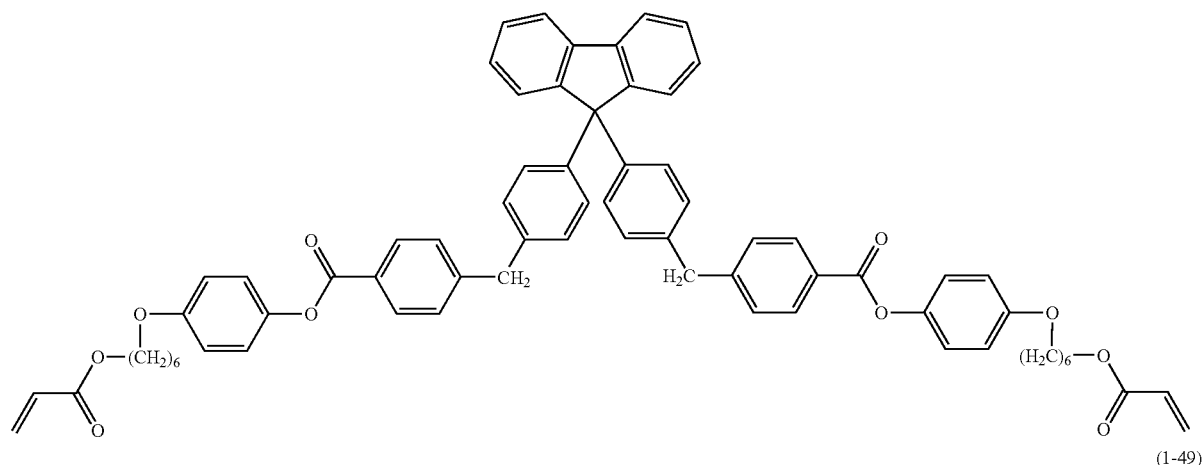
(1-50)

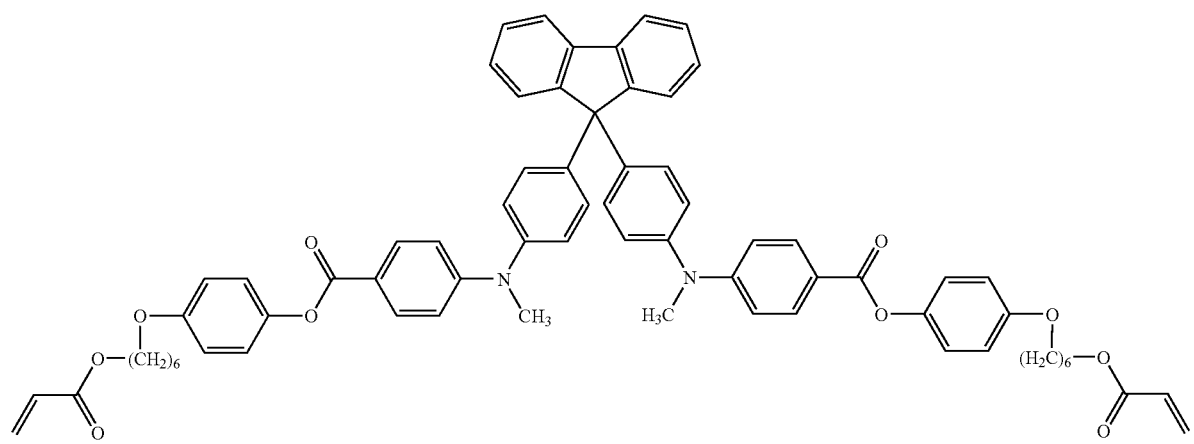
(1-49)

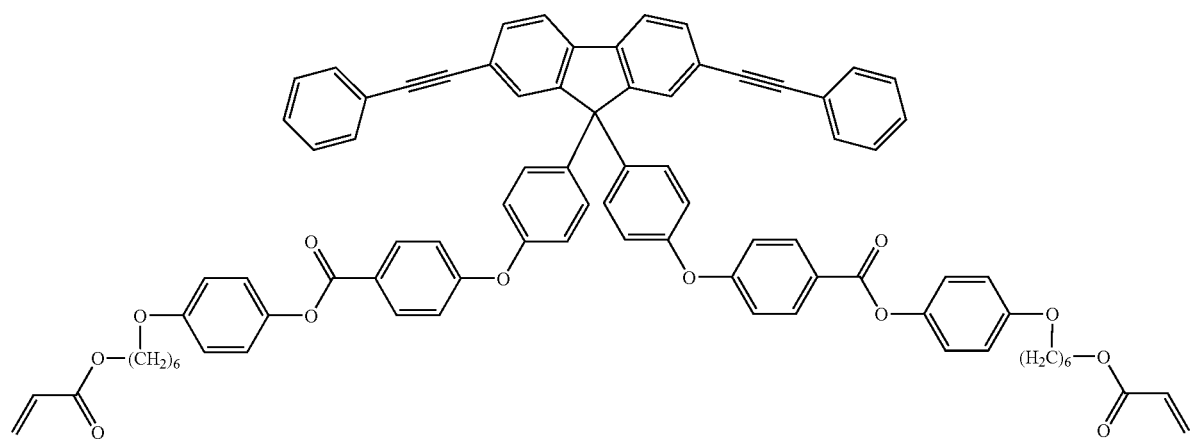
(1-11)

[8] The composition according to any of [1] to [7] wherein the rod-shaped polymerizable liquid crystal compound is a compound of the formula (3), (4) or (5):

P1-E1-B1-A1-B2-A2-B4-A4-B5-E2-P2   (3)

P1-E1-B1-A1-B2-A2-F1   (4)

P1-E1-B1-A1-B2-A2-B3-F1   (5)

(wherein, E1, E2, B1, B2, B3, P1, P2, A1 and A2 represent the same meanings as described above, B4 and B5 represent the same meanings as for the above-described B1, and A4 represents the same meaning as for the above-described A1. F1 represents a linear or branched alkyl group having 1 to 5 carbon atoms, nitrile group, nitro group, trifluoromethyl group, halogen atom or hydrogen atom.).

[9] The composition according to any of [1] to [8] wherein the rod-shaped polymerizable liquid crystal compound is a compound of the formula (3-1) to (3-6), (4-1), (4-2), (5-1) or (5-2):

[12] An optical film obtained by using a polymer containing a structural unit derived from the polymerizable compound of the formula (1) and a structural unit derived from the rod-shaped polymerizable liquid crystal compound.

(3-1)
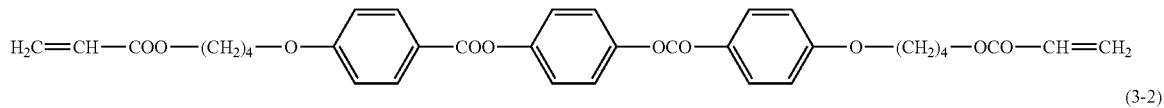

(3-2)
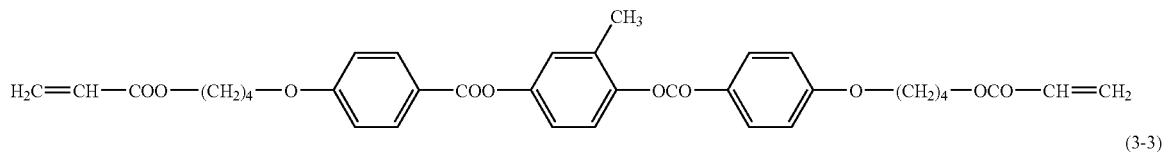

(3-3)
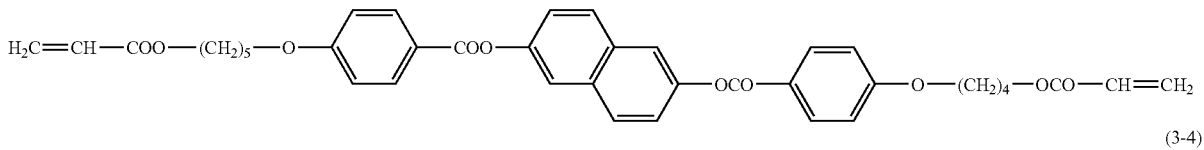

(3-4)
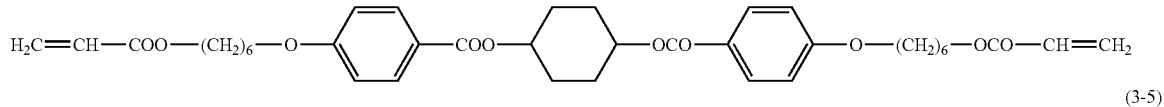

(3-5)
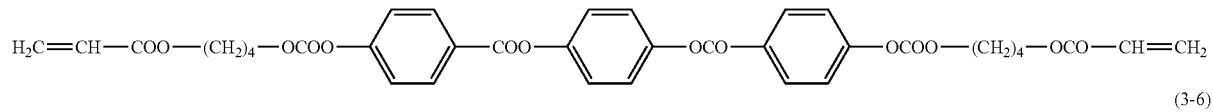

(3-6)
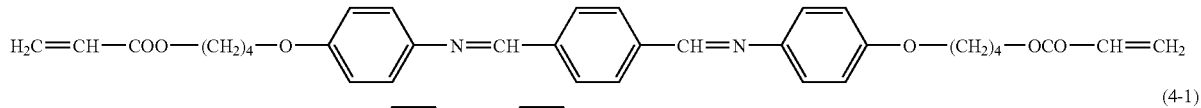

(4-1)
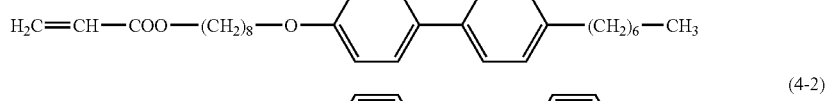

(4-2)
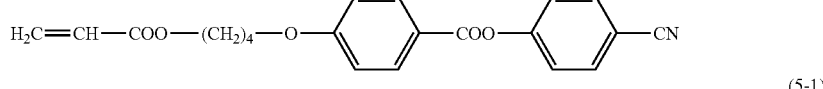

(5-1)
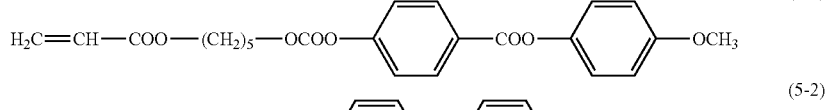

(5-2)
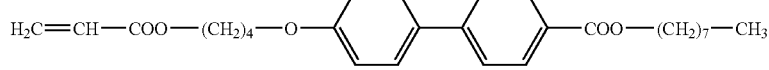

[10] The composition according to any of [1] to [9] wherein the composition contains the polymerizable compound (1) in an amount of 5 to 50 parts by weight based on 100 parts by weight of the total amount of the polymerizable compound (1) and the rod-shaped polymerizable liquid crystal compound.

[11] An un-polymerized film manifesting birefringence obtained by using the composition according to any of [1] to [10].

[13] The optical film according to [12] wherein the retardation value Re(λ) satisfies $0.65 \leq Re(450)/Re(550) \leq 1.0$ and $1.0 \leq Re(650)/Re(550) \leq 1.2$ (wherein, Re(λ) represents a retardation value at a wavelength of λ nm.).

[14] The optical film according to [12] or [13] showing reverse wavelength dispersion.

[15] The optical film according to any of [12] to [14] wherein Re(550) is for a λ/4 plate of 113 to 163 nm.

[16] The optical film according to any of [12] to [14] wherein Re(550) is for a λ/2 plate of 250 to 300 nm.

[17] A flat panel display containing the optical film according to any of [12] to [16].

[18] A method for producing an optical film wherein a polymerizable compound of the formula (1), rod-shaped polymerizable liquid crystal compound and organic solvent are mixed to prepare a mixed solution, then, the solution is applied on a supporting substrate, dried and polymerized.

[19] The method for producing an optical film according to [18] wherein the mixed solution further containing a polymerization initiator is photo-polymerized.

[20] The method for producing an optical film according to [18] or, [19] wherein the mixed solution is applied on an alignment layer formed on the supporting substrate.

[21] A method for producing a λ/4 plate wherein a polymerizable compound of the formula (1), rod-shaped polymerizable liquid crystal compound and organic solvent are mixed to prepare a solution which gives an optical film satisfying 0.65≦Re(450)/Re(550)≦1.0 and 1.0≦Re(650)/Re(550)≦1.2, and the solution is applied on an alignment layer to give membrane thickness at which Re(550) shows 113 to 163 nm, and dried and polymerized.

[22] A method for producing a λ/2 plate wherein a polymerizable compound of the formula (1), rod-shaped polymerizable liquid crystal compound and organic solvent are mixed to prepare a solution which gives an optical film satisfying 0.65≦Re(450)/Re(550)≦1.0 and 1.0≦Re(650)/Re(550)≦1.2, then, the solution is applied on an alignment layer to give membrane thickness at which Re(550) shows 250 to 300 nm, and dried and polymerized.

[23] A method for producing an un-polymerized film wherein a mixed solution containing the composition according to [1] to [10] and an organic solvent is applied on an alignment layer, and the organic solvent is distilled off at 10 to 120° C.

[24] A polymerizable compound of the formula (1):

P2-E2-X2-B2-A2-(G2)$_t$-Y-(G1)$_s$-A1-B1-X1-E1-P1     (1)

(in the formula (1), s and t represent each independently an integer of 0 or 1, G1 and G2 when s and t are 1 represent each independently —CR$^1$R$^2$—, R$^1$ and R$^2$ represent each independently an alkyl group having 1 to 4 carbon atoms, halogen atom or hydrogen atom, A1 and A2 represent each independently a di-valent cyclic hydrocarbon group, di-valent heterocyclic group, methylenephenylene group, oxyphenylene group or thiophenylene group, and to A1 and A2, an alkyl group having 1 to 5 carbon atoms, alkoxy group having 1 to 5 carbon atoms or halogen atom may be bonded, and B1 and B2 represent each independently a di-valent group selected from the group consisting of —CRR'—, —C≡C—, —CH=CH—, —CH$_2$—CH$_2$—, —O—, —S—, —C(=O)—, —C(=O)—O—, —O—C(=O)—, —O—C(=O)—, —O—, —C(=S)—, —C(=S)—O—, —O—C(=S)—, —O—C(=S)—O—, —CH=N—, —N=CH—, —N=N—, —N(→O)=N—, —N=N(→O)—, —C(=O)—NR—, —NR—C(=O)—, —OCH$_2$—, —NR—, —CH$_2$O—, —SCH$_2$—, —CH$_2$S—, —CH=CH—C(=O)—O—, —O—C(=O)—CH=CH—, and single bond, R and R' represent each independently a hydrogen atom or alkyl group having 1 to 5 carbon atoms, X1 and X2 represent each independently a di-valent group of the formula (2):

(2)

[in the formula (2), A3 represents a di-valent cyclic hydrocarbon group or heterocyclic group, B3 represents the same meaning as for above-described B1 and B2, and n represents an integer of 1 to 4.]

Y represents a di-valent group of the formula (7):    (7)

[wherein, C1 represents a quaternary carbon atom or quaternary silicon atom, D1 and D2 represent each independently a cyclic hydrocarbon group, heterocyclic group or hydrocarbon group having 1 to 5 carbon atoms, D1 and D2 may be connected via a hydrocarbon group having 1 to 5 carbon atoms, amino group, ether group, thioether group, aminoalkyl group, carbonyl group or single bond, and to groups constituting D1 and D2, a hydroxyl group, amino group, thiol group, cyclic hydrocarbon group, alkyl group having 1 to 5 carbon atoms, alkoxy group having 1 to 5 carbon atoms, trifluoromethyl group, trifluoromethyloxy group, nitrile group, nitro group or halogen atom may be bonded.], E1 and E2 represent each independently an alkylene group having 2 to 25 carbon atoms, and to E1 and E2, an alkyl group having 1 to 5 carbon atoms, alkoxy group having 1 to 5 carbon atoms or halogen atom may further be bonded, and P1 and P2 represent a hydrogen atom or polymerizable group, at least one of P1 and P2 being a polymerizable group.).

[25] The polymerizable compound according to [24] wherein, in the formula (1), s and t represent 0, and B1 and B2 represent —CRR'—, —O—, —S— or —NR— (wherein, R and R' represent the same meanings as described above).

[26] The polymerizable compound according to [24] wherein, in the formula (1), (G1)s and (G2)t represent a methylene group, and B1 and B2 represent a single bond, —C≡C—, —O—C(=O)—O—, —O—C(=O)— or —O—C(=O)—O—.

[27] The polymerizable compound according to any of [24] to [26] wherein Y in the formula (1) represents a di-valent group selected from the group consisting of the formulae (D-1) to (D-18):

(D-1)

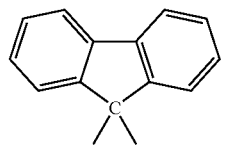

(D-2)

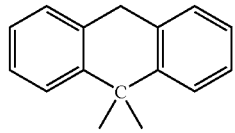

(D-3)

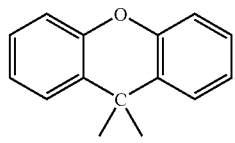

(D-4)

-continued
(D-5) 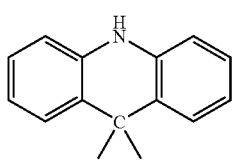
(D-6) 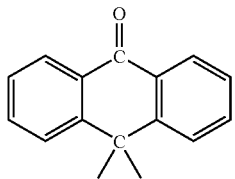
(D-7) 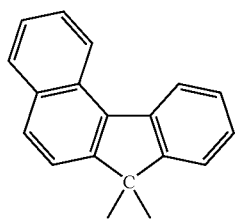
(D-8) 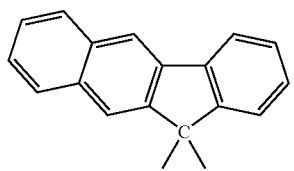
(D-9) 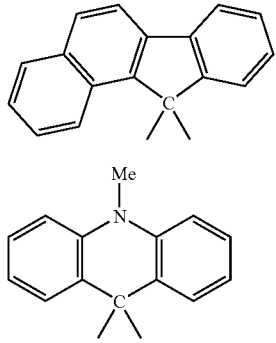
(D-10) 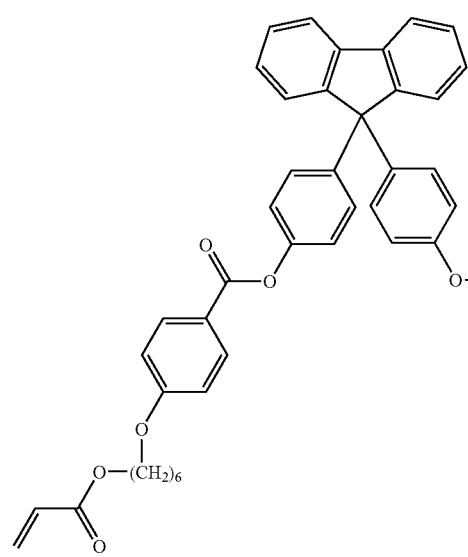
-continued
(D-11) 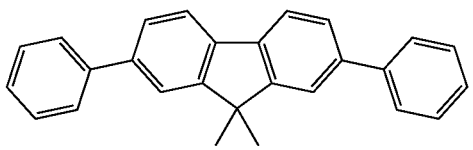
(D-12) 
(D-15)
(D-16)
(D-17)
(D-18)
[28] The polymerizable compound according to any of [24] to [27] wherein the polymerizable group in the formula (1) is an acryloyl group or methacryloyl group.
[29] The polymerizable compound according to any of [24] to [28] wherein the polymerizable compound (1) is at least one compound selected from the group consisting of the following formulae:
(1-1)

(1-2)
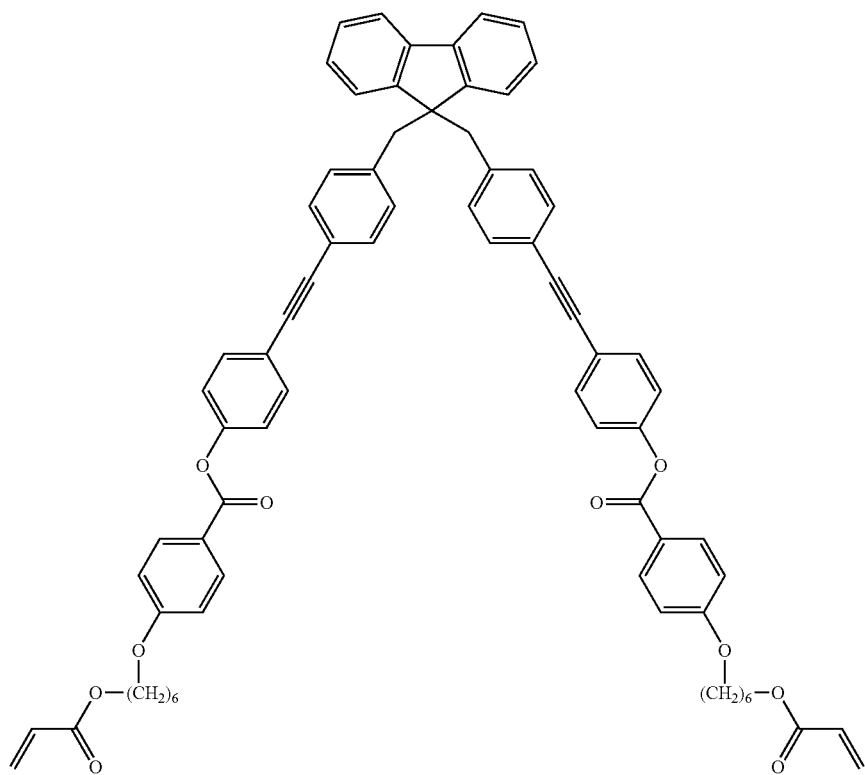
(1-3)
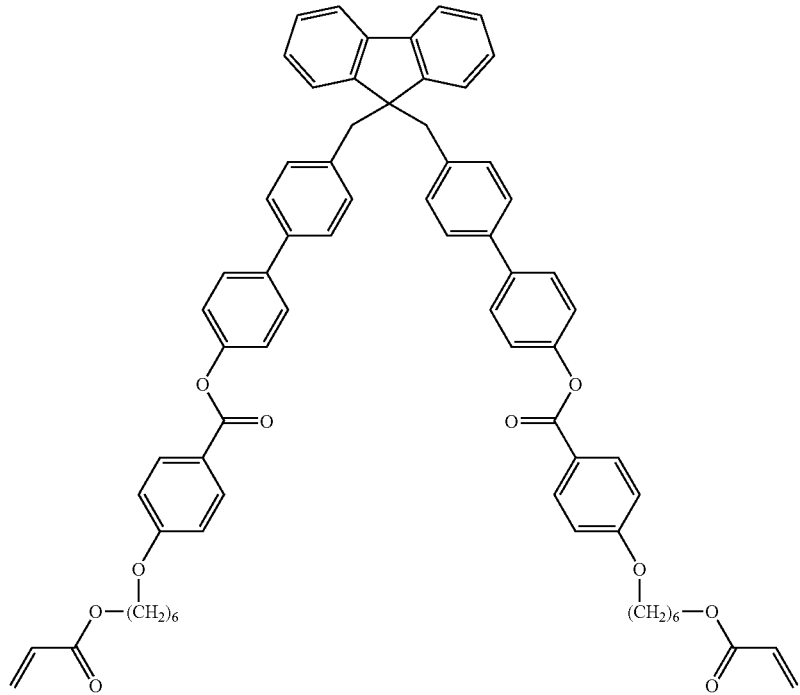

(1-5)
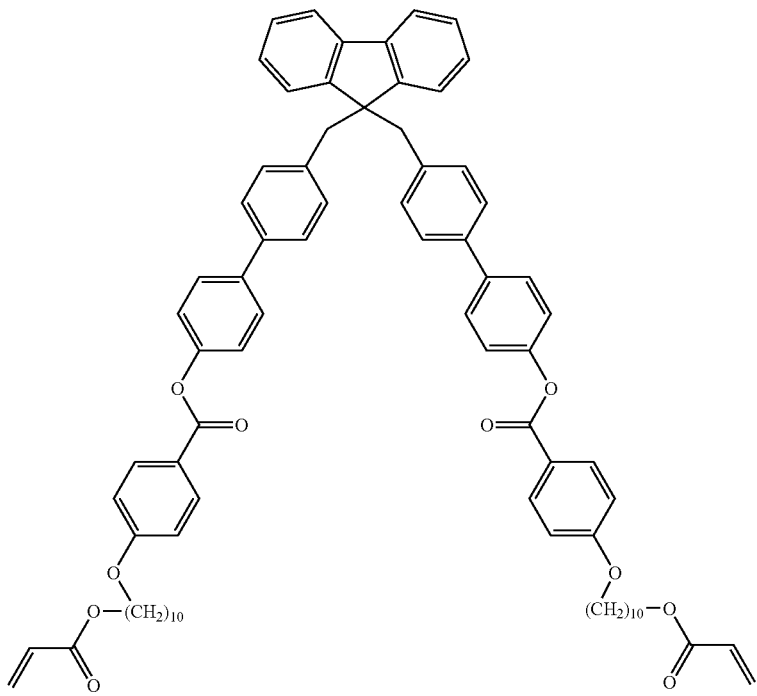
(1-4)
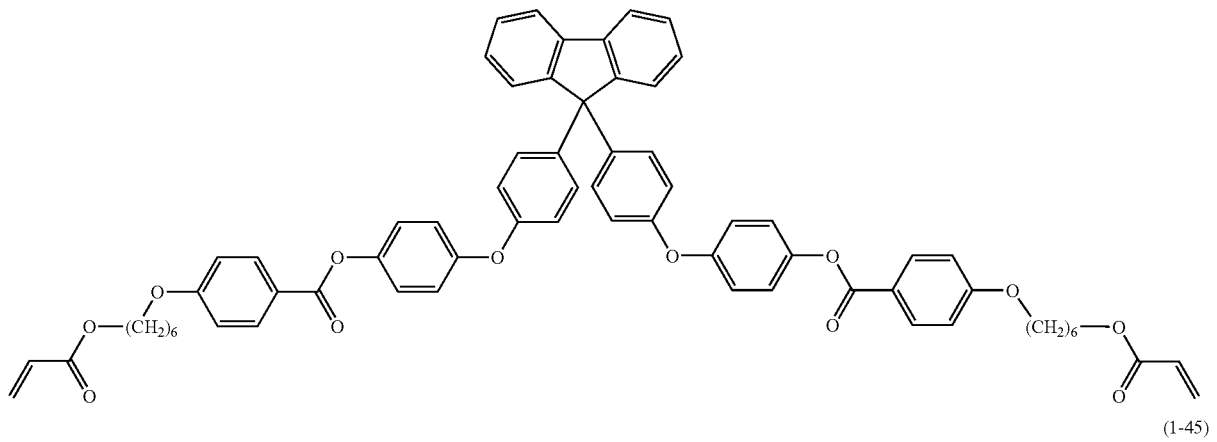
(1-45)
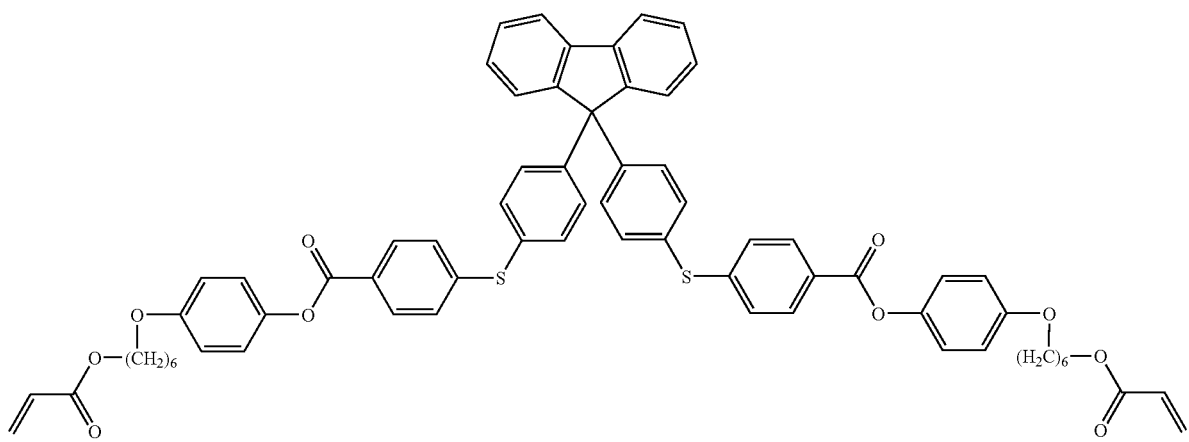

-continued

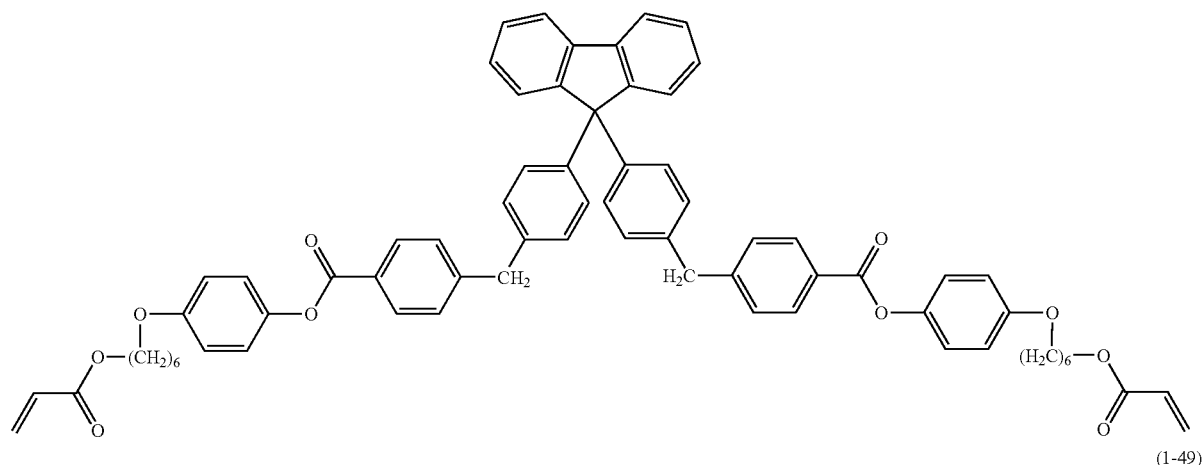
(1-50)

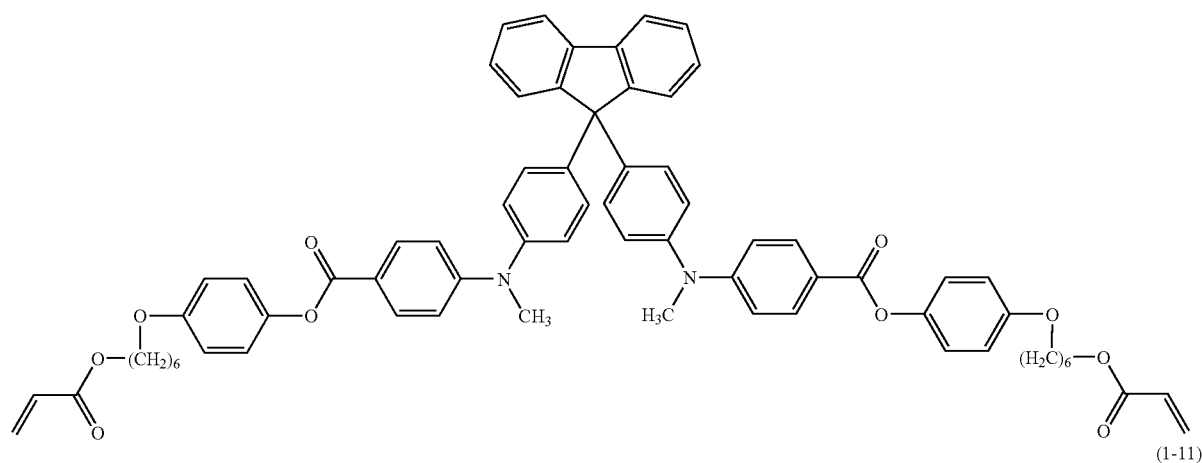
(1-49)

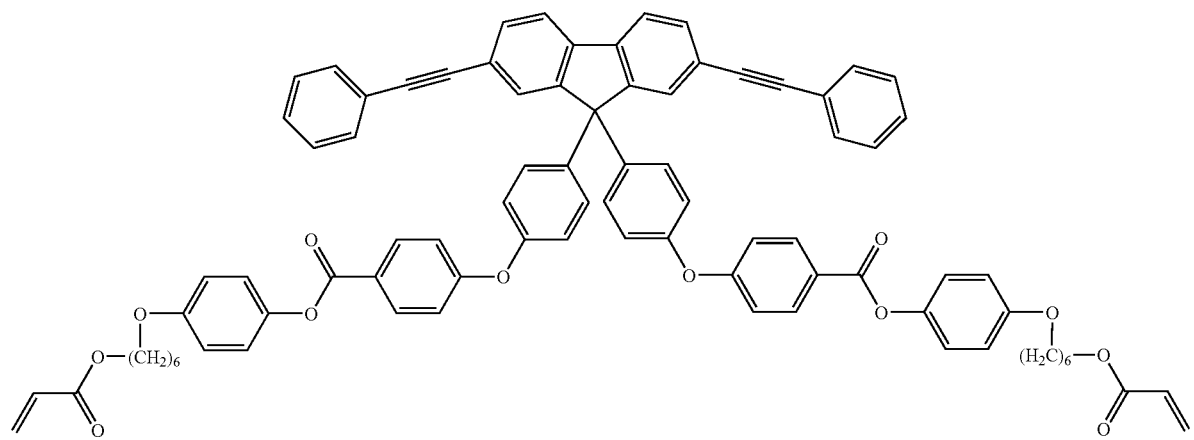
(1-11)

EMBODIMENTS FOR CARRYING OUT THE INVENTION

Figure 1:
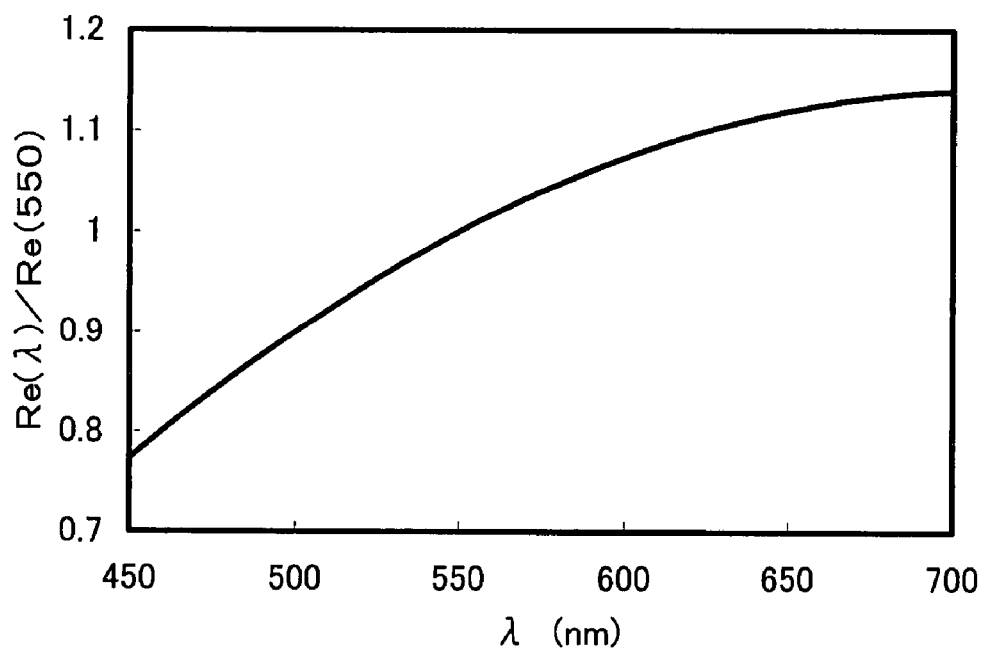
FIG. 1 is a graph showing the wavelength dispersion property of an optical film produced in Example 1. The ordinate represents a value [Re(λ)/Re(550)] obtained by dividing the retardation value by a retardation value at a wavelength of 550 nm, and the abscissa represents the wavelength (λ).

The composition of the present invention is a composition containing a polymerizable compound of above-described formula (1) and a rod-shaped polymerizable liquid crystal compound.

Y in the formula (1) represents a di-valent group, and this group preferably has a bent structure. Here, the bent structure means that a bonding group of Y which bonds to a group containing A1 and a bonding group of Y which bonds to a group containing A2 form an angle of usually 100° to 140°, preferably 110° to 130°. By this, there is a preferable tendency of improvement in compatibility between a polymerizable compound (1) and a rod-shaped polymerizable liquid crystal compound when a composition of the present invention is dissolved in an organic solvent and improvement in the retardation value of the resulting optical film.

As specific Y, di-valent groups of the formula (7) and the like are exemplified.

 (7)

If an angle formed by a bonding group of Y which bonds to a group containing A1 and a bonding group of Y which bonds to a group containing A2 is represented by A1, A2, C1, D1, D2, (G1)s and (G2)t, the angle in the case of s=t=1 in the formula (7) can be depicted by the formula (7-1) and the angle in the case of s=t=0 in the formula (7) can be depicted by the formula (7-2).

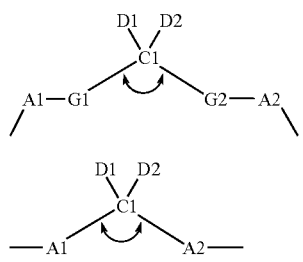

In the formula (7), C1 represents a quaternary carbon atom or a quaternary silicon atom, and preferable is a quaternary carbon atom because of easy production.

In the formula (7), D1 and D2 represent a cyclic hydrocarbon group, heterocyclic group, linear hydrocarbon group having 1 to 5 carbon atoms or branched hydrocarbon group having 1 to 5 carbon atoms. As the cyclic hydrocarbon group used as D1 and D2, mentioned are cycloalkyl groups having about 5 to 12 carbon atoms such as a cyclopentyl group, cyclohexyl group and the like; aromatic groups having about 6 to 12 carbon atoms represented by the following formulae, and the like.

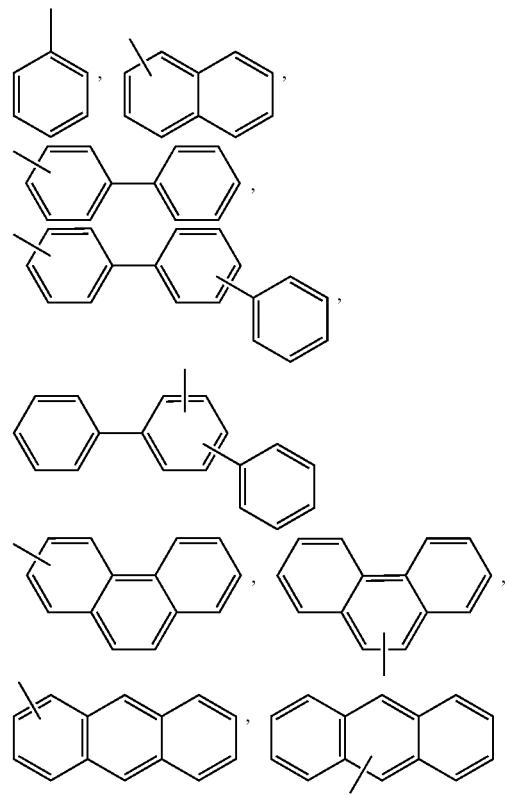

As the heterocyclic group used as D1 and D2, mentioned are the following formulae such as 5-membered rings, 6-membered rings and the like.

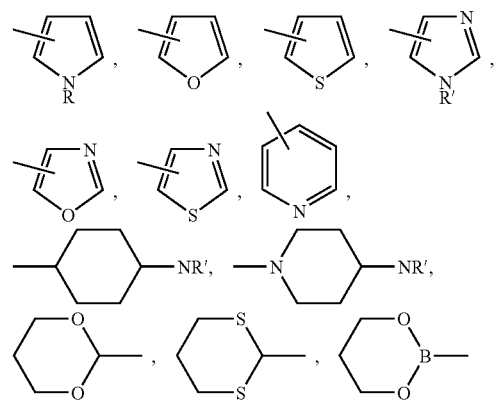

D1 and D2 may be connected via a hydrocarbon group having 1 to 5 carbon atoms, amino group, ether group, thio-ether group or single bond, and to D1 and D2, a hydroxyl group, amino group, thiol group, cyclic hydrocarbon group, linear or branched alkyl group having 1 to 5 carbon atoms, linear or branched alkoxy group having 1 to 5 carbon atoms, trifluoromethyl group, trifluoromethyloxy group, nitrile group, nitro group or halogen atom may be bonded.

Here, mentioned as the hydrocarbon group are alkylene groups such as a methylene group, ethylene group, propylene group and the like, connecting groups obtained by substituting a single bond of the alkylene group with a double bond or triple bond, and the like. As the cyclic hydrocarbon group, the same groups as the above-described cyclic hydrocarbon groups are exemplified, and as the alkyl group, alkoxy group and halogen atom, the same groups as the alkyl groups, alkoxy groups and halogen atoms exemplified as the group to be substituted on A1 and A2 described above are exemplified.

As specific examples of the group of the formula (7), there are mentioned di-valent substituents of the formulae (D-1) to (D-18) (here, as the quaternary atom C1, a carbon atom is exemplified because of easy production), substituents in which C1 is a carbon atom and both D1 and D2 are a phenyl group, and the like.

(D-1)
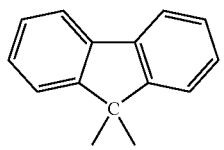

(D-2)
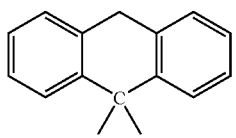

(D-3)
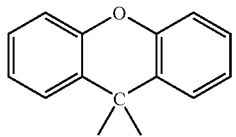

(D-4)
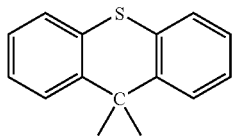

(D-5)
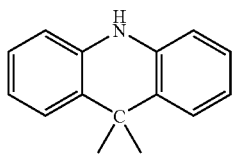

(D-6)
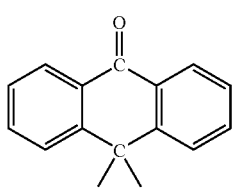

(D-7)
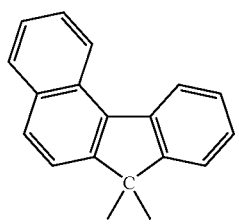

-continued (D-8)
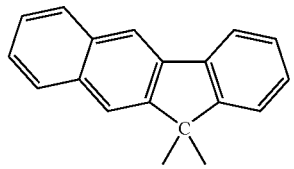

(D-9)
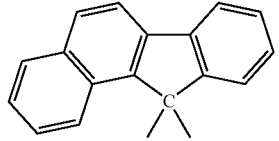

(D-10)
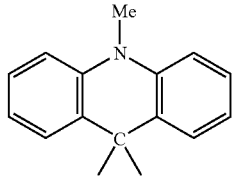

(D-11)
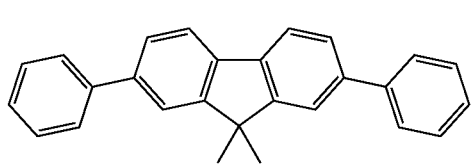

(D-12)
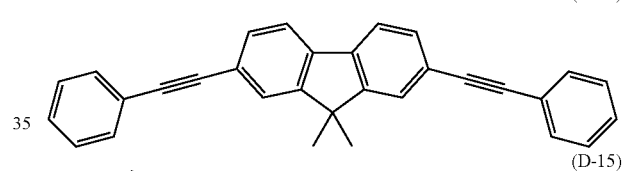

(D-15)
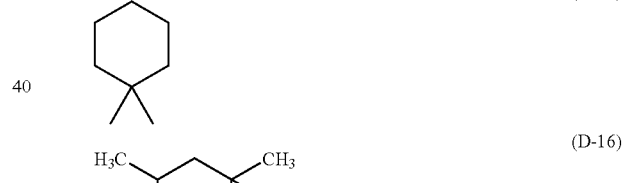

(D-16)
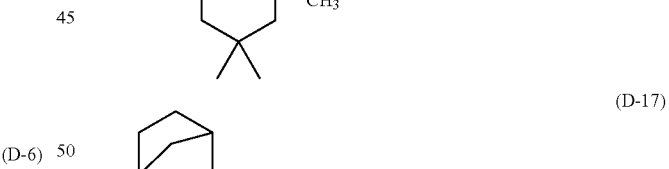

(D-17)

(D-18)

A part of hydrogen atoms contained in the above-exemplified structures may be substituted with an alkyl group having about 1 to 4 carbon atoms such as a methyl group, ethyl group, i-propyl group, t-butyl group and the like; an alkoxy group having about 1 to 4 carbon atoms such as a methoxy group, ethoxy group and the like; trifluoromethyl group; trifluoromethyloxy group; nitrile group; nitro group; halogen atom such as fluorine atom, chlorine atom, bromine atom and the like.

As Y, preferable are substituents in which C1 is a carbon atom and both D1 and D2 are a phenyl group and substituents of the formulae (D-1) to (D-12) from the standpoint of easiness of production, and particularly preferable are substituents of the formulae (D-1) to (D-12) from the standpoint of remarkable reverse wavelength dispersion.

s and t of (G1)s and (G2)t in the polymerizable compound (1) represent each independently an integer of 0 or 1.

G1 and G2 when s and t are 1 represent each independently —CR$^1$R$^2$—. Here, R$^1$ and R$^2$ represent each independently an alkyl group having 1 to 4 carbon atoms such as a methyl group, ethyl group and the like; a halogen atom such as a fluorine atom, chlorine atom, bromine atom, or the like. (G1)s and (G2)t are preferably a methylene group because of easy production.

When s=0, Y and A1 are singly-bonded, and when t=0, Y and A2 are singly-bonded.

In the polymerizable compound (1), A1 and A2 represent each independently a di-valent cyclic hydrocarbon group, di-valent heterocyclic group, methylenephenylene group, oxyphenylene group or thiophenylene group.

Here, a methylene group, ether group and thioether group in the methylenephenylene group, oxyphenylene group or thiophenylene group are bound to B1 and B2.

Mentioned as the di-valent cyclic hydrocarbon group to be used for A1 and A2 are cycloalkyl groups having about 5 to 12 carbon atoms such as a cyclopentyl group, cyclohexyl group and the like; aromatic groups having about 6 to 12 carbon atoms of the following formulae:

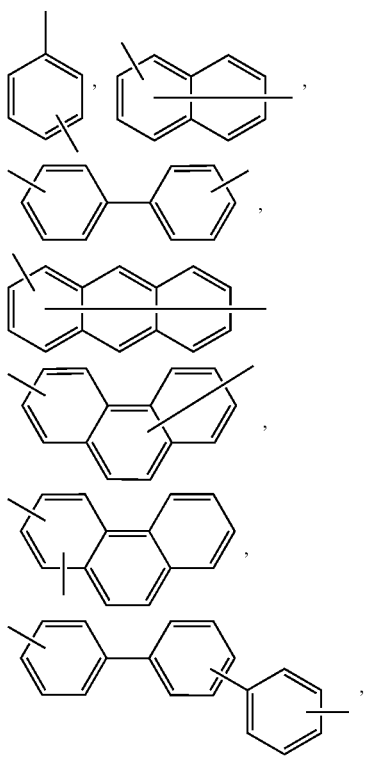

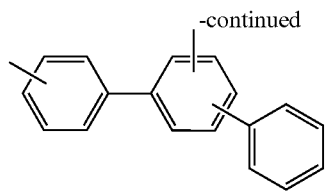

alicyclic groups composed of 5-membered rings and 6-membered ring of the following formulae:

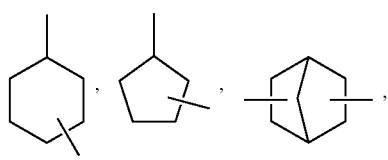

heterocyclic groups composed of 5-membered rings and 6-membered rings of the following formulae:

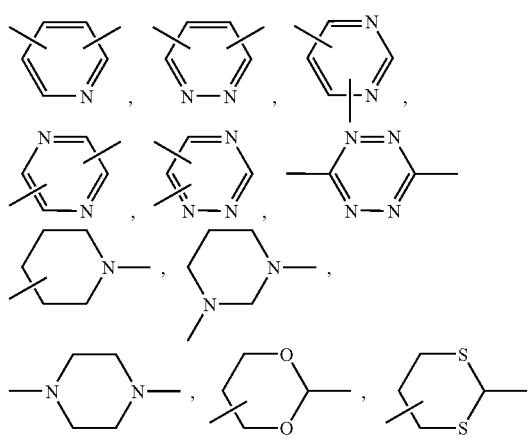

Regarding A1 and A2, a part of hydrogen atoms on the above-exemplified groups may be substituted with an alkyl group having about 1 to 4 carbon atoms such as a methyl group, ethyl group, i-propyl group, t-butyl group and the like; an alkoxy group having about 1 to 4 carbon atoms such as a methoxy group, ethoxy group and the like; trifluoromethyl group; trifluoromethyloxy group; nitrile group; nitro group; halogen atom such as fluorine atom, chlorine atom, bromine atom and the like.

It is preferable that A1 and A2 represent the same kind of group because of easy production. As A1 and A2, preferable are a 1,4-phenylene group, 1,4-cyclohexylene group and di-valent groups obtained by substituting carbon atoms in a benzene ring with 1 to 3 nitrogen atoms because of easy production, and particularly preferable is a 1,4-phenylene group.

B1 and B2 represent each independently a di-valent group selected from the group consisting of —CRR'—, —C≡C—, —CH=CH—, —CH$_2$—CH$_2$, —O—, —S—, —C(=O)—, —C(=O)—O—, —O—C(=O)—, —O—C(=O)—O—, —C(=S)—, —C(=S)—O—, —O—C(=S)—, —O—C(=S)—O—, —CH=N—, —N=CH—, —N=N—, —N(→O)=N—, —N=N(→O)—, —C(=O)—NR—, —NR—C(=O)—, —OCH₂—, —NR—, —CH₂O—, —SCH₂—, —CH₂S—, —CH=CH—C(=O)—O—, —O—C(=O)—CH=CH—, and a single bond. Here, R and R' represent each independently a hydrogen atom or an alkyl group having 1 to 4 carbon atoms such as a methyl group, ethyl group and the like, or a halogen atom such as a fluorine atom, chlorine atom, bromine atom and the like.

It is preferable that B1 and B2 represent the same kind of di-valent group because of easy production.

When s and t in the polymerizable compound (1) are 0, B1 and B2 preferably represent —CRR'—, —O—, —S— or —NR—.

When B1 and B2 represent the above-described bonding group, a plane formed by A1(A2) and a plane formed by X1(X2) are not the same plane, leading preferably to a tendency of improvement in orientation.

When s and t are not 0 such as in the case of a methylene group in (G1)s and (G2)t in the polymerizable compound (1), it is preferable that B1 and B2 represent a single bond, —C≡C—, —O—C(=O)—O—, —O—C(=O)— or —O—C(=O)—O— since its production is easy and orientation tends to be improved.

X1 and X2 in the polymerizable compound (1) represent a di-valent group of the formula (2).

$$-\!\!\left[\!A3\!-\!\!B3\right]_{\!n}\!\!-$$  (2)

In the formula (2), A3 represents a di-valent cyclic hydrocarbon group or a di-valent heterocyclic group. Specifically, di-valent cyclic hydrocarbon groups and di-valent heterocyclic groups as exemplified for A1 and A2 are exemplified, and preferable are a 1,4-phenylene group, 1,4-cyclohexylene group and di-valent groups obtained by substituting carbon atoms in a benzene ring with 1 to 3 nitrogen atoms because of easy production, and particularly preferable is a 1,4-phenylene group.

It is preferable that X1 and X2 represent the same kind of di-valent group because of easy production.

B3 represents the same meaning as for B1, and among others, —OC(=O)—, —C(=O)—O—, —O— and single bond are preferable because of easy production.

n represents an integer of 1 to 4. When n is 2 or more, structural units composed of A3 and B3 may mutually be different as compounds (1-2) to (1-4) in Table 1 described later.

When the resulting polymerizable compound is cast, n is preferably 1 or 2 from the standpoint of easy handling and particularly preferably 1 from the standpoint of easy production.

E1 and E2 represent each independently an alkylene group having 2 to 25 carbon atoms, preferably an alkylene group having 4 to 10 carbon atoms.

A hydrogen atom in E1 and E2 may be substituted with an alkyl group, alkoxy group, trifluoromethyl group, trifluoromethyloxy group, nitrile group, nitro group or halogen atom, and a hydrogen atom itself is preferable.

It is preferable that E1 and E2 represent the same kind of alkylene group because of easy production.

P1 and P2 represent a hydrogen atom or polymerizable group.

Here, the polymerizable group is a substituent capable of polymerizing a polymerizable compound (1) and a rod-shaped polymerizable liquid crystal compound described later, and specifically exemplified are a vinyl group, p-stilbene group, acryloyl group, methacryloyl group, carboxyl group, methylcarbonyl group, hydroxyl group, amide group, alkylamino group having 1 to 4 carbon atoms, amino group, epoxy group, oxetanyl group, aldehyde group, isocyanate group, thioisocyanate group, and the like.

The polymerizable group may include groups as exemplified for B1 and B2, for connecting the above-exemplified groups to E1 and E2.

Among others, an acryloyl group or methacryloyl group is preferable since its handling in photo-polymerization is easy and production thereof is also easy, and particularly, an acryloyl group is preferable.

At least one of P1 and P2 is a polymerizable group, and it is preferable that both P1 and P2 are a polymerizable group since then the resulting optical film tends to get more excellent membrane hardness.

As specific examples of the polymerizable compound (1), compounds shown in Tables 1 to 4 and the like are mentioned. Here, compounds produced in examples are shown in Table 1 as (1-1), (1-2), (1-3) and (1-4).

The composition of the present invention may also contain several different polymerizable compounds (1). Among others, compounds described in Tables 1 and 2 are preferable because of remarkable reverse wavelength dispersion, and particularly, compounds described in Table 1 is preferable because of easy production.

When descriptions in the table are explained for the compound (1-1), A1=A2 means that A1 and A2 represent the same phenylene group, and the A side of B1=B2 means that an ether portion of an ester group is bound to A (phenylene group) and the X side thereof means that a carbonyl portion of an ester group is bound to X (phenylene ether group). No designation of the side means that substitutions on any directions are permissible.

TABLE 1

| Compound | Y | (G1)s = (G2)t | A1 = A2 Y side B side |
|---|---|---|---|
| (1-1) |  | — | |

TABLE 1-continued
| | | | |
|---|---|---|---|
| (1-2) | 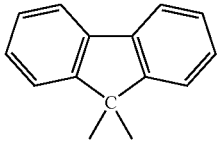 | —CH$_2$— | 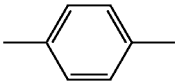 |
| (1-3) | 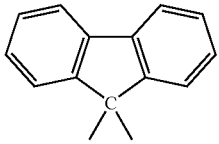 | —CH$_2$— |  |
| (1-4) |  | — |  |
| (1-5) | 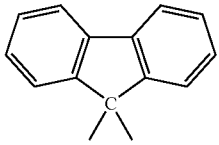 | —CH$_2$— | 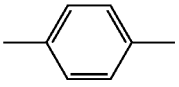 |
| (1-6) | 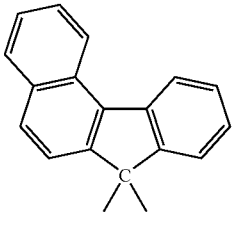 | — | 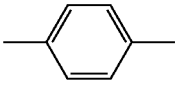 |
| (1-7) | 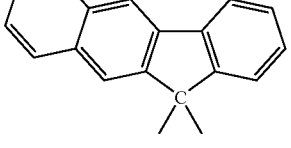 | — | 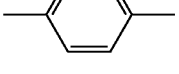 |
| (1-8) | 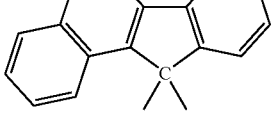 | — | 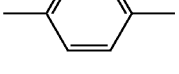 |
| (1-9) | 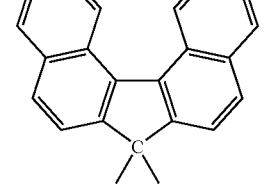 | — | 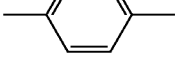 |
| (1-10) | 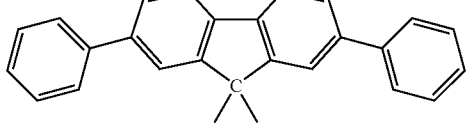 | — |  |

TABLE 1-continued

| | | | |
|---|---|---|---|
| (1-11) | [9,9-dimethyl-2,7-bis(phenylethynyl)fluorene structure] | — | [1,4-phenylene] |
| (1-12) | [dimethyl-benzo[c]fluorene structure] | —CH₂— | [1,4-phenylene] |
| (1-13) | [dimethyl-benz[b]fluorene structure] | —CH₂— | [1,4-phenylene] |
| (1-14) | [dimethyl-benz[a]fluorene structure] | —CH₂— | [1,4-phenylene] |
| (1-15) | [dimethyl-dibenzofluorene structure] | —CH₂— | [1,4-phenylene] |
| (1-16) | [9,9-dimethyl-2,7-diphenylfluorene structure] | —CH₂— | [1,4-phenylene] |
| (1-17) | [9,9-dimethyl-2,7-bis(phenylethynyl)fluorene structure] | —CH₂— | [1,4-phenylene] |
| (1-18) | [9,9-dimethylfluorene structure] | — | [1,4-phenylene] |
| (1-19) | [9,9-dimethylfluorene structure] | — | [1,4-phenylene] |

TABLE 1-continued
| | | | | |
|---|---|---|---|---|
| (1-20) | 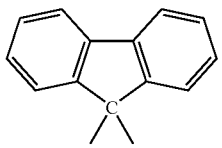 | — | | 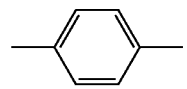 |
| (1-21) | 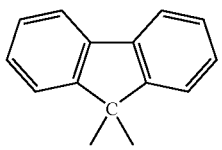 | — | | 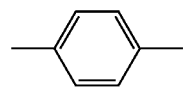 |
| (1-22) | 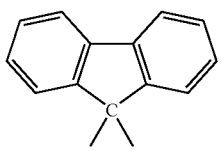 | — | | 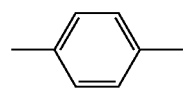 |
| (1-23) | 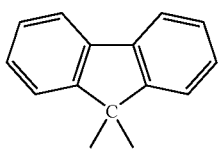 | —CH$_2$— | | 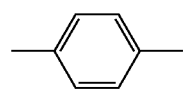 |
| (1-24) | 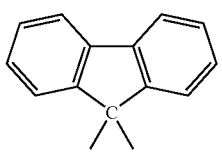 | —CH$_2$— | | 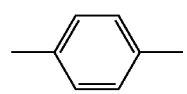 |
| (1-25) | 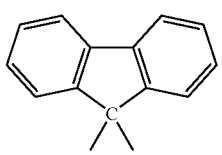 | —CH$_2$— | | 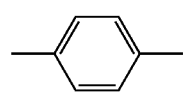 |
| Compound | B1 = B2<br>A side X side | X1 = X2<br>B side E side | E1 = E2 | P1 = P2 |
|---|---|---|---|---|
| (1-1) | 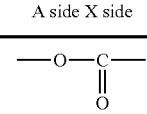 | 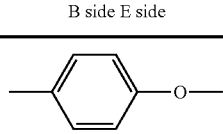 | —(CH$_2$)$_6$— | 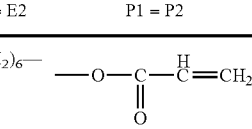 |
| (1-2) | —≡— |  | —(CH$_2$)$_6$— | 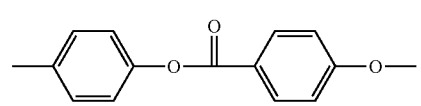 |
| (1-3) | — | 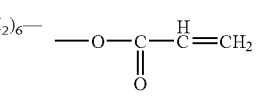 | —(CH$_2$)$_6$— |  |
| (1-4) | —O— | 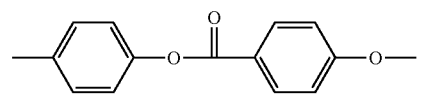 | —(CH$_2$)$_6$— | 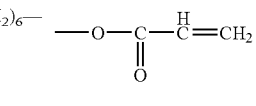 |
| (1-5) | — |  | —(CH$_2$)$_{10}$— | 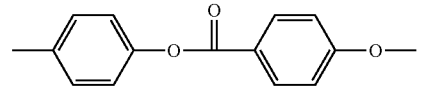 |

TABLE 1-continued
| | | | | |
|---|---|---|---|---|
| (1-6) | —O— | 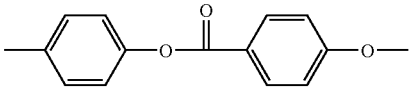 | —(CH$_2$)$_6$— | 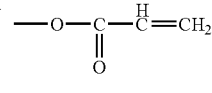 |
| (1-7) | —O— | 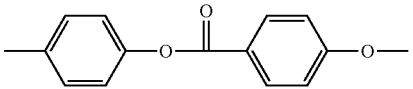 | —(CH$_2$)$_6$— | 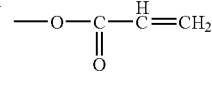 |
| (1-8) | —O— | 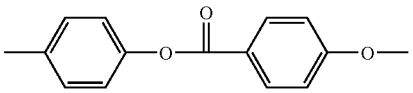 | —(CH$_2$)$_6$— | 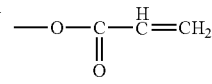 |
| (1-9) | —O— | 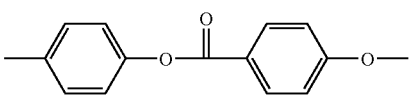 | —(CH$_2$)$_6$— | 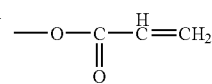 |
| (1-10) | —O— | 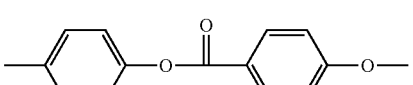 | —(CH$_2$)$_6$— | 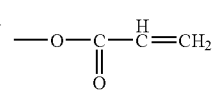 |
| (1-11) | —O— | 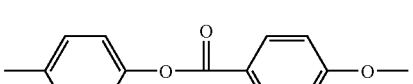 | —(CH$_2$)$_6$— | 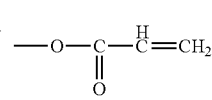 |
| (1-12) | — | 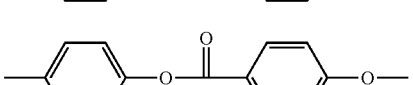 | —(CH$_2$)$_6$— | 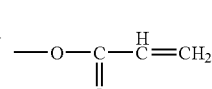 |
| (1-13) | — | 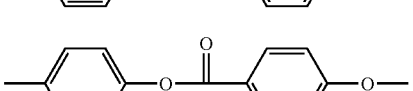 | —(CH$_2$)$_6$— | 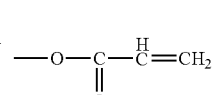 |
| (1-14) | — | 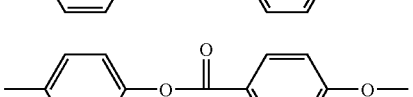 | —(CH$_2$)$_6$— | 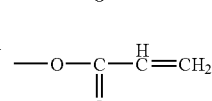 |
| (1-15) | — | 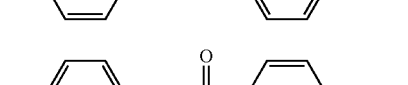 | —(CH$_2$)$_6$— | 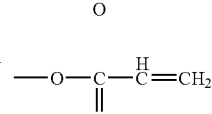 |
| (1-16) | — | 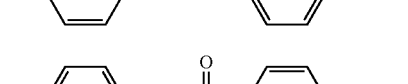 | —(CH$_2$)$_6$— | 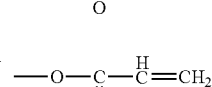 |
| (1-17) | — | 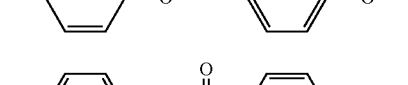 | —(CH$_2$)$_6$— | 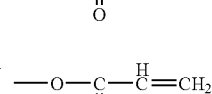 |
| (1-18) | —O— | 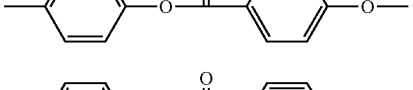 | —(CH$_2$)$_4$— | 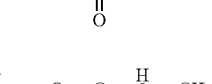 |
| (1-19) | —O— | 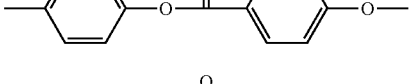 | —(CH$_2$)$_5$— | 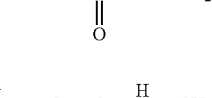 |
| (1-20) | —O— | 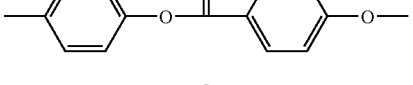 | —(CH$_2$)$_7$— | 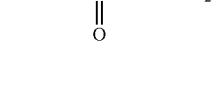 |

TABLE 1-continued

| | | | | |
|---|---|---|---|---|
| (1-21) | —O— | -C6H4-O-C(=O)-C6H4-O- | —(CH₂)₈— | —O—C(=O)—CH=CH₂ |
| (1-22) | —O— | -C6H4-O-C(=O)-C6H4-O- | —(CH₂)₉— | —O—C(=O)—CH=CH₂ |
| (1-23) | — | -C6H4-O-C(=O)-C6H4-O- | —(CH₂)₄— | —O—C(=O)—CH=CH₂ |
| (1-24) | — | -C6H4-O-C(=O)-C6H4-O- | —(CH₂)₅— | —O—C(=O)—CH=CH₂ |
| (1-25) | — | -C6H4-O-C(=O)-C6H4-O- | —(CH₂)₇— | —O—C(=O)—CH=CH₂ |

TABLE 2

| Compound | Y | (G1)s = (G2)t | A1 = A2 Y side B side | B1 = B2 A side X side |
|---|---|---|---|---|
| (1-26) | 9,9-dimethylfluorene-2,7-diyl | — | -C6H4- | —O—C(=O)— |
| (1-27) | 9,9-dimethylfluorene-2,7-diyl | —CH₂— | -C6H4- | ≡ |
| (1-28) | 9,9-dimethylfluorene-2,7-diyl | —CH₂— | -C6H4- | — |
| (1-29) | 9,9-dimethylfluorene-2,7-diyl | — | -C6H4- | —O— |
| (1-30) | 9,9-dimethylfluorene-2,7-diyl | —CH₂— | -C6H4- | — |
| (1-31) | 9,9-dimethyl-9,10-dihydroanthracene-2,6-diyl | — | -C6H4- | —O— |

TABLE 2-continued
| | | | | |
|---|---|---|---|---|
| (1-32) | 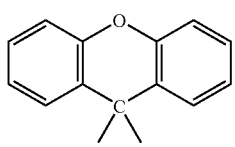 | — | 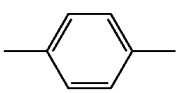 | —O— |
| (1-33) | 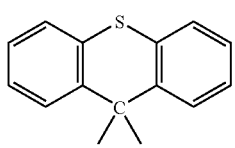 | — |  | —O— |
| (1-34) | 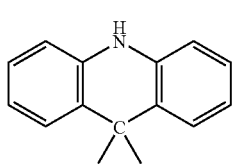 | — | 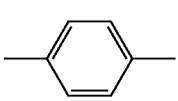 | —O— |
| (1-35) | 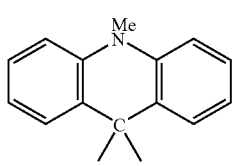 | — |  | —O— |
| (1-36) | 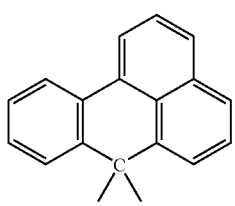 | — |  | —O— |
| (1-37) | 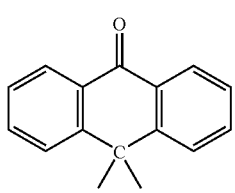 | — |  | —O— |
| (1-38) | 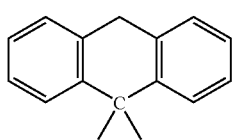 | —CH$_2$— |  | — |
| (1-39) | 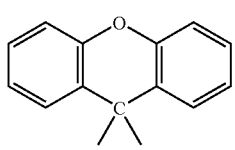 | —CH$_2$— |  | — |
| (1-40) | 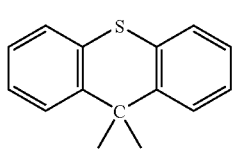 | —CH$_2$— |  | — |

TABLE 2-continued

| | | | | |
|---|---|---|---|---|
| (1-41) | 9,9-dimethyl-9,10-dihydroacridine (NH) | —CH$_2$— | —C$_6$H$_4$— (para) | — |
| (1-42) | 9,9-dimethyl-10-methyl-9,10-dihydroacridine (N-Me) | —CH$_2$— | —C$_6$H$_4$— (para) | — |
| (1-43) | 4,4-dimethyl-4H-phenanthrene moiety | —CH$_2$— | —C$_6$H$_4$— (para) | — |
| (1-44) | anthrone (9(10H)-anthracenone) | —CH$_2$— | —C$_6$H$_4$— (para) | — |
| (1-45) | 9,9-dimethylfluorene | — | —C$_6$H$_4$— (para) | —S— |
| (1-46) | 9,9-dimethylfluorene | — | —C$_6$H$_4$— (para) | —N(CH$_3$)— |
| (1-47) | 9,9-dimethylfluorene | — | —C$_6$H$_4$— (para) | —CH$_2$— |
| (1-48) | 9,9-dimethylfluorene | — | —C$_6$H$_4$— (para) | —S— |
| (1-49) | 9,9-dimethylfluorene | — | —C$_6$H$_4$— (para) | —N(CH$_3$)— |

TABLE 2-continued
| Compound | X1 = X2<br>B side E side | E1 = E2 | P1 = P2 |
|---|---|---|---|
| (1-50) | 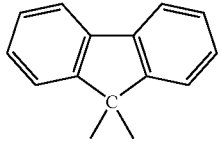 | — |  —CH$_2$— |
| (1-26) | 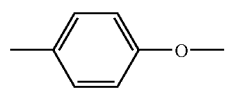 | —(CH$_2$)$_6$— | 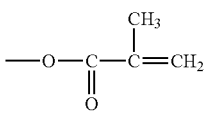 |
| (1-27) | 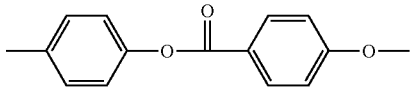 | —(CH$_2$)$_6$— | 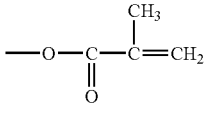 |
| (1-28) | 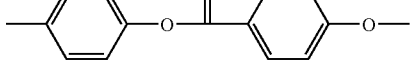 | —(CH$_2$)$_6$— | 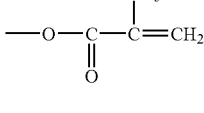 |
| (1-29) | 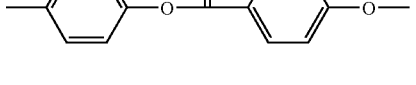 | —(CH$_2$)$_6$— | 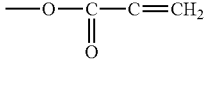 |
| (1-30) | 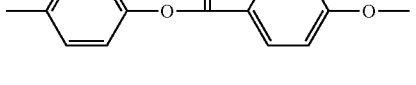 | —(CH$_2$)$_{10}$— | 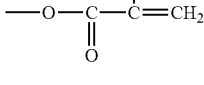 |
| (1-31) | 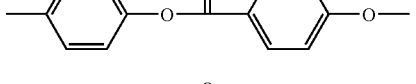 | —(CH$_2$)$_6$— | 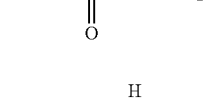 |
| (1-32) | 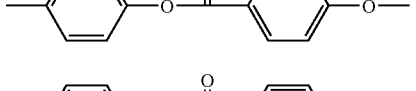 | —(CH$_2$)$_6$— | 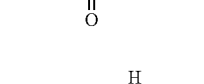 |
| (1-33) | 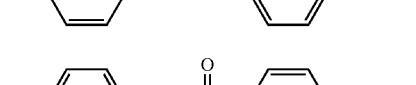 | —(CH$_2$)$_6$— | 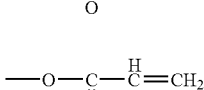 |
| (1-34) | 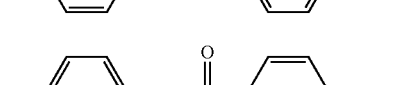 | —(CH$_2$)$_6$— | 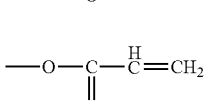 |
| (1-35) | 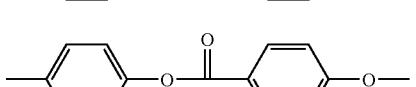 | —(CH$_2$)$_6$— | 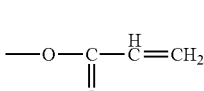 |
| (1-36) | 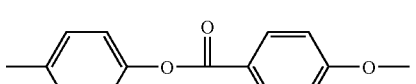 | —(CH$_2$)$_6$— | 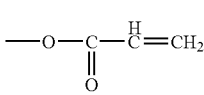 |
| (1-37) |  | —(CH$_2$)$_6$— |  |

TABLE 2-continued

| | | | |
|---|---|---|---|
| (1-38) | ⌬–O–C(=O)–⌬–O– | –(CH$_2$)$_6$– | –O–C(=O)–CH=CH$_2$ |
| (1-39) | ⌬–O–C(=O)–⌬–O– | –(CH$_2$)$_6$– | –O–C(=O)–CH=CH$_2$ |
| (1-40) | ⌬–O–C(=O)–⌬–O– | –(CH$_2$)$_6$– | –O–C(=O)–CH=CH$_2$ |
| (1-41) | ⌬–O–C(=O)–⌬–O– | –(CH$_2$)$_6$– | –O–C(=O)–CH=CH$_2$ |
| (1-42) | ⌬–O–C(=O)–⌬–O– | –(CH$_2$)$_6$– | –O–C(=O)–CH=CH$_2$ |
| (1-43) | ⌬–O–C(=O)–⌬–O– | –(CH$_2$)$_6$– | –O–C(=O)–CH=CH$_2$ |
| (1-44) | ⌬–O–C(=O)–⌬–O– | –(CH$_2$)$_6$– | –O–C(=O)–CH=CH$_2$ |
| (1-45) | ⌬–O–C(=O)–⌬–O– | –(CH$_2$)$_6$– | –O–C(=O)–CH=CH$_2$ |
| (1-46) | ⌬–O–C(=O)–⌬–O– | –(CH$_2$)$_6$– | –O–C(=O)–CH=CH$_2$ |
| (1-47) | ⌬–O–C(=O)–⌬–O– | –(CH$_2$)$_6$– | –O–C(=O)–CH=CH$_2$ |
| (1-48) | ⌬–O–C(=O)–⌬–O– | –(CH$_2$)$_4$– | –O–C(=O)–CH=CH$_2$ |
| (1-49) | ⌬–O–C(=O)–⌬–O– | –(CH$_2$)$_4$– | –O–C(=O)–CH=CH$_2$ |
| (1-50) | ⌬–O–C(=O)–⌬–O– | –(CH$_2$)$_4$– | –O–C(=O)–CH=CH$_2$ |

TABLE 3

| Compound | Y | (G1)s = (G2)t | A1 = A2<br>Y side B side | B1 = B2<br>A side X side |
|---|---|---|---|---|
| (1-51) | diphenyl-dimethyl C | — | 1,4-phenylene | —O— |
| (1-52) | di(2-naphthyl)-dimethyl C | — | 1,4-phenylene | —O— |
| (1-53) | di(2-pyridyl)-dimethyl C | — | 1,4-phenylene | —O— |
| (1-54) | dimethyl-dibenzosilole | — | 1,4-phenylene | —O— |
| (1-55) | 1,1-dimethylcyclohexyl | — | 1,4-phenylene | —O— |
| (1-56) | 1,1,3,3,5-pentamethylcyclohexyl | — | 1,4-phenylene | —O— |
| (1-57) | 2,2-dimethylnorbornyl | — | 1,4-phenylene | —O— |
| (1-58) | dimethyl-adamantyl type | — | 1,4-phenylene | —O— |
| (1-59) | 9,9-dimethylfluorene | — | piperidine-1,4-diyl | —O— |
| (1-60) | 9,9-dimethylfluorene | — | piperazine-1,4-diyl | —O— |

TABLE 3-continued
| | | | | |
|---|---|---|---|---|
| (1-61) | 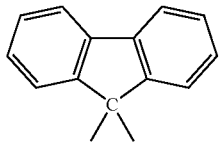 | — | 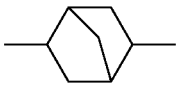 | —O— |
| (1-62) | 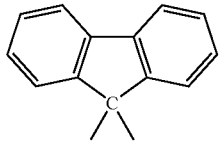 | — | 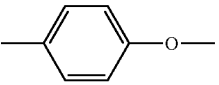 | 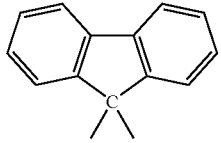 |
| (1-63) | 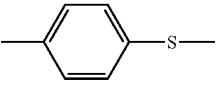 | — | 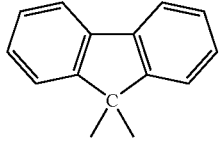 |  |
| (1-64) | 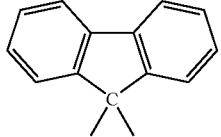 | — |  | —O— |
| (1-65) | 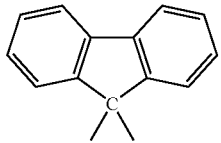 | — |  | —O— |
| (1-66) | 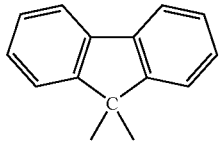 | — | 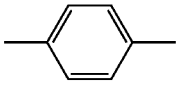 | —O— |
| (1-67) | 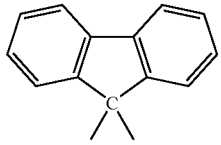 | — | 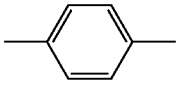 | —O— |
| (1-68) | 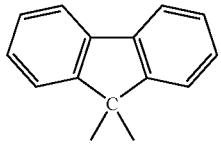 | — | 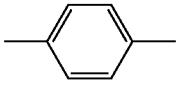 | —O— |
| (1-69) | | — | | —O— |
| (1-70) | 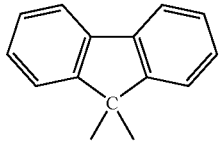 | —CH2— | 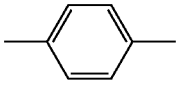 | |

TABLE 3-continued
| Compound | | | | |
|---|---|---|---|---|
| (1-71) | 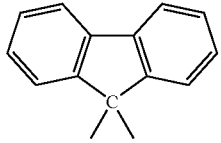 | —CH2— |  | 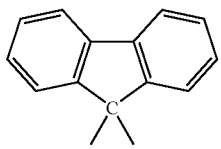 |
| (1-72) | 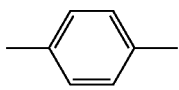 | —CH2— | 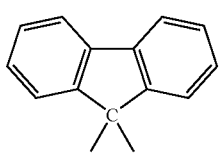 | 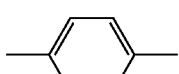 |
| (1-73) | 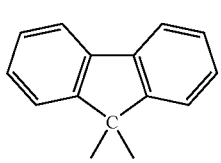 | —CH2— | 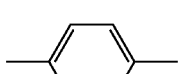 | 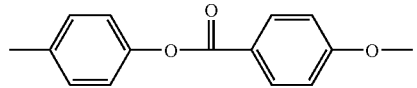 |
| (1-74) | 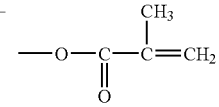 | —CH2— | 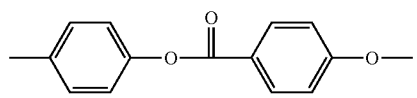 | 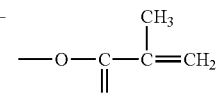 |
| Compound | X1 = X2<br>B side E side | E1 = E2 | P1 = P2 |
|---|---|---|---|
| (1-51) | 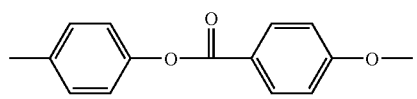 | —(CH$_2$)$_6$— | 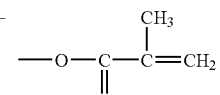 |
| (1-52) | 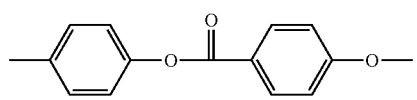 | —(CH$_2$)$_6$— | 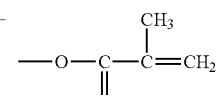 |
| (1-53) | 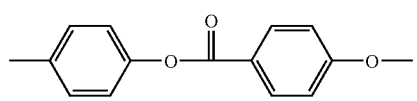 | —(CH$_2$)$_6$— | 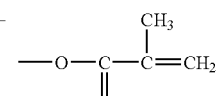 |
| (1-54) | 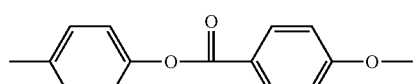 | —(CH$_2$)$_6$— | 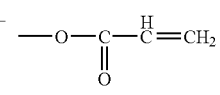 |
| (1-55) | 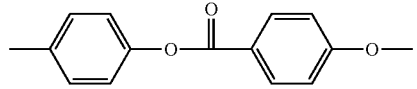 | —(CH$_2$)$_6$— | 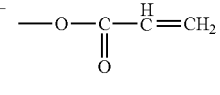 |
| (1-56) | 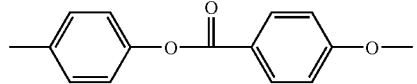 | —(CH$_2$)$_6$— | 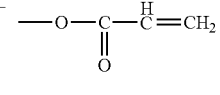 |
| (1-57) | | —(CH$_2$)$_6$— | |
| (1-58) | | —(CH$_2$)$_6$— | |

TABLE 3-continued
| (1-59) | 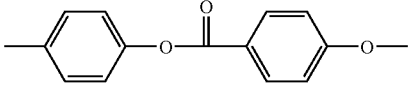 | —(CH$_2$)$_6$— | 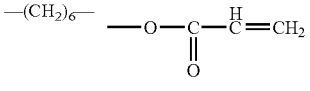 |
| (1-60) | 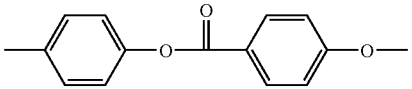 | —(CH$_2$)$_6$— | 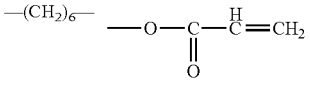 |
| (1-61) | 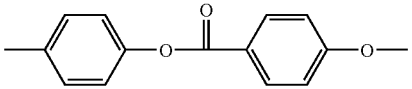 | —(CH$_2$)$_6$— | 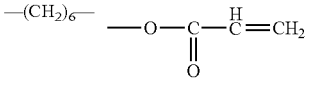 |
| (1-62) | 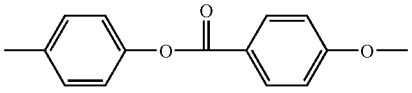 | —(CH$_2$)$_6$— | 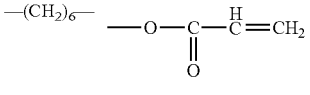 |
| (1-63) | 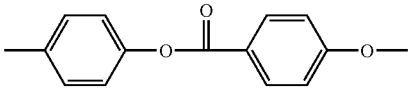 | —(CH$_2$)$_6$— | 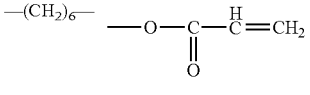 |
| (1-64) | 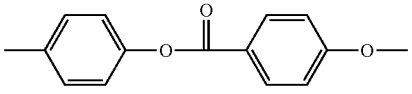 | —(CH$_2$)$_6$— | 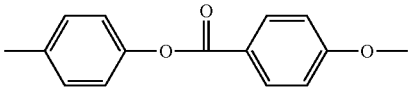 |
| (1-65) | 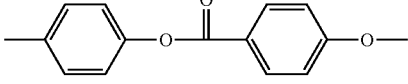 | —(CH$_2$)$_6$— | —OH |
| (1-66) | 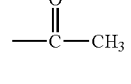 | —(CH$_2$)$_6$— | 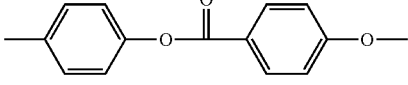 |
| (1-67) | 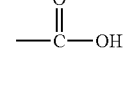 | —(CH$_2$)$_6$— | 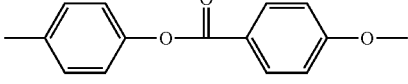 |
| (1-68) | 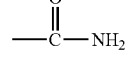 | —(CH$_2$)$_6$— | 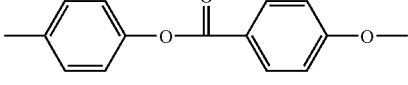 |
| (1-69) | 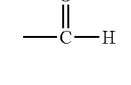 | —(CH$_2$)$_6$— | 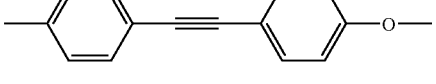 |
| (1-70) | 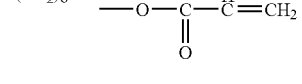 | —(CH$_2$)$_6$— | 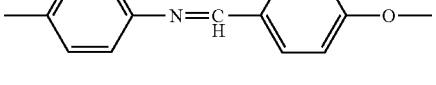 |
| (1-71) | 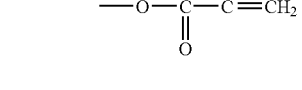 | —(CH$_2$)$_6$— | 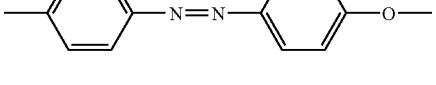 |
| (1-72) | 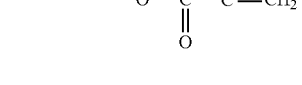 | —(CH$_2$)$_6$— | |

TABLE 3-continued

| | | | |
|---|---|---|---|
| (1-73) | 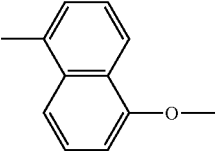 | —(CH$_2$)$_6$— | —O—C(=O)—CH=CH$_2$ |
| (1-74) | 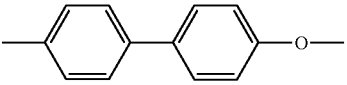 | —(CH$_2$)$_6$— | —O—C(=O)—CH=CH$_2$ |

TABLE 4

| Compound | Y | (G1)s = (G2)t | A1 = A2 Y side B side | B1 = B2 A side X side |
|---|---|---|---|---|
| (1-76) | 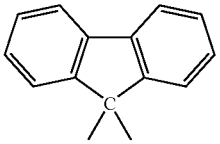 | — | | —O—C(=O)— |
| (1-77) |  | — | | —O—C(=O)— |

| Compound | X1 = X2 B side E side | E1 = E2 | P1 = P2 | |
|---|---|---|---|---|
| (1-76) | 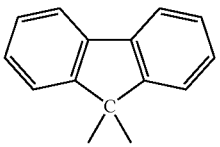 | —(CH$_2$)$_6$— | —O—C(=O)—CH=CH$_2$ | H / |
| (1-77) | 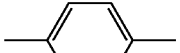 | —(CH$_2$)$_6$— | —O—C(=O)—CH=CH$_2$ | / H |

As the compound (1), compounds described in Tables 1 and 2 are preferable, compounds described in Table 1 are more preferable, compounds of the following formulae are further preferable, and compound of the formulae (1-1), (1-2), (1-3), (1-4) and (1-5) are particularly preferable.

(1-1)

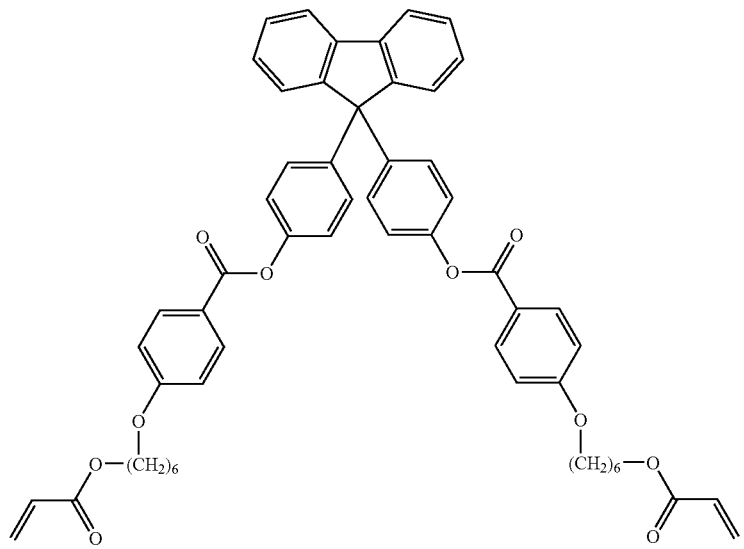

-continued
(1-2)
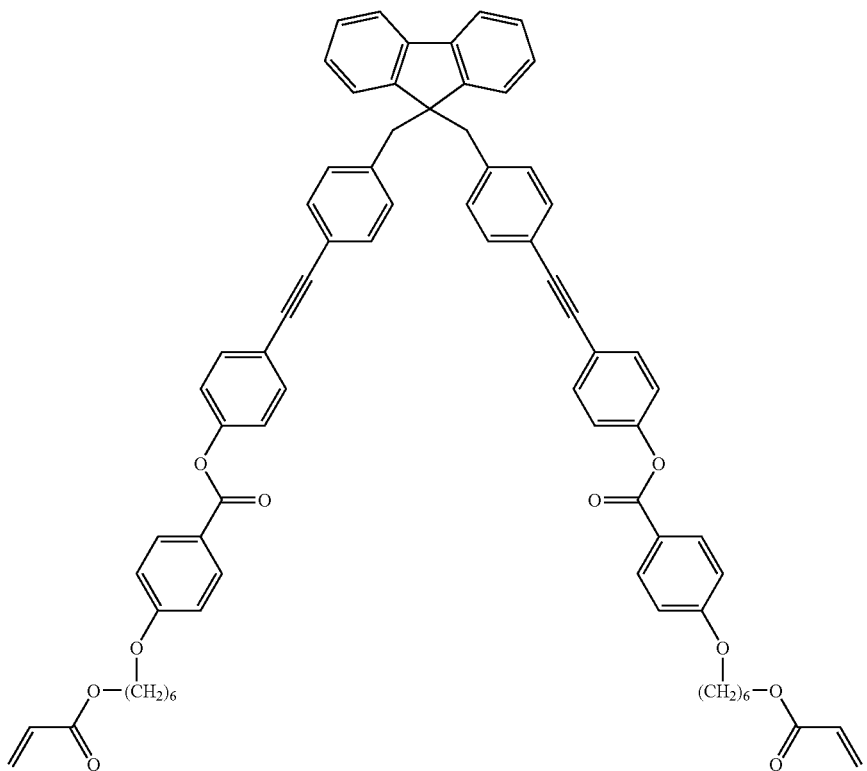
(1-3)
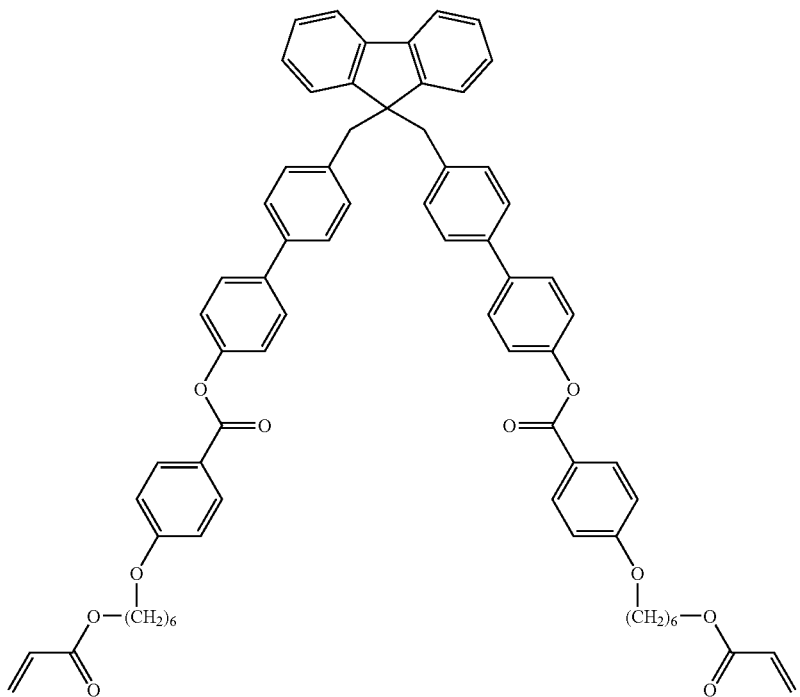

(1-5)
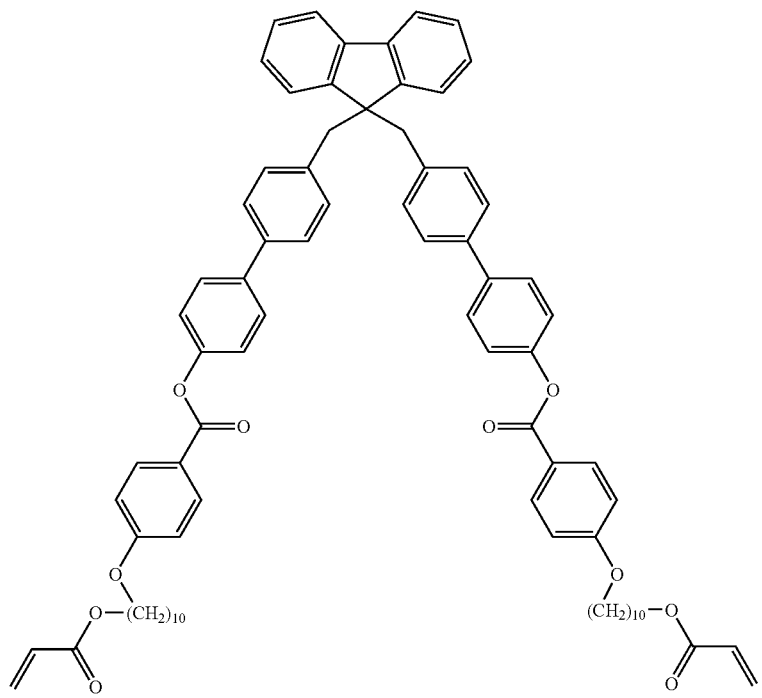
(1-4)
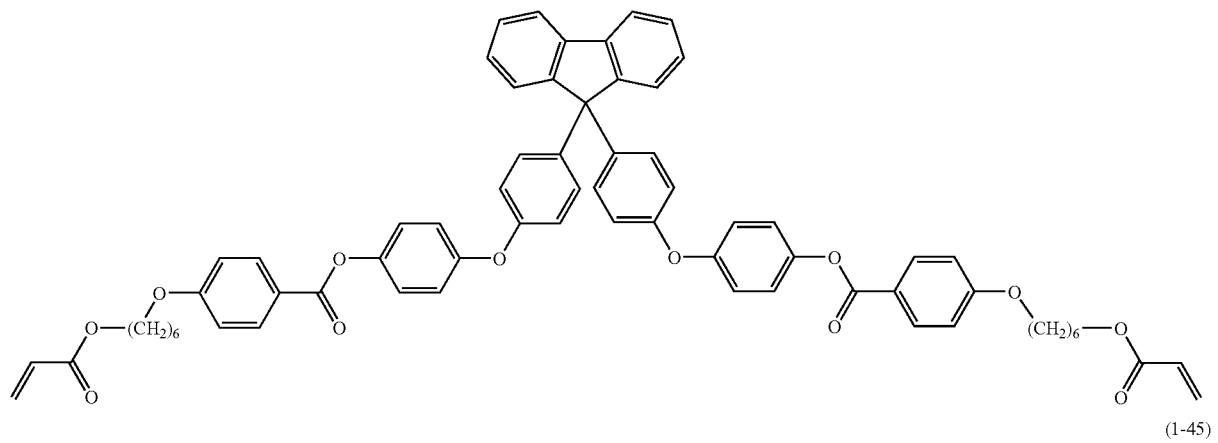
(1-45)
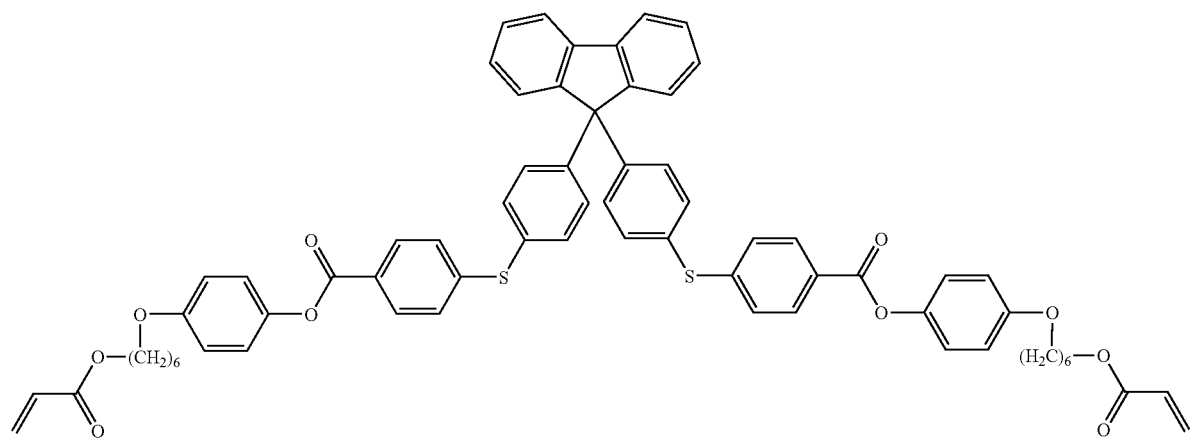

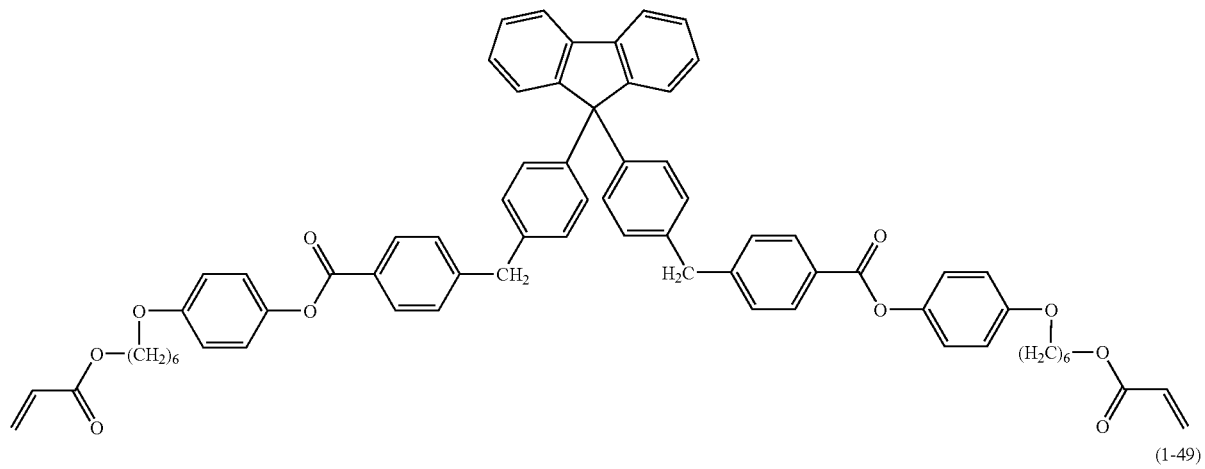

(1-50)

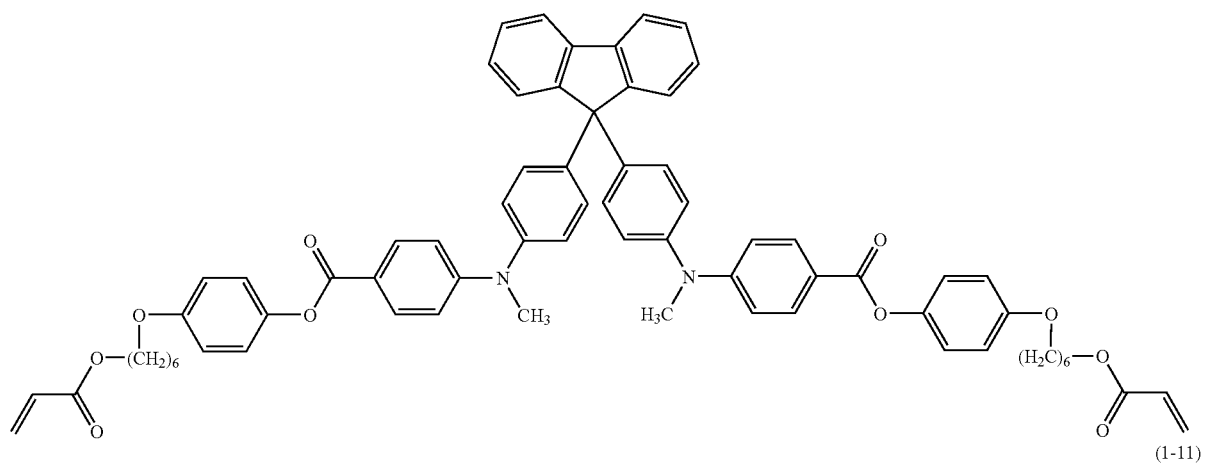

(1-49)

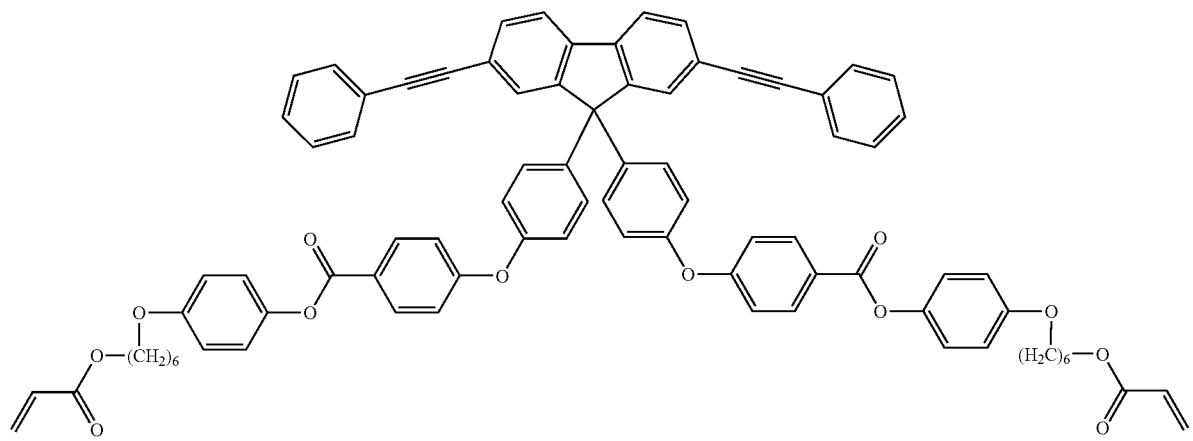

(1-11)

As the method for producing a polymerizable compound in which s=t=0 in the formula (1) like the compound (1-1), there are mentioned, for example, a method in which corresponding carbonyl compounds are used as compound giving structures of C1, D1 and D2, and halides of compounds containing A1(A2), B1(B2), X1(X2), E1(E2) and P1(P2) are allowed to act on the carbonyl compounds to cause dehydration condensation, and other methods. Compounds containing A1(A2), B1(B2), X1(X2), E1(E2) and P1(P2) can be produced by bonding compounds containing structural units of A1(=A2), B1(=B2), X1(=X2), E1(=E2) and P1(=P2) by a dehydration condensation reaction, esterification reaction, Williamson reaction, Ullmann reaction, benzylation reaction, Sonogashira reaction, Suzuki-Miyaura reaction, Negishi reaction, Kumada reaction, Hiyama reaction, Buchwald-Hartwig reaction, Wittig reaction, Friedel-Craft reaction, Heck reaction, Aldol reaction and the like.

As the method for producing a polymerizable compound in which (G1)s and (G2)t in the formula (1) represent methylenes like the compound (1-2), there are mentioned, for example, a method in which benzyl halides having iodine in a benzene ring as a compound giving structural units of C2 and A1 (C3 and A2) are reacted to the above-mentioned carbonyl compounds together with an alkali metal hydroxide to synthesize compounds containing A1(A2), C1, G1(G2), D1 and D2 which are reacted with compounds containing B1(B2), X1(X2), E1(E2) and P1(P2) synthesized separately, a method in which from compounds containing A1, A2, C1, G1, G2, D1 and D2 obtained in the same manner, compounds giving structures of B1(B2), X1(X2), E1(E2) and P1(P2) are reacted sequentially, and other methods.

The composition of the present invention contains structural units derived from the above-mentioned polymerizable compound (1) and rod-shaped polymerizable liquid crystal compound.

The content of the polymerizable compound (1) contained in the composition is usually 50 parts by weight or less, preferably 5 to 30 parts by weight, based on 100 parts by weight of the total amount of the polymerizable compound (1) and rod-shaped polymerizable liquid crystal compound. When the polymerizable compound (1) is contained in the composition, there is a preferable tendency of giving reverse wavelength dispersion to the resulting optical film, and when the content is 50 parts by weight or less, there is a preferable tendency of obtaining more significant retardation value.

When the rod-shaped polymerizable liquid crystal compound (hereinafter, referred to as liquid crystal compound in some cases) is contained in the composition of the present invention, there is a preferable tendency of increase in orientation of the resulting optical film, and its content is usually 50 to 95 parts by weight based on 100 parts by weight of the total amount of the polymerizable compound (1) and rod-shaped polymerizable liquid crystal compound.

In this case, it is preferable that a polymerizable group of P1 and/or P2 contained in the polymerizable compound (1) and a polymerizable group of the liquid crystal compound can mutually react so that the polymerizable compound (1) and the liquid crystal compound copolymerize, and it is particularly preferable that both of them are acryloyl groups since then photo-polymerization is easy.

Specific examples of the liquid crystal compound include compounds having a polymerizable group among compounds described in 3.2 Non-chiral rod-shaped liquid crystal molecule and 3.3 Chiral rod-shaped liquid crystal molecule in chapter 3: Molecular structure and crystallinity in Liquid Crystal Manual (edited by Liquid crystal manual editing committee, Maruzen K.K., published on Oct. 30, 2000(Heisei 12)).

As the liquid crystal compound in the composition of the present invention, several different liquid crystal compounds may be used.

As the liquid crystal compound, compounds of the formulae (3), (4) and (5) are preferable.

P1-E1-B1-A1-B2-A2-B4-A4-B5-E2-P2 (3)

P1-E1-B1-A1-B2-A2-F1 (4)

P1-E1-B1-A1-B2-A2-B3-F1 (5)

(wherein, E1, E2, B1, B2, B3, P1, P2, A1 and A2 represent the same meanings as described above. B4 and B5 represent the same meanings as for the above-described B1, and A4 represents the same meaning as for the above-described A1. F1 represents a linear or branched alkyl group having 1 to 5 carbon atoms, nitrile group, nitro group, trifluoromethyl group, halogen atom such as a fluorine atom and the like, or hydrogen atom).

Among others, (3-1) to (3-6), (4-1), (4-2), (5-1) and (5-2) are preferable because of easy availability.

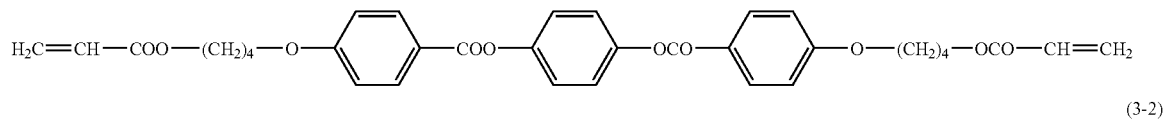

(3-1)

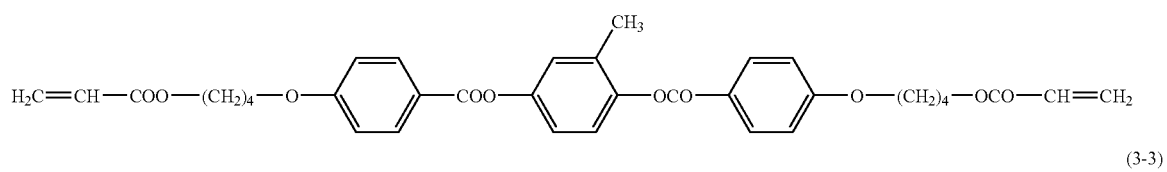

(3-2)

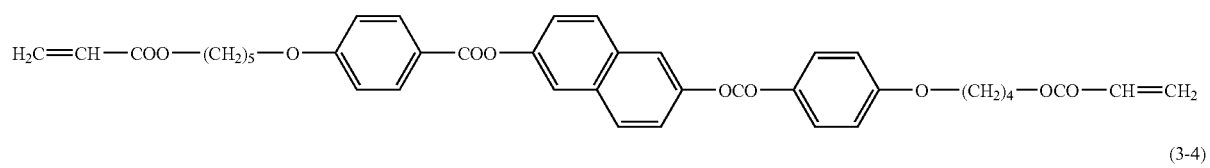

(3-3)

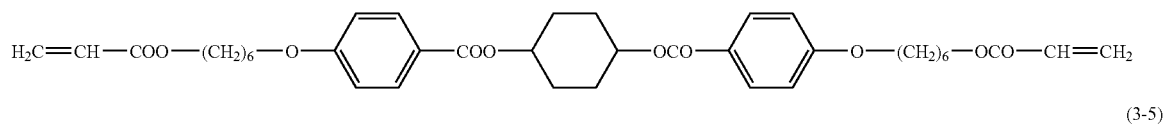

(3-4)

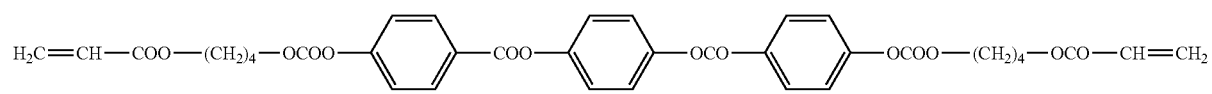

(3-5)

-continued

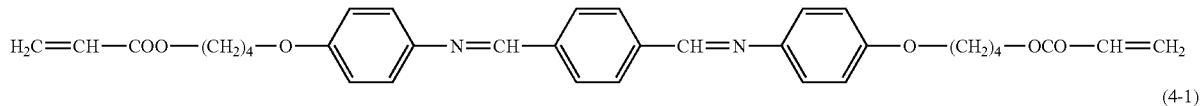

(3-6)

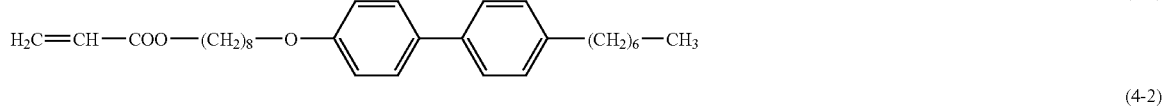

(4-1)

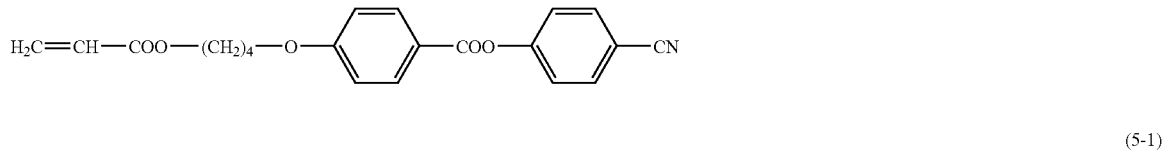

(4-2)

(5-1)

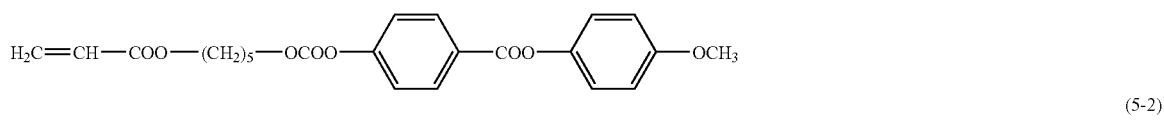

(5-2)

The optical film of the present invention is an optical film containing as a component a polymer containing a structural unit derived from a polymerizable compound of the formula (1) and a structural unit derived from a rod-shaped polymerizable liquid crystal compound, and usually, can be obtained by polymerizing a composition of the present invention.

Specifically, as one example of the method for producing an optical film, a case using a polymer containing a structural unit derived from a polymerizable compound (1) and a structural unit derived from a rod-shaped polymerizable liquid crystal compound, as it is as an optical film, will be described below.

First, to a polymerizable compound (1), liquid crystal compound and organic solvent are added additives such as polymerization initiators, polymerization inhibitors, photosensitizers, cross-linking agents, leveling agents and the like according to demands, to prepare a mixed solution.

Here, the organic solvent is an organic solvent capable of dissolving a polymerizable compound (1), liquid crystal compound and the like, and specifically mentioned are alcohols such as methanol, ethanol, ethylene glycol, propylene glycol and the like; ester-based solvents such as ethyl acetate, butyl acetate, ethylene glycol methyl ether acetate, propylene glycol methyl ether acetate and the like; ketone-based solvents such as acetone, methyl ethyl ketone, methyl isobutyl ketone and the like; hydrocarbon solvents such as pentane, hexane, heptane, toluene, xylene and the like. As the organic solvent, several organic solvents may be used.

The mixed solution is so prepared as to give a viscosity of usually 10 Pa·s or less, preferably about 0.1 to 7 Pa·s, to give easy application.

Subsequently, the mixed solution can be applied on a supporting substrate, and dried and polymerized, to form an intended optical film on the supporting substrate.

When polymerizable groups of P1 and/or P2 and liquid crystal compound are photo-polymerizable, they are polymerized by hardening by irradiation with a light such as visible light, ultraviolet ray, laser beam and the like, and when the polymerizable groups heat-polymerizable, they are polymerized by heating.

From the standpoint of film-formability, photo-polymerization is preferable, and from the standpoint of handling, polymerization by ultraviolet ray is further preferable.

Regarding drying of a solvent, it is preferable, in the case of photo-polymerization, to almost dry a solvent before photo-polymerization for improving film-formability. In the case of heat-polymerization, if polymerization is progressed usually together with drying, and preferably, most of a solvent is dried before polymerization, there occurs a tendency of more excellent film-formability.

As the method for drying a solvent, there are mentioned, for example, natural drying, air circulation drying, drying under reduced pressure and the like.

The drying temperature is usually about 10 to 120° C. preferably, about 40 to 80° C.

As the method for applying on a supporting substrate, there are mentioned, for example, an extrusion coating method, direct gravure coating method, reverse gravure coating method, CAP coating method, die coating method and the like. Further, methods of application using coaters such as a dip coater, bar coater, spin coater and the like can also be applied.

As the supporting substrate, there are usually mentioned plates of metals such as aluminum, stainless and the like, glass plates, transparent films and the like which provide a smooth surface. Here, mentioned as the transparent film are films of polyolefins such as polyethylene, polypropylene, norbornene-based polymer and the like, polyvinyl alcohol film, polyethylene terephthalate film, polymethacrylate film, polyacrylate film, cellulose ester film and the like.

A method for forming an alignment layer on a supporting substrate and coating a mixed solution is preferably used. By this method, the orientation direction of the resulting polymer can be controlled. Here, as the alignment layer, there are mentioned those obtained by forming a membrane using a polyimide produced by calcining soluble polyimide or polyamic acid at 100° C. to 200° C. to cause imidation, alkyl-modified polyvinyl alcohol, gelatin and the like and performing a rubbing treatment on this membrane using cloth of nylon and the like, and those obtained by performing a polarization UV treatment on a photo-sensitive polyimide, and the like.

As the alignment layer, commercially available alignment layers may be used as they are. As the commercially available alignment layer, SUNEVER (registered trademark, manufactured by Nissan Chemical Industries, Ltd.), OPTOMER (registered trademark, manufactured by JSR) and the like are mentioned as those obtained by performing a polarization UV treatment on a photo-sensitive polyimide, and POVAL (registered trademark, manufactured by Kuraray Co., Ltd.) and the like are mentioned as the modified polyvinyl alcohol.

If an alignment layer is formed on a supporting substrate, when a mixed solution prepared by dissolving a composition of the present invention in an organic solvent is coated on an alignment layer and dried, an un-polymerized film is obtained, and this un-polymerized film shows liquid crystal phase such as nematic phase and the like, and manifests birefringence by mono-domain orientation. This un-polymerized film is oriented at lower temperatures of usually about 10 to 120° C., preferably, from 25 to 80° C., thus, use can be made of a supporting substrate which is not necessarily sufficient regarding heat resistance as exemplified above as the alignment layer, and after orientation, crystallization is not caused even if cooled further to about 30 to 10° C. By this, an optical film manifesting birefringence is obtained by an industrially remarkably excellent method which can cause photo-polymerization at lower temperatures even if heat-polymerization is not used.

By appropriately controlling the amount of application liquid of a mixed solution and concentration of application liquid thereof, membrane thickness can be regulated so as to give a desired retardation. The retardation value (retardation value, Re(λ)) of the resulting optical film is determined as shown in the formula (6), thus, it is recommendable to control the membrane thickness d to obtain desired Re(λ).

$$Re(\lambda) = d \times \Delta n(\lambda) \quad (6)$$

(wherein, Re(λ) represents a retardation value at a wavelength of λ nm, d represents membrane thickness, and Δn(λ) represents refractive index anisotropy at a wavelength of λ nm)

For obtaining a desired wavelength dispersion property, it may be advantageous that the proportion of a structural unit derived from a polymerizable compound (1) contained in a polymer is controlled, the retardation value of the resulting optical film is measured, and from this result, the content of a structural unit derived from a polymerizable compound (1) is appropriately determined.

Though a usual optical film shows normal wavelength dispersion, if the content of a structural unit derived from a polymerizable compound (1) is increased, the wavelength dispersion property can be optionally converted from the normal wavelength dispersion to reverse wavelength dispersion. Particularly, an optical film made of a polymer containing about parts by weight or more of a structural unit derived from a polymerizable compound (1) based on 100 parts by weight of the total amount of a structural unit derived from a polymerizable compound (1) and a structural unit derived from a rod-shaped polymerizable liquid crystal compound is preferable since it usually shows reverse wavelength dispersion.

Thus, an optical film having an arbitrary wavelength dispersion property is obtained by the present invention.

Thus obtained optical film is excellent in transparency, and used as a film for various displays. Usually, its membrane thickness is usually 0.5 to 10 μm, and for decreasing optical elasticity, 0.5 to 7 μm, preferably 0.5 to 3 μm.

When birefringence is manifested using an alignment layer, the retardation value is usually about 50 to 500 nm, and preferably 100 to 300 nm.

By using a film having such an optical property, all FPDs such as liquid crystal panels, organic ELs and the like can be optically compensated in which reverse wavelength dispersion is necessary in a thin membrane.

For using an optical film of the present invention as a broad band λ/4 plate or λ/2 plate, it may be advantages that the content of a structural unit derived from a polymerizable compound (1) is appropriately selected to attain 0.65≦Re(450)/Re(550)≦1.0 and 1.0≦Re(650)/Re(550)≦1.3, preferably 0.75≦Re(450)/Re(550)≦0.85 and 1.1≦Re(650)/Re(550)≦1.2, particularly preferably Re(450)/Re(550) of about 0.82 and Re(650)/Re(550) of about 1.18, and after control of the content of a structural unit derived from a polymerizable compound (1), the membrane thickness is controlled so that the retardation value Re(550) is, in the case of a λ/4 plate, from 113 to 163 nm, preferably 135 to 140 nm, particularly preferably about 137.5 nm, and in the case of a λ/2 plate, from 250 to 300 nm, preferably 273 to 277 nm, particularly preferably about 275 nm, according to the formula (6).

For the optical film of the present invention to be used as an optical film for VA (Vertical Alignment) mode, it may be advantages that the content of a structural unit derived from a polymerizable compound (1) is appropriately selected to attain preferably 0.65≦Re(450)/Re(550)≦1.0 and 1.0≦Re(650)/Re(550)≦1.3, more preferably 0.75≦Re(450)/Re(550)≦0.85 and 1.1≦Re(650)/Re(550)≦1.2, further preferably Re(450)/Re(550) of about 0.82 and Re(650)/Re(550) of about 1.18, and after control of the content of a structural unit derived from a polymerizable compound (1), the membrane thickness is controlled so that the retardation value Re(550) is preferably from 40 to 100 nm, more preferably about 60 to 80 nm.

The polymer formed on a supporting substrate may be used as an optical film as a laminate with the supporting substrate, or the polymer may be removed from a laminate with the supporting substrate by transferring the surface of the polymer to other transparent film, and the like, to give an optical film composed only of the polymer.

The optical film of the present invention may be as it is used as a reflection reducing film, retardation film, visual field angle enlarging film or optical compensation film.

It may also be combined with other film. Specifically mentioned are an elliptic polarization plate obtained by pasting an optical film of the present invention to a polarizing film, a broad band circularly polarizing plate obtained by further pasting an optical film of the present invention as a broad band λ/4 plate to the elliptic polarization plate, and the like.

The optical film of the present invention shows an excellent optically property even if used alone, however, several films may also be laminated.

The optical film of the present invention can be used in displays such as a flat panel display (FPD) and the like.

As the flat panel display (FPD), specifically mentioned are liquid crystal displays (LCD) obtained by sandwiching a liquid crystal material between two transparent base plates carrying thereon an electrode and an alignment layer formed, applying voltage to drive the liquid crystal molecule, and pasting a polarization plate containing an optical film of the present invention to a liquid crystal display element having an optical shutter effect; organic electroluminescence (organic EL) having a light emitting layer composed of at least one layer of an electrically conductive organic compound formed between a transparent base plate carrying thereon an electrode formed and an electrode of gold, silver, aluminum, platinum and the like or an alloy, and having a broad band circularly polarizing plate containing an optical film of the present invention on the transparent base plate; and the like.

The optical film of the present invention can manifest a desired wavelength dispersion property in any of normal wavelength dispersion and reverse wavelength dispersion, by controlling the amount of a polymerizable compound to be used. Particularly, when a structural unit derived from a polymerizable compound (1) is contained usually in an amount of 5 parts by weight or more based on 100 parts by weight of the total amount of a structural unit derived from a polymerizable compound (1) and a structural unit derived from a rod-shaped polymerizable liquid crystal compound, an optical film can be obtained showing a wavelength dispersion property of [Re(450)/Re(550)]≦1≦[Re(650)/Re(550)], namely, approximate reverse wavelength dispersion. Further, it is also possible to arbitrarily change retardation value by varying the kind and amount of a rod-shaped polymerizable liquid crystal compound.

The optical film of the present invention can manifest desired retardation in a broad band by controlling the content of a structural unit derived from a polymerizable compound in an optical film even without drawing. By this, the optical film of the present invention can be used as a λ/4 plate or λ/2 plate even in the form of single optical film.

The optical film of the present invention can be suitably used as a broad band λ/4 plate of reflection type liquid crystal displays and organic electroluminescence (EL) displays, an optical compensation film for compensating visual field angle of transparent type liquid crystal displays, and the like.

EXAMPLES

The present invention will be illustrated more in detail below based on examples, but it is needless to say that the present invention is not limited to the examples.

Example 1

Synthesis Example 1

Synthesis of Polymerizable Compound (1-1)

Synthesis Examples of ethyl 4-(6-hydroxyhexyloxy)benzoate (a)

150 g (0.90 mol) of ethyl 4-hydroxybenzoate, 186 g (1.35 mol) of potassium carbonate and 750 g of N,N-dimethylacetamide were weighed, and heated up to 80° C. Subsequently, 244 g (1.24 mol) of 6-bromohexanol was dropped over 2 hours, then, the mixture was stirred for 2 hours at 80° C. After cooling, the reaction liquid was poured into ice water, and extracted with ethyl acetate. The ethyl acetate phase was washed with water, then, the solvent was distilled off under reduced pressure to obtain 312 g of white solid containing ethyl 4-(6-hydroxyhexyloxy)benzoate (a) as the main component. As a result of analysis, (a) was obtained approximately quantitatively.

Synthesis Example of 4-(6-hydroxyhexyloxy)benzoic acid (b)

312 g of white solid obtained above containing (a) as the main component was dissolved in methanol. Subsequently, a methanol solution containing potassium hydroxide in saturated condition (potassium hydroxide 328 g (5.85 mol)) was dropped, and the mixture was stirred for 8 hours at about 70° C. After cooling, the precipitated white solid was filtrated off while washing with diethyl ether, then, dissolved in water. To this was added 600 g of 36% hydrochloric acid slowly. The precipitated white solid was filtrated off while washing with water, and dried under reduced pressure at 50° C. to obtain 195 g (0.82 mol) of white solid containing 4-(6-hydroxyhexyloxy)benzoic acid (b) as the main component. The yield was 91% based on (a).

Synthesis Example of 4-(6-acryloxyhexyloxy)benzoic acid (c)

An atmosphere in a vessel accommodating 195 g (0.82 mol as (b)) of white solid obtained above containing (b) as the main component and 208 g of N,N-dimethylaniline was purged with nitrogen, then, the contents were dissolved with 1,4-dioxane. The reaction solution was heated up to 70° C., and 148 g (1.64 mol) of acrylic chloride was dropped over 30 minutes, further, the mixture was stirred for 2 hours. After cooling, the reaction liquid was poured into ice water, and extracted with ethyl acetate, and the ethyl acetate phase was washed with water, then, the solvent was distilled off under reduced pressure to obtain 120 g (0.41 mol) of white solid containing 4-(6-acryloxyhexyloxy)benzoic acid (c) as the main component. The yield was 50% based on (b).

Synthesis of Polymerizable Compound (1-1)

A vessel accommodating 1.17 g (4.00 mmol as (c)) of white solid obtained above containing (c) as the main component was purged with nitrogen, then, the content was dissolved in chloroform, subsequently, 0.95 g (7.50 mmol) of oxalyl dichloride was added and the mixture was stirred for 2 hours at room temperature. The solvent and excessively added oxalyl dichloride were distilled off under reduced pressure, then, the residue was dissolved again in chloroform. Next, to this solution was added 0.53 g (1.51 mmol) of 9,9-bis(4-hydroxyphenyl)fluorene and the mixture was cooled to 0° C., then, 0.46 g (4.55 mmol) of triethylamine was dropped over 10 minutes, and the mixture was further stirred for 2 hours at room temperature. This reaction solution was diluted with ethyl acetate and washed with water. The solvent was distilled off, then, the resulting coarse product was separated and purified by a silica gel column, to obtain 0.86 g (0.96 mmol) of a polymerizable compound (1) as colorless viscous liquid. The yield was 64% based on (c).

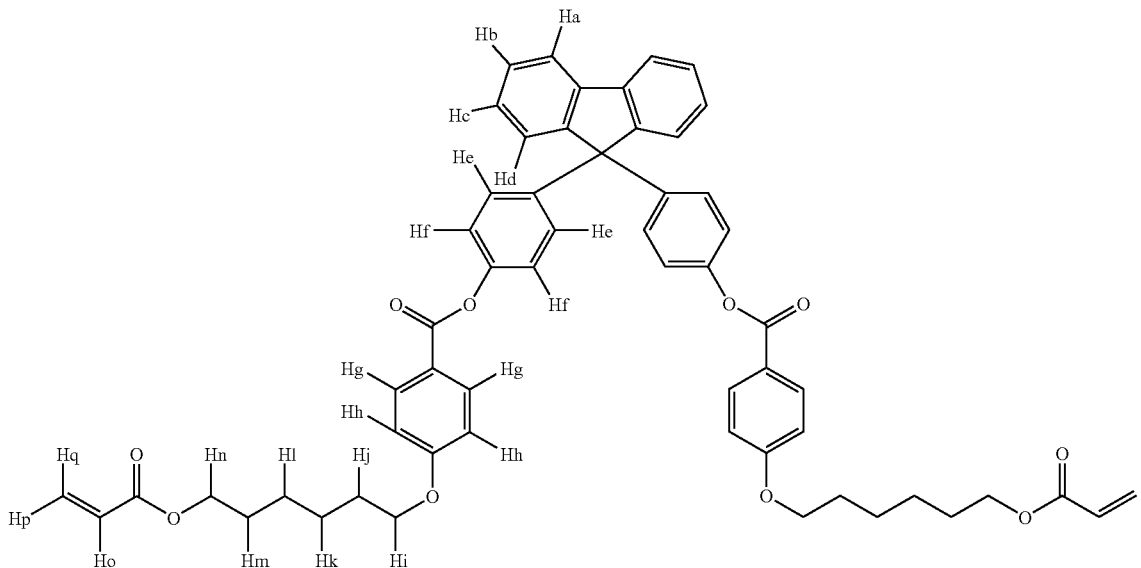

(1-1)

¹H NMR (ppm) of polymerizable compound (1-1): δ 1.5 (4Hk+4Hl), 1.72 (4Hm), 1.83 (4Hj), 4.03 (4Hi), 4.18 (4Hn), 5.81 (2Hp), 6.12 (2Ho), 6.40 (2Hq), 6.95 (4Hh), 7.06 (4Hf), 7.30 (4He), 7.2-7.4 (2Hb+2Hc+2Hd), 7.78 (2Ha), 8.10 (4Hg)

Production Example of Rod-Shaped Polymerizable Liquid Crystal Compound (3-3)

Synthesis Example of 4-(6-acryloxypentyloxy)benzoic acid (j)

White solid containing (j) as the main component was obtained according to procedures described in [Example 1] Compounds (a) to (c) excepting the use of 5-bromopentanol as a raw material. The total yield of the three processes was 31% based on ethyl 4-hydroxybenzoate.

A vessel accommodating 3.5 g (13.2 mmol) of the obtained white solid containing (j) as the main component was purged with nitrogen, then, the content was dissolved in chloroform, subsequently, 1.9 g (15.0 mmol) of oxalyl dichloride was added and the mixture was stirred for 2 hours at room temperature. The solvent and excessively added oxalyl dichloride were distilled off under reduced pressure, then, the residue was dissolved again in chloroform. Next, to this solution was added 0.96 g (6.0 mmol) of 2,6-dihydronaphthalene and the mixture was cooled to 0° C., then, 0.73 g (7.2 mmol) of triethylamine was dropped over 10 minutes, and the mixture was further stirred for 2 hours at room temperature. This reaction solution was diluted with ethyl acetate and washed with water. The solvent was distilled off, then, the resulting coarse product was separated and purified by a silica gel column, to obtain 2.9 g (4.3 mmol) of a rod-shaped polymerizable liquid crystal compound (3-3) as colorless viscous liquid. The yield was 72% based on 2,6-dihydronaphthalene.

Production Example 1 of Optical Film

On a glass base plate, a polyimide alignment layer (SE-5291, manufactured by Nissan Chemical Industries, Ltd.) was applied, then, dried and annealed to obtain a membrane having a thickness of 138 nm. Subsequently, a rubbing treatment was performed, then, on the rubbing-treated surface, application liquid having a formulation in Table 5 was applied by a spin coat method, and dried for 1 minute at 55° C. The resultant un-polymerized film was observed by a polarization microscope to confirm mono-domain. Subsequently, irradiation with ultraviolet ray was carried out to obtain an optical film having a thickness of 1.5 μm.

TABLE 5

| Formulation of application liquid | |
|---|---|
| Component | wt % |
| Polymerizable compound (1-1) | 10 |
| Rod-shaped polymerizable liquid crystal compound (3-3) | 10 |
| Photo-polymerizable initiator *1 | 2.5 |
| Leveling agent | 0.5 |
| Propylene glycol monomethyl ether acetate | 77 |

*1: Irgacure 907 (manufactured by Ciba Specialty Chemicals) (Measurement of wavelength dispersion property)

In the wavelength range from 450 nm to 700 nm, the wavelength dispersion of the produced optical film was measured using a measuring machine (KOBRA-WR, manufactured by Oji Keiki Kiki K.K.). The result is shown in FIG. 1. [Re(450)/Re(550)] which is a ratio of the retardation value Re(450) at a measuring wavelength of 450 nm to the retardation value Re(550) measured at a measuring wavelength of 550 nm was 0.77, and the ratio [Re(650)/Re(550)] of the retardation value Re(650) at a measuring wavelength of 650 nm to the retardation value Re(550) measured at a measuring wavelength of 550 nm was 1.12.

Production Example of Broad Band λ/4 Plate and Broad Band λ/2 Plate

Using the solution used in Example 1, the membrane thickness and the retardation value can be controlled to 3.8 μm and 138 nm respectively to obtain a broad band λ/4 plate, and the membrane thickness and the retardation value can be controlled to 7.6 μm and 276 nm respectively to obtain a broad band λ/2 plate.

The above-mentioned λ/4 plate shows a retardation of about λ/4 at 450 nm, 550 nm and 650 nm, and the above-mentioned λ/2 plate shows a retardation of about λ/2 at 450 nm, 550 nm and 650 nm.

Example 2

Production Example 2 of Optical Film

An optical film was produced in the same manner as in Example 1 (Production Example 1 of optical film) excepting the use of application liquid in Table 6.

Figure 2:
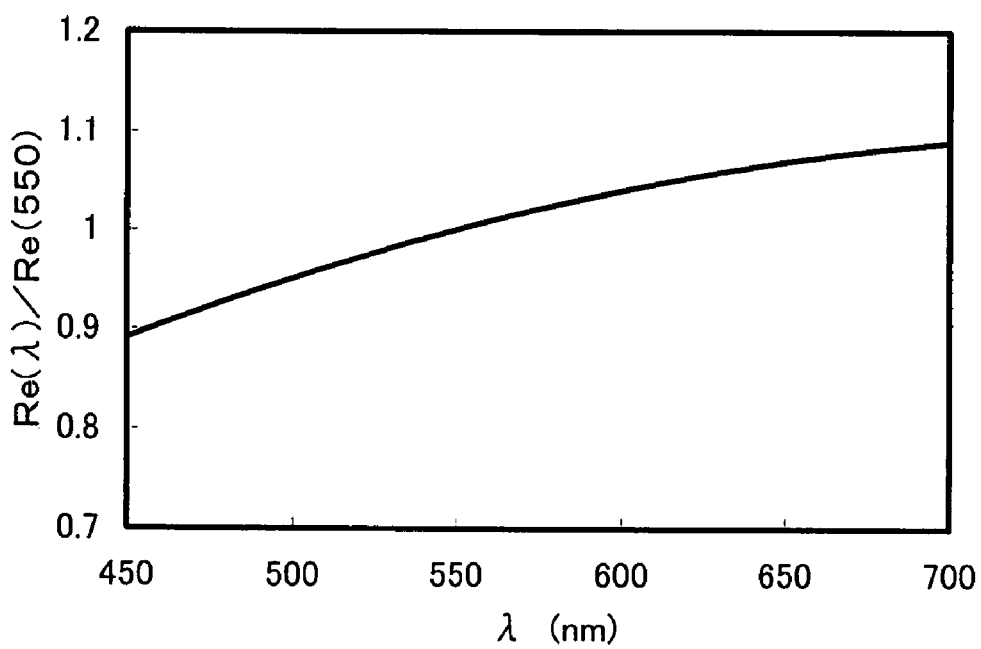
FIG. 2 is a graph showing the wavelength dispersion property of an optical film produced in Example 2.

The wavelength dispersion from 450 nm to 700 nm of the resulting optical film was measured in the same manner as in Example 1, and the result is shown in FIG. 2. [Re(450)/Re(550)] was 0.89 and [Re(650)/Re(550)] was 1.07.

TABLE 6

| Formulation of application liquid | |
|---|---|
| Component | wt % |
| Polymerizable compound (1-1) | 6.67 |
| Rod-shaped polymerizable liquid crystal compound (3-3) | 13.33 |
| Photo-polymerizable initiator *1 | 2.5 |
| Leveling agent | 0.5 |
| Propylene glycol monomethyl ether acetate | 77 |

*1: Irgacure 907 (manufactured by Ciba Specialty Chemicals)

Example 3

Production Example 3 of Optical Film

An optical film was produced in the same manner as in Example 1 (Production Example 1 of optical film) excepting the use of application liquid in Table 7.

Figure 3:
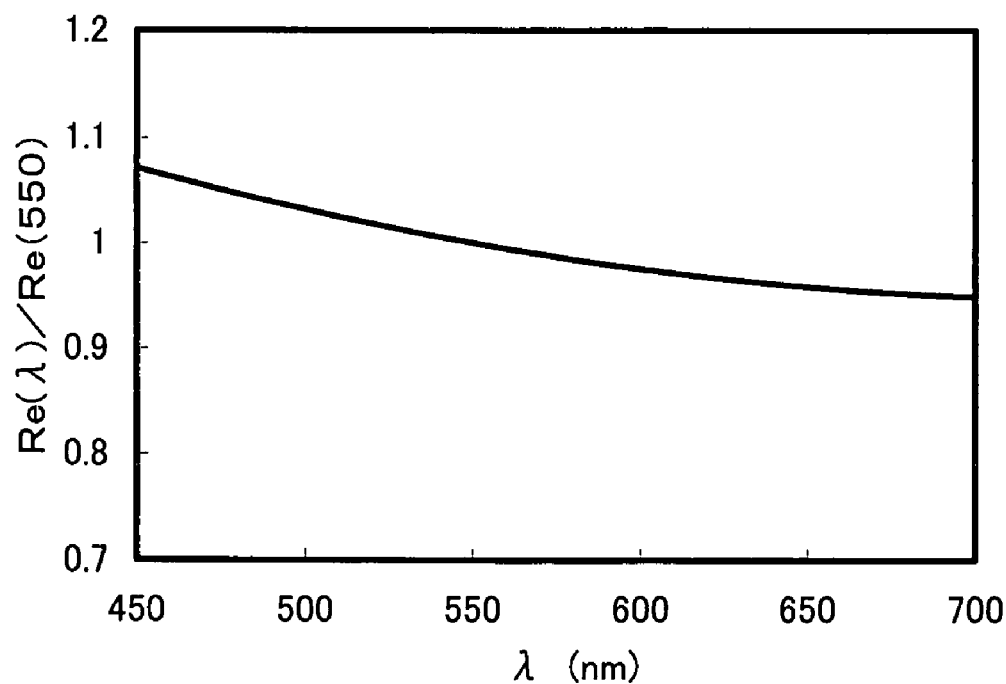
FIG. 3 is a graph showing the wavelength dispersion property of an optical film produced in Example 3.

The wavelength dispersion from 450 nm to 700 nm of the resulting optical film was measured in the same manner as in Example 1, and the result is shown in FIG. 3. [Re(450)/Re(550)] was 1.07 and [Re(650)/Re(550)] was 0.96.

TABLE 7

| Formulation of application liquid | |
|---|---|
| Component | wt % |
| Polymerizable compound (1-1) | 3.35 |
| Rod-shaped polymerizable liquid crystal compound (3-3) | 16.65 |
| Photo-polymerizable initiator *1 | 2.5 |
| Leveling agent | 0.5 |
| Propylene glycol monomethyl ether acetate | 77 |

*1: Irgacure 907 (manufactured by Ciba Specialty Chemicals)

Example 4

Synthesis Example of 9,9-di(4-iodobenzyl)fluorene (d)

1.0 g (5.9 mmol) of fluorene and 0.11 g (0.6 mmol) of benzyltrimethylammonium chloride were weighed and dissolved in 40 ml of DMSO. 2.4 ml of 50%-NaOH was added and the mixture was stirred. After 5 minutes, 3.7 g (11.8 mmol) of 4-iodobenzyl bromide was added, and the mixture was stirred further for 2 hours. 50 ml of ethyl acetate was added, then, the mixture was washed with water and saturated saline. After concentration, re-crystallization was performed to obtain 1.75 g (2.9 mmol) of (d). The yield was 49% based on fluorene.

Synthesis Example of 9,9-di(4-acetylenylbenzyl)fluorene (e)

2.1 g (3.5 mmol) of (d) obtained above, 0.21 g (0.17 mmol) of tetrakistriphenylphosphine palladium and 0.34 g (1.7 mmol) of copper iodide were weighed and dissolved in 12 mol of dioxane. 1.2 ml (8.4 mmol) of trimethylsilylacetylene and 1.5 ml (8.7 mmol) of diisopropylethylamine were added and the mixture was stirred for 2 hours. The mixture was diluted with 30 ml of ethyl acetate, then, washed with water and saturated saline, and the solvent was distilled off. The resulting coarse product was dissolved in 20 ml of THF, and 5.3 ml (5.3 mmol) of a tetrabutylammonium fluoride-THF solution was added and the resulting mixture was stirred for 2 hours. The solvent was distilled off, then, the residue was dissolved in 30 ml of ethyl acetate, and washed with water and saturated saline. The solvent was distilled off, then, the resulting coarse product was separated and purified by column chromatography to obtain 0.86 g (2.2 mmol) of (e). The yield was 62% based on (d).

Synthesis Example of 9,9-di(4-(4-hydroxyphenyl)acetylenylbenzyl)fluorene (f)

0.2 g (0.48 mmol) of (e) obtained above, 0.31 g (1.01 mmol) of 4-iodophenol-O-tetrahydropyranyl ether, 0.026 g (0.096 mmol) of triphenylphosphine, 0.056 g (0.048 mmol) tetrakistriphenylphosphine palladium and 0.23 g (1.2 mmol) of copper iodide were weighed and dissolved in 1.6 ml of dioxane and 0.21 ml (1.2 mmol) of diisopropylethylamine. The mixture was stirred for 2 hours, then, 3 ml of ethyl acetate was added, and the resulting mixture was washed with water and saturated saline. The solvent was distilled off, then, the residue was dissolved again in 5 ml of acetone, and 0.027 g (0.14 mmol) of p-toluenesulfonic acid was added. The mixture was stirred for 3 hours, then, 10 ml of a saturated sodium hydrogen carbonate aqueous solution was added and the resulting mixture was extracted with ethyl acetate. The solvent was distilled off, then, the resulting coarse product was separated and purified by column chromatography to obtain 0.14 g (0.24 mmol) of (f). The yield was 49% based on (e).

Synthesis Example of Polymerizable Compound (1-2)

A vessel accommodating 0.18 g (0.6 mmol) of white solid obtained in Example 1 containing (c) as the main component was purged with nitrogen, then, the content was dissolved in chloroform, subsequently, 0.12 g (1.0 mmol) of oxalyl dichloride and several drops of dimethyl sulfoxide were added and the mixture was stirred for 2 hours at room temperature. The solvent and excessively added oxalyl dichloride were distilled off under reduced pressure, then, the residue was dissolved again in chloroform. Next, to this solution was added 0.15 g (0.24 mmol) of (f) obtained above and the mixture was cooled to 0° C., then, 0.10 ml (0.6 mmol) diisopropylethylamine was dropped over 1 minute, and the mixture was further stirred for 2 hours at room temperature. This reaction solution was diluted with ethyl acetate and washed with water. The solvent was distilled off, then, the resulting coarse product was separated and purified by silica gel column to obtain 0.04 g (0.035 mmol) of a polymerizable compound (1-2) in the form of white solid. The yield was 15% based on (f).

(1-2)

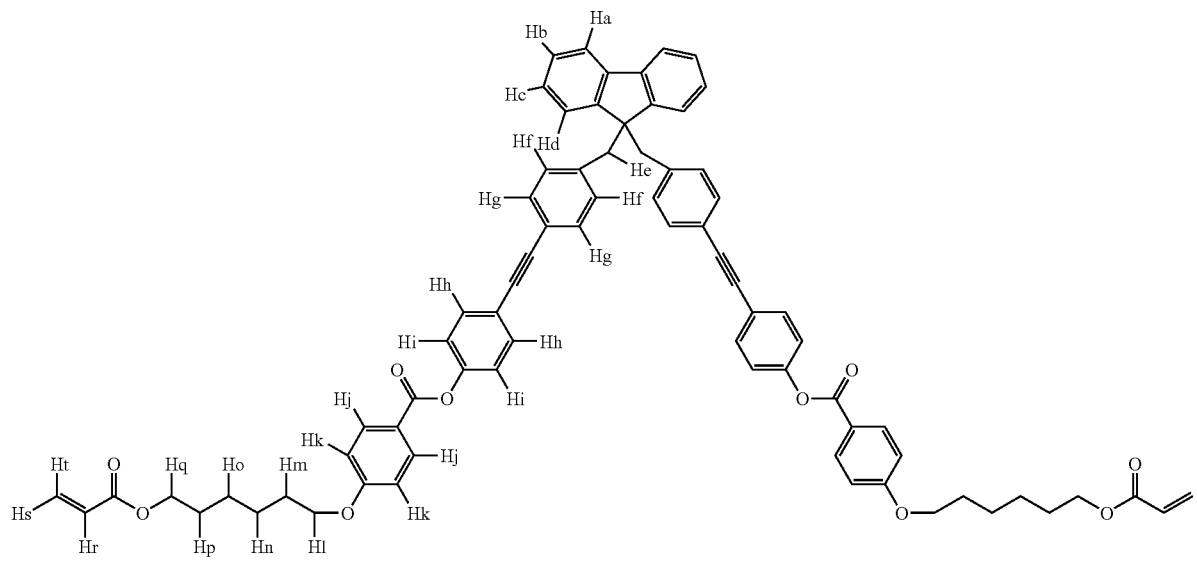

¹H NMR (ppm) of polymerizable compound (1-2): d 1.5 (4Hn+4Ho), 1.72 (4Hp), 1.85 (4Hm), 3.39 (4He), 4.06 (Hl), 4.18 (Hq), 5.81 (2Hs), 6.15 (2Hr), 6.40 (2Ht), 6.63 (4Hh), 6.96 (4Hg), 7.08 (4Hf), 7.15 (4Hi), 7.2 (2Hb+2Hc), 7.4 (2Ha+2Hd), 7.48 (4Hk), 8.11 (4Hj)

Production Example 4 of Optical Film

An optical film was produced in in the same manner as in Example 1 (Production Example 1 of optical film) excepting the use of application liquid in Table 8

The retardation value of the resulting optical film was measured using a measuring machine (KOBRA-WR, manufactured by Oji Keiki Kiki K.K.), to find Re of 164 nm at a measuring wavelength of 585.6 nm.

Figure 4:
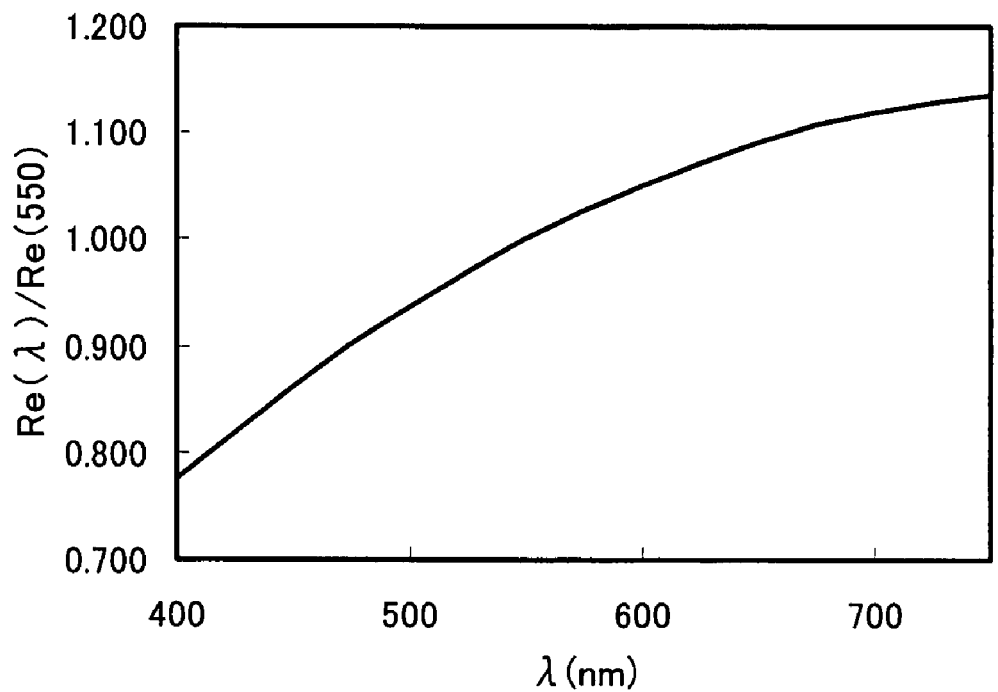
FIG. 4 is a graph showing the wavelength dispersion property of an optical film produced in Example 4.

The wavelength dispersion from 450 nm to 700 nm was measured in the same manner as in Example 1, and the result is shown in FIG. 4. [Re(450)/Re(550)] was 0.86 and [Re(650)/Re(550)] was 1.09.

The thickness derived from the polymerizable compound of the optical film was measured by a laser microscope (LEXT, manufactured by Olympus Optical Co., Ltd.) to find a value of 1.38 μm.

TABLE 8

| Formulation of application liquid | |
|---|---|
| Component | wt % |
| Polymerizable compound (1-2) | 4.0 |
| Rod-shaped polymerizable liquid crystal compound (3-3) | 15.9 |
| Photo-polymerizable initiator *1 | 0.6 |
| Leveling agent | 0.03 |
| Propylene glycol monomethyl ether acetate | 79.5 |

*1: Irgacure 907 (manufactured by Ciba Specialty Chemicals)

Example 5

Synthesis Example of 9,9-di(4-(4-hydroxyphenyl)benzyl)fluorene (g)

5.0 g (8.3 mmol) of 9,9-di(4-iodobenzyl)fluorene synthesized in Example 4, 2.7 g (19.9 mmol) of 4-hydroxyboronic acid, 0.19 g (0.83 mmol) palladium acetate, 0.44 g (1.7 mmol) triphenylphosphine and 8.25 g (24.8 mmol) of cesium carbonate were dissolved in 27 ml (0.3 mol/l) of dimethylformamide, and the mixture was stirred for 2 hours at 80° C. under a nitrogen atmosphere. The mixture was diluted with 100 ml of ethyl acetate and 50 ml of water, then, the precipitate was filtrated off. The filtrate was washed with water and saturated saline, and the solvent was distilled off. The resulting coarse product was separated and purified by column chromatography. The resulting product was purified again by re-crystallization (ethyl acetate+diethyl ether), to obtain 1.4 g of (g). The yield was 33% based on (d).

Synthesis Example of Polymerizable Compound (1-3)

A vessel accommodating 1.62 g (5.3 mmol) of white solid obtained in Example 1 containing (c) as the main component was purged with nitrogen, then, the content was dissolved in chloroform, subsequently, 1.2 g (9.7 mmol) of oxalyl dichloride and several drops of dimethyl sulfoxide were added and the mixture was stirred for 2 hours at room temperature. The solvent and excessively added oxalyl dichloride were distilled off under reduced pressure, then, the residue was dissolved again in chloroform. Next, to this solution was added 1.43 g (2.4 mmol) of (g) obtained above and the mixture was cooled to 0° C., then, 1.03 ml (6.1 mmol) diisopropylethylamine was dropped over 1 minute, and the mixture was further stirred for 2 hours at room temperature. This reaction solution was diluted with ethyl acetate and washed with water. The solvent was distilled off, then, the resulting coarse product was separated and purified by silica gel column to obtain 0.46 g (0.42 mmol) of a polymerizable compound (1-3) in the form of white solid. The yield was 17% based on (g).

(1-3)

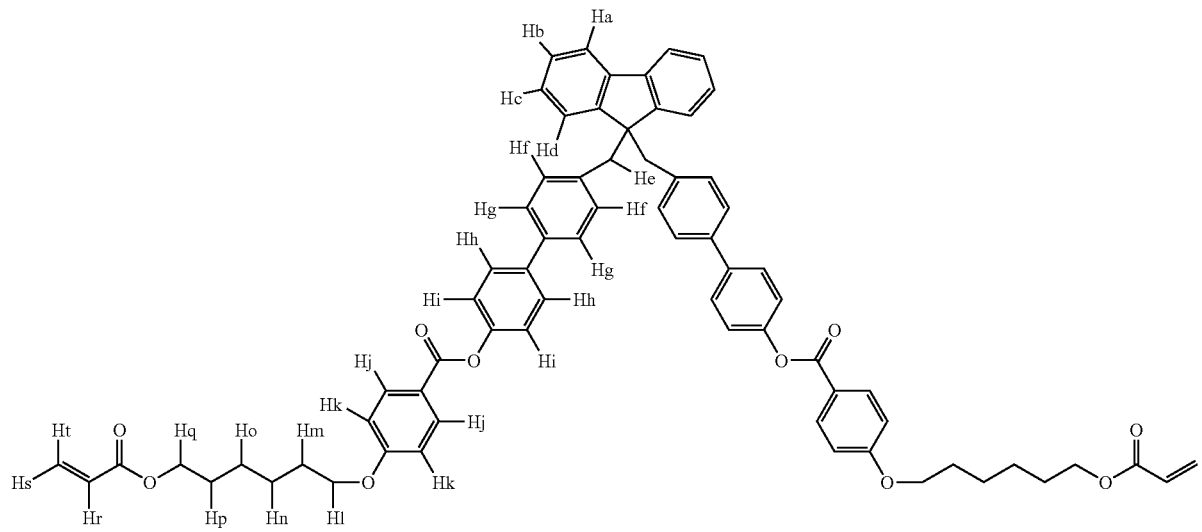

$^1$H NMR (ppm) of polymerizable compound (1-3): d 1.5 (4Hn+4Ho), 1.72 (4Hp), 1.83 (4Hm), 3.43 (4He), 4.04 (Hl), 4.18 (Hq), 5.81 (2Hs), 6.26 (2Hr), 6.58 (2Ht), 6.63 (4Hh), 6.96 (4Hg), 7.08 (4Hf), 7.15 (4Hi), 7.3 (2Hb+2Hc), 7.4 (2Ha+2Hd+4Hk), 8.13 (4Hj)

Production Example 5 of Optical Film

On a TAC film, alkyl-modified polyvinyl alcohol (completely saponified product) was applied, then, dried and annealed to obtain a membrane having a thickness of 105 nm. Subsequently, a rubbing treatment was performed, then, on the rubbing-treated surface, application liquid having a formulation in Table 9 was applied by a bar coat method, and dried for 1 minute at room temperature, then, irradiation with ultraviolet ray was carried out to obtain an optical film.

The retardation value of the resulting optical film was measured using a measuring machine (KOBRA-WR, manufactured by Oji Keiki Kiki K.K.), to find Re of 133 nm at a measuring wavelength of 585.6 nm.

Figure 5:
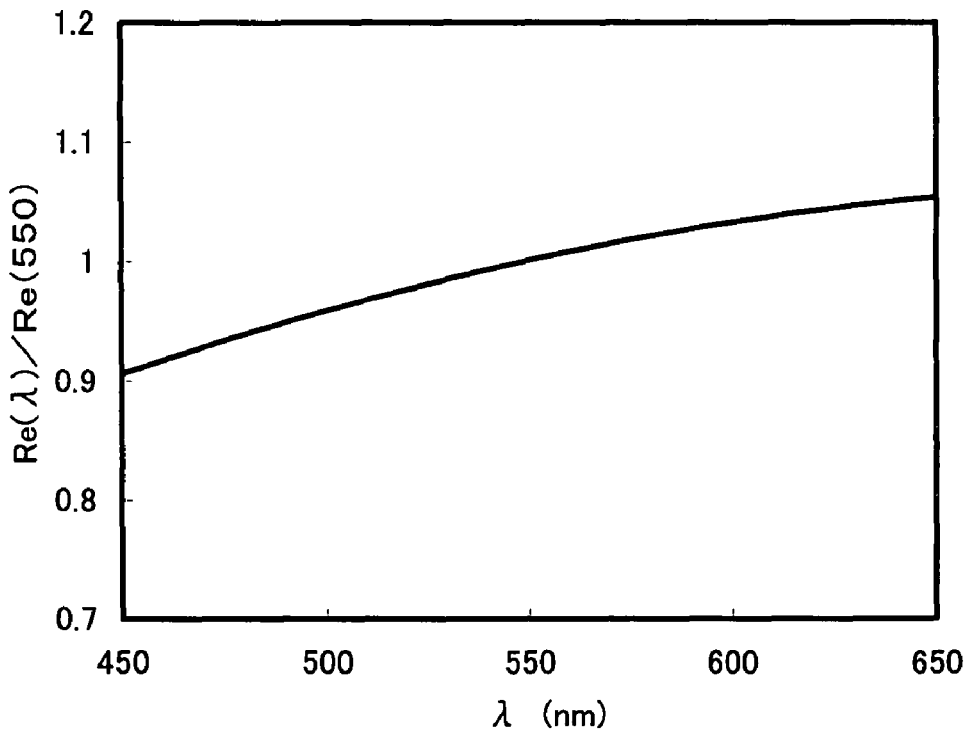
FIG. 5 is a graph showing the wavelength dispersion property of an optical film produced in Example 5.

The wavelength dispersion from 450 nm to 700 nm was measured in the same manner as in Example 1, and the result is shown in FIG. 5. [Re(450)/Re(550)] was 0.91 and [Re(650)/Re(550)] was 1.05.

Further, the thickness derived from the polymerizable compound of the optical film was measured by a laser microscope (LEXT, manufactured by Olympus Optical Co., Ltd.) to find a value of 0.83 μm.

TABLE 9

| Formulation of application liquid | |
|---|---|
| Component | wt % |
| Polymerizable compound (1-3) | 4.0 |
| Rod-shaped polymerizable liquid crystal compound (3-3) | 15.9 |
| Photo-polymerizable initiator *1 | 0.6 |
| Leveling agent | 0.2 |
| Propylene glycol monomethyl ether acetate | 79.3 |

*1: Irgacure 907 (manufactured by Ciba Specialty Chemicals)

Example 6

Synthesis Example of 4-iodophenol tetrahydropyranyl ether (h)

20 g (89 mmol) of 4-iodophenol was dissolved in 45 ml (2.0 mol/l) of toluene. To this was added 16.4 ml (0.18 mol) of 2,3-dihydroxypyrane and 1.15 g (4.5 mmol) of pyridinium p-toluenesulfonic acid, and the mixture was stirred for 2 hours under a nitrogen atmosphere. After completion of the reaction, a saturated sodium hydrogen carbonate aqueous solution was added and the mixture was extracted with ethyl acetate, then, the organic layer was washed with water, and the solvent was distilled off. As a result, 26.5 g (87.1 mmol) of (h) was obtained. The yield was 98% based on 4-iodophenol.

Synthesis Example of 9,9-di(4-(4-hydroxyphenyloxy)phenyl)fluorene (i)

A vessel containing a mixture of 3.0 g (8.4 mmol) of 9,9-di(4-hydroxyphenyl)fluorene and 10.9 g (33.6 mmol) of (h) synthesized above was purged with nitrogen, then, the content was dissolved in N-methyl-2-pyrrolidone. 14.4 g (42 mmol) cesium carbonate, 2.4 g (16.8 mmol) N,N-dimethylglycine chloride and 3.2 g (16.8 mmol) of copper iodide were added and the mixture was stirred for 2 hours at 120° C. After completion of the reaction, a saturated sodium hydrogen carbonate aqueous solution was added and the precipitate was filtrated off while washing with ethyl acetate. The filtrate was washed with water, then, the solvent was distilled off. The resulting coarse product was separated and purified by column chromatography, to obtain 2.7 g (3.8 mmol) of 9,9-di(4-(4-hydroxyphenyloxy)phenyl)fluorene. This product was dissolved in chloroform and ethanol, and 0.08 g (0.41 mmol) of p-toluenesulfonic acid was added to the solution, and the resulting mixture was stirred for 2 hours at room temperature. After completion of the reaction, a saturated sodium hydrogen carbonate aqueous solution was added and the mixture was extracted with ethyl acetate, the organic layer was washed with water, then, the solvent was distilled off. As a result, 2.5 g (4.3 mmol) of (i) was obtained in the form of white solid. The yield was 51% based on 9,9-di(4-hydroxyphenyl)fluorene.

Synthesis Example of Polymerizable Compound (1-4)

A vessel accommodating 2.33 g (7.6 mmol) of (c) obtained in Example 1 was purged with nitrogen, then, the content was dissolved in chloroform, subsequently, 1.8 g (13.9 mmol) of oxalyl dichloride and several drops of dimethylformamide were added and the mixture was stirred for 2 hours at room temperature. The solvent and excessively added oxalyl dichloride were distilled off under reduced pressure, then, the residue was dissolved again in chloroform. Next, to this solution was added 2.0 g (3.5 mmol) of (i) obtained in (Synthesis Example 4-2) and the mixture was cooled to 0° C., then, 1.5 ml (8.7 mmol) diisopropylethylamine was dropped over 1 minute, and the mixture was further stirred for 2 hours at room temperature. This reaction solution was diluted with ethyl acetate and washed with water. The solvent was distilled off, then, the resulting coarse product was separated and purified by silica gel column to obtain 0.54 g (0.50 mmol) of a polymerizable compound (1-4) in the form of white solid. The yield was 14% based on (i).

Further, the thickness derived from the polymerizable compound of the optical film was measured by a laser microscope (LEXT, manufactured by Olympus Optical Co., Ltd.) to find a value of 0.78 μm.

TABLE 10

| Formulation of application liquid | |
|---|---|
| Component | wt % |
| Polymerizable compound (1-4) | 8.2 |
| Rod-shaped polymerizable liquid crystal compound (3-3) | 19.2 |
| Photo-polymerizable initiator *1 | 0.8 |
| Leveling agent | 0.3 |
| Propylene glycol monomethyl ether acetate | 71.5 |

*1: Irgacure 907 (manufactured by Ciba Specialty Chemicals)

Comparative Example 1

Production Example 7 of Optical Film

An optical film was produced in the same manner as in Example 1 (Production Example 1 of optical film) excepting that application liquid shown in Table 11 not containing the (1-4)

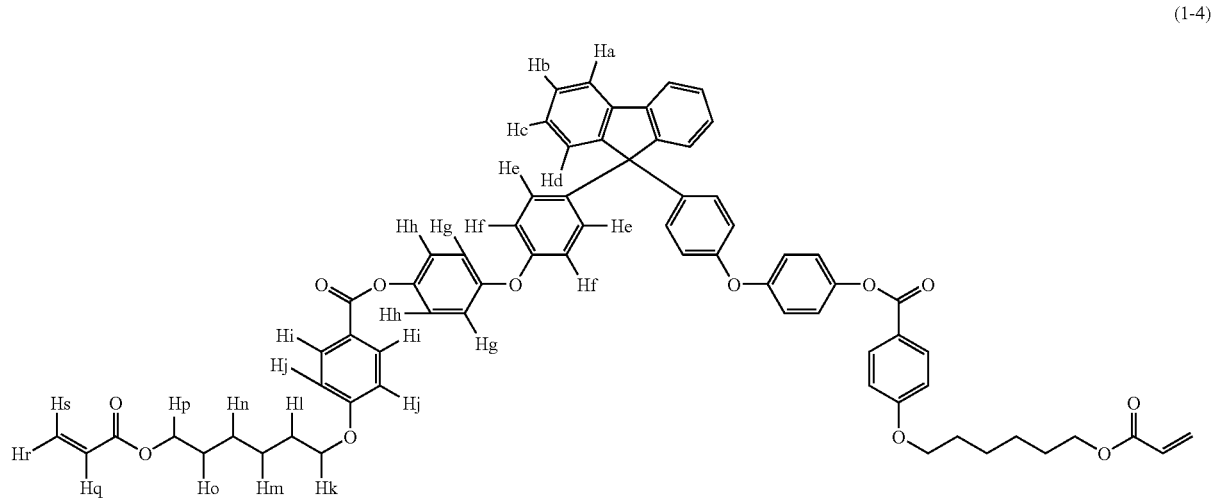

$^1$H NMR (ppm) of polymerizable compound (1-4): δ 1.5 (4Hm+4Hn), 1.74 (4Ho), 1.83 (4Hl), 4.05 (4Hk), 4.18 (4Hp), 5.82 (2Hr), 6.12 (2Hq), 6.44 (2Hs), 6.87 (4Hf), 6.95 (4Hj), 7.02 (4Hg), 7.1-7.2 (4He+4Hh), 7.3-7.4 (2Hb+2Hc+2Hd), 7.76 (2Ha), 8.12 (4Hi)

Production Example 6 of Optical Film

An optical film was produced in the same manner as in Example 1 (Production Example 1 of optical film) excepting the use of application liquid in Table 10.

The retardation value of the resulting optical film was measured using a measuring machine (KOBRA-WR, manufactured by Oji Keiki Kiki K.K.), to find Re of 65 nm at a measuring wavelength of 585.6 nm.

Figure 6:
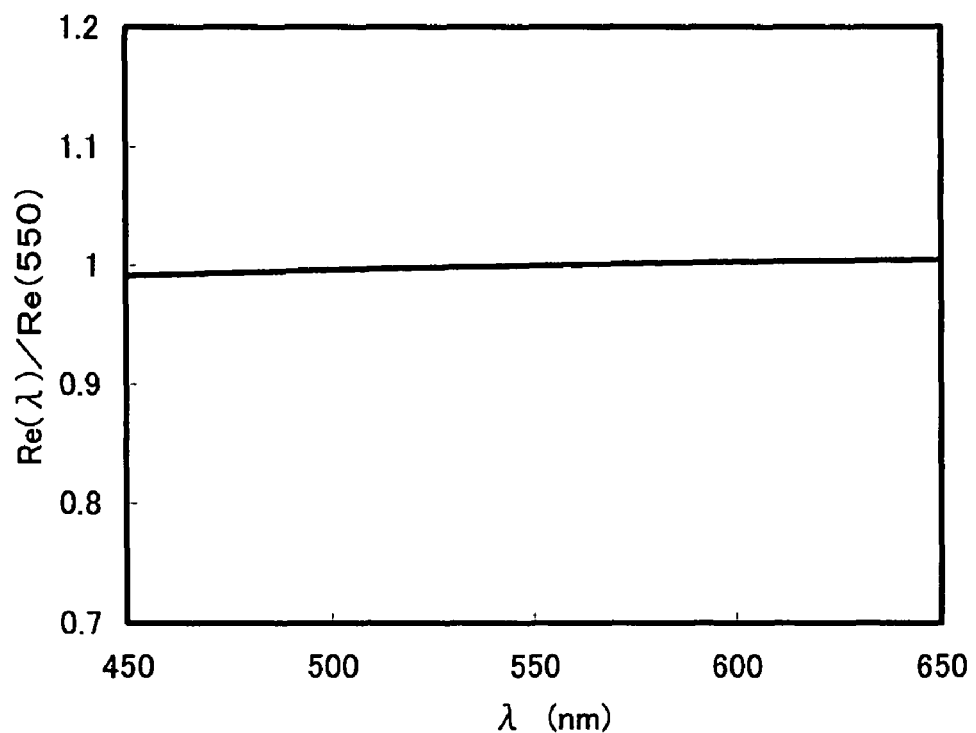
FIG. 6 is a graph showing the wavelength dispersion property of an optical film produced in Example 6.

The wavelength dispersion from 450 nm to 700 nm was measured in the same manner as in Example 1, and the result is shown in FIG. 6. [Re(450)/Re(550)] was 0.98 and [Re(650)/Re(550)] was 1.01.

polymerizable compound (1-1) described in Table 1 was used and the membrane thickness was 0.7 μm.

Figure 7:
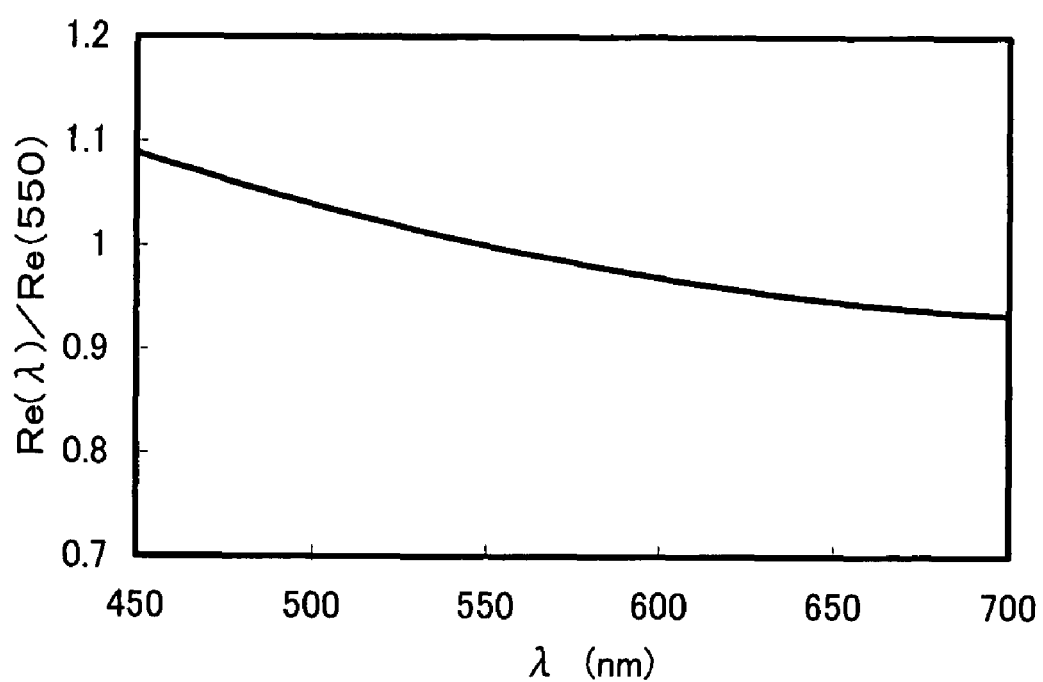
FIG. 7 is a graph showing the wavelength dispersion property of an optical film produced in Comparative Example 1.

The wavelength dispersion from 450 nm to 700 nm of the resulting optical film was measured in the same manner as in Example 1, and the result is shown in FIG. 7. [Re(450)/Re(550)] was 1.09 and [Re(650)/Re(550)] was 0.94.

TABLE 11

| Formulation of application liquid | |
|---|---|
| Component | wt % |
| Rod-shaped polymerizable liquid crystal compound (3-3) | 20 |
| Photo-polymerizable initiator *1 | 0.6 |
| Leveling agent | 0.2 |
| Propylene glycol monomethyl ether acetate | 69.2 |

*1: Irgacure 907 (manufactured by Ciba Specialty Chemicals)

Comparative Example 2

Production Example 8 of Optical Film

An optical film was produced in the same manner as in Example 1 (Production Example 1 of optical film) excepting that application liquid shown in Table 12 not containing a rod-shaped polymerizable liquid crystal compound was used and the membrane thickness was 0.7 μm.

This film was sandwiched between two polarization plates in the cross nicol condition and rotated, to find utterly no color change.

TABLE 12

| Formulation of application liquid | |
| --- | --- |
| Component | wt % |
| Polymerizable compound (1-1) | 20 |
| Photo-polymerizable initiator *1 | 0.6 |
| Leveling agent | 0.2 |
| Propylene glycol monomethyl ether acetate | 69.2 |

*1: Irgacure 907 (manufactured by Ciba Specialty Chemicals)

INDUSTRIAL APPLICABILITY

The polymerizable compound of the present invention provides in a simple manner an optical film having an excellent wavelength dispersion property such as reflection reducing films such as antireflection (AR) films and the like; polarizing films; retardation films; elliptic polarizing films; visual field angle enlarging films; and the like. Also, a desired wavelength dispersion property can be controlled by a simple manner, such as conversion of the wavelength dispersion property of an optical film from normal wavelength dispersion to reverse wavelength dispersion. Further, the optical film of the present invention can be used in flat panel displays (FPD) such as liquid crystal displays (LCD) and organic electroluminescence (EL) and the like.

The invention claimed is:

1. A composition comprising a polymerizable compound of the formula (1) and a rod-shaped polymerizable liquid crystal compound:

$$P2\text{-}E2\text{-}X2\text{-}B2\text{-}A2\text{-}(G2)_t\text{-}Y\text{-}(G1)_s\text{-}A1\text{-}B1\text{-}X1\text{-}E1\text{-}P1 \quad (1)$$

(in the formula (1), Y represents a di-valent group, s and t represent each independently an integer of 0 or 1, G1 and G2 when s and t are 1 represent each independently —CR$^1$R$^2$—, R$^1$ and R$^2$ represent each independently an alkyl group having 1 to 4 carbon atoms, halogen atom or hydrogen atom, A1 and A2 represent each independently a di-valent cyclic hydrocarbon group, di-valent heterocyclic group, methylenephenylene group, oxyphenylene group or thiophenylene group, and to A1 and A2, an alkyl group having 1 to 5 carbon atoms, alkoxy group having 1 to 5 carbon atoms or halogen atom may be bonded, and B1 and B2 represent each independently a di-valent group selected from the group consisting of
—CRR'—, —C≡C—, —CH=CH—, —CH$_2$—CH$_2$—, —O—, —S—, —C(=O)—, —C(=O)—O—, —O—C(=O)—, —O—C(=O)—O—, —C(=S)—, —C(=S)—O—, —O—C(=S)—, —O—C(=S)—O—, —CH=N—, —N=CH—, —N=N—, —N(→O)=N—, —N=N(→O)—, —C(=O)—NR—, —NR—C(=O)—, —OCH$_2$—, —NR—, —CH$_2$O—, —SCH$_2$—, —CH$_2$S—, —CH=CH—C(=O)—O—, —O—C(=)—CH=CH—, and single bond, R and R' represent each independently a hydrogen atom or alkyl group having 1 to 4 carbon atoms, X1 and X2 represent each independently a di-valent group of the formula (2):

(2)

[in the formula (2), A3 represents a di-valent cyclic hydrocarbon group or heterocyclic group, B3 represents the same meaning as for said B1 and B2, and n represents an integer of 1 to 4] E1 and E2 represent each independently an alkylene group having 2 to 25 carbon atoms, and to E1 and E2, an alkyl group having 1 to 5 carbon atoms, alkoxy group having 1 to 5 carbon atoms or halogen atom may further be bonded, and P1 and P2 represent a hydrogen atom or polymerizable group, at least one of P1 and P2 being a polymerizable group).

2. The composition according to claim 1, wherein Y is a di-valent group of the formula (7):

(7)

(wherein, C1 represents a quaternary carbon atom or quaternary silicon atom, D1 and D2 represent each independently a cyclic hydrocarbon group, heterocyclic group or hydrocarbon group having 1 to 5 carbon atoms, D1 and D2 may be connected via a hydrocarbon group having 1 to 5 carbon atoms, amino group, ether group, thioether group, aminoalkyl group, carbonyl group or single bond, and to groups constituting D1 and D2, a hydroxyl group, amino group, thiol group, cyclic hydrocarbon group, linear or branched alkyl group having 1 to 5 carbon atoms, linear or branched alkoxy group having 1 to 5 carbon atoms, trifluoromethyl group, trifluoromethyloxy group, nitrile group, nitro group or halogen atom may be bonded).

3. The composition according to claim 1 or 2 comprising a polymerizable compound (1) wherein, in the formula (1), s and t represent 0, and B1 and B2 represent —CRR'—, —O—, —S— or —NR— (wherein, R and R' represent the same meanings as described above).

4. The composition according to claim 1 or 2 comprising a polymerizable compound (1) wherein, in the formula (1), (G1)s and (G2)t represent a methylene group, and B1 and B2 represent a single bond, —C≡C—, —O—C(=O)—O—, —O—C(=O)— or —O—C(=O)—O—.

5. The composition according to claim 1 wherein Y in the formula (1) represents a di-valent group selected from the group consisting of the formulae (D-1) to (D-18):

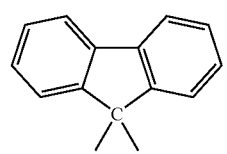
(D-1)

-continued
(D-2) 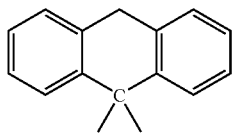
(D-3) 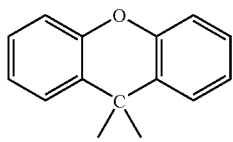
(D-4) 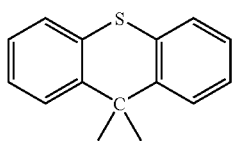
(D-5) 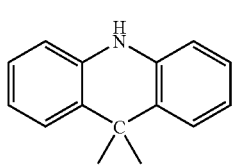
(D-6) 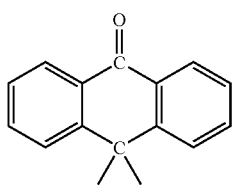
(D-7) 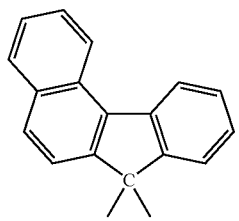
(D-8) 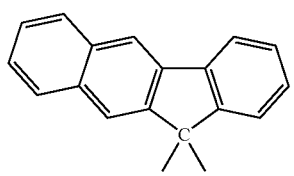
(D-9) 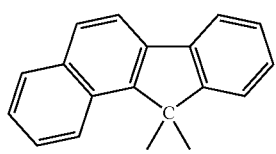
-continued
(D-10) 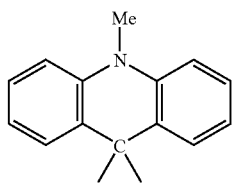
(D-11) 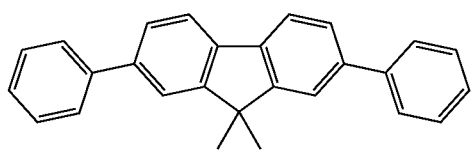
(D-12)
(D-15)
(D-16)
(D-17)
(D-18)
6. The composition according to claim 1 wherein the polymerizable group in the formula (1) is an acryloyl group or methacryloyl group.
7. The composition according to claim 1 wherein the polymerizable compound (1) is at least one compound selected from the group consisting of the following formulae:

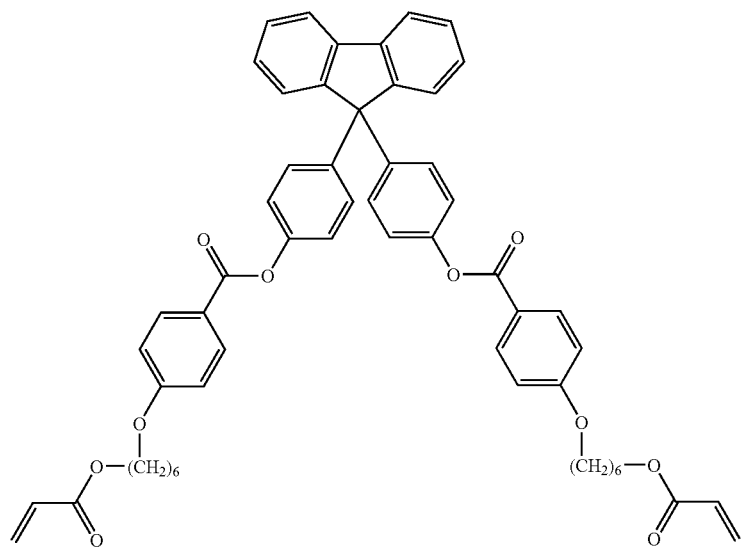
(1-1)
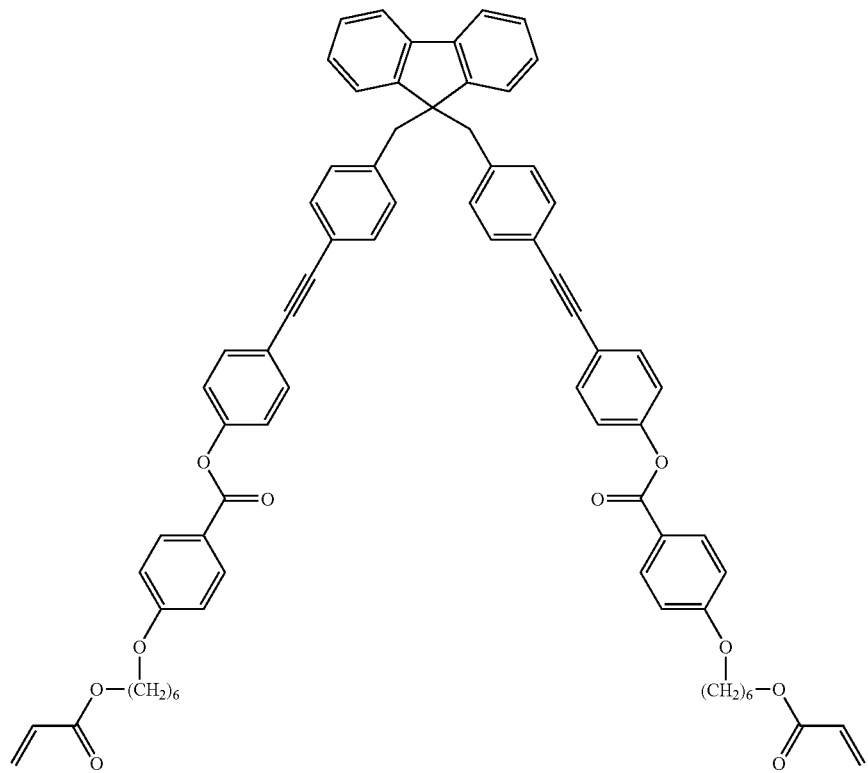
(1-2)

(1-3)
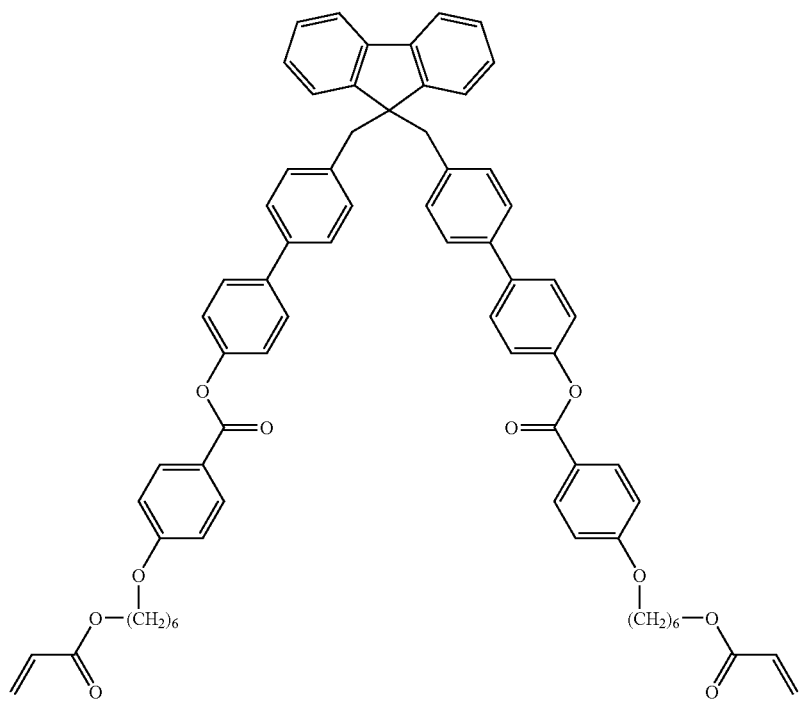
(1-5)
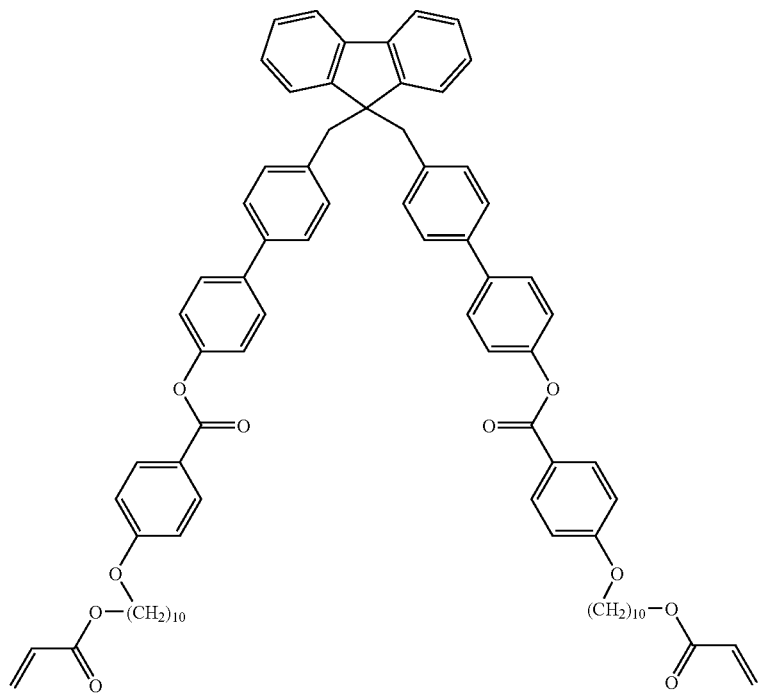

(1-4)
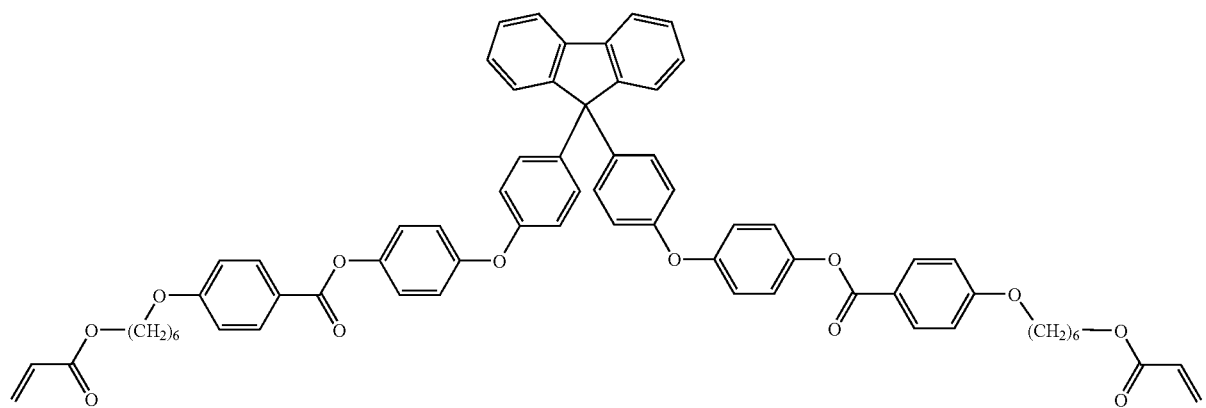
(1-45)
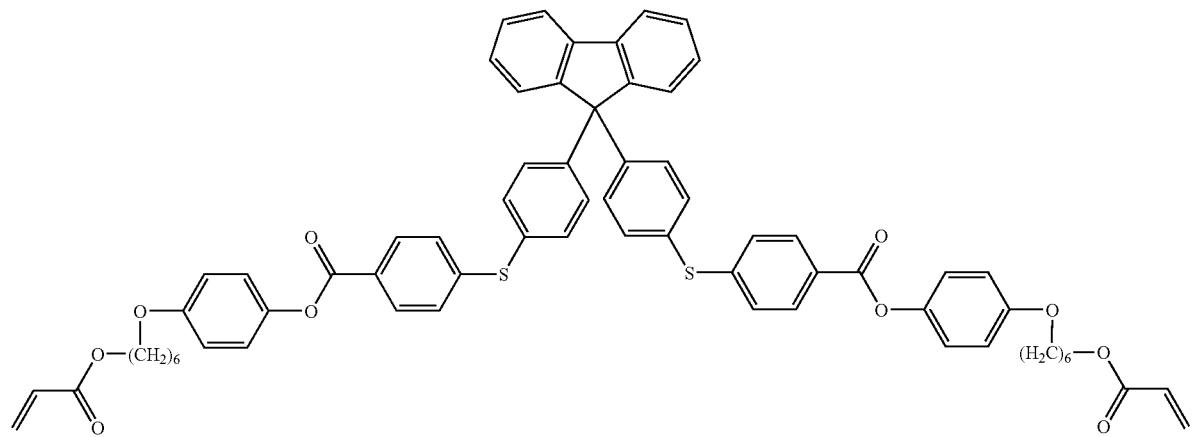
(1-50)
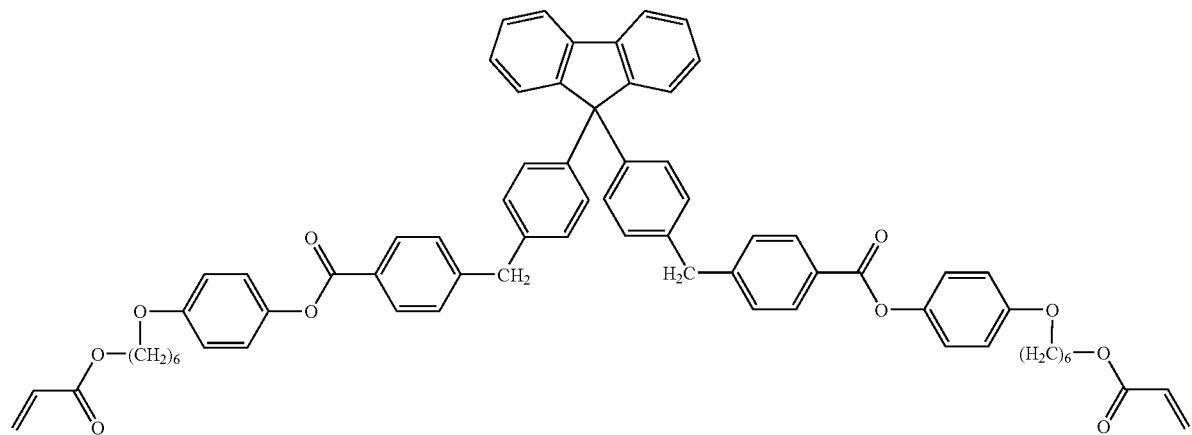

-continued

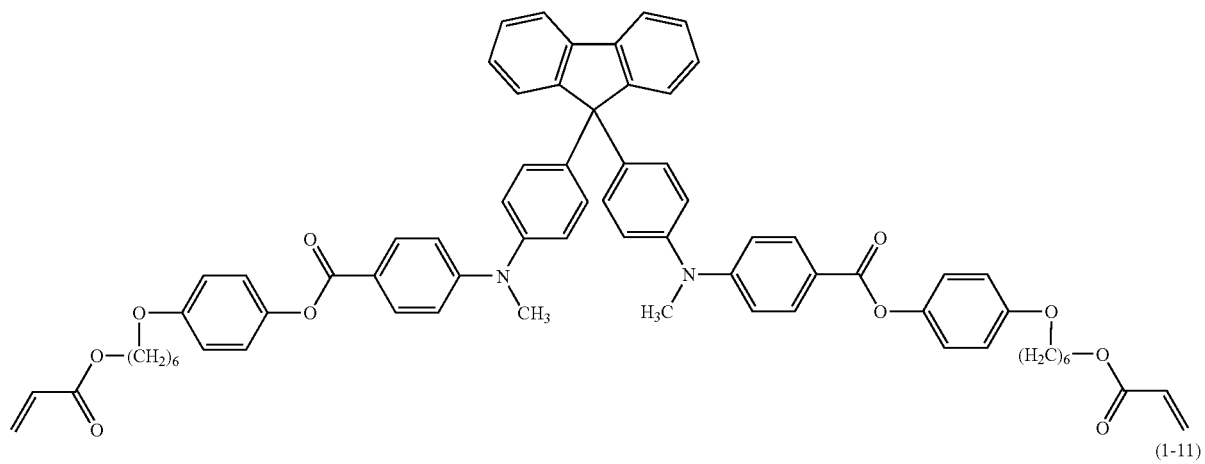

(1-49)

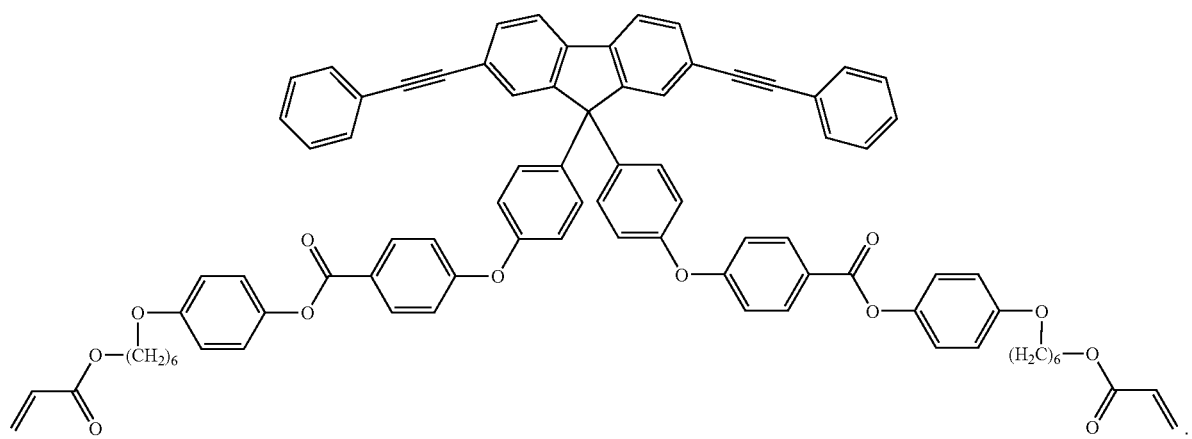

(1-11)

8. The composition according to claim 1 wherein the rod-shaped polymerizable liquid crystal compound is a compound of the formula (3), (4) or (5):

P1-E1-B1-A1-B2-A2-B4-A4-B5-E2-P2     (3)

P1-E1-B1-A1-B2-A2-F1     (4)

P1-E1-B1-A1-B2-A2-B3-F1     (5)

(wherein, E1, E2, B1, B2, B3, P1, P2, A1 and A2 represent the same meanings as described above, B4 and B5 represent the same meanings as for said B1, and A4 represents the same meaning as for said A1, F1 represents a linear or branched alkyl group having 1 to 5 carbon atoms, nitrile group, nitro group, trifluoromethyl group, halogen atom or hydrogen atom).

9. The composition according to claim 1 wherein the rod-shaped polymerizable liquid crystal compound is a compound of the formula (3-1) to (3-6), (4-1), (4-2), (5-1) or (5-2):

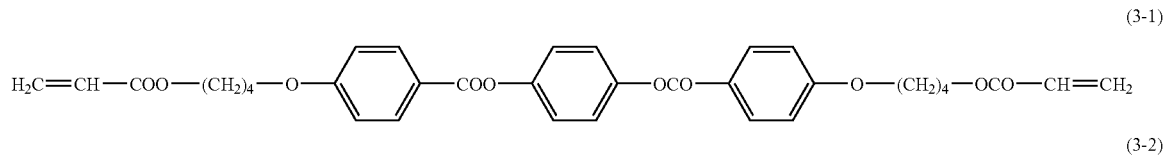

(3-1)

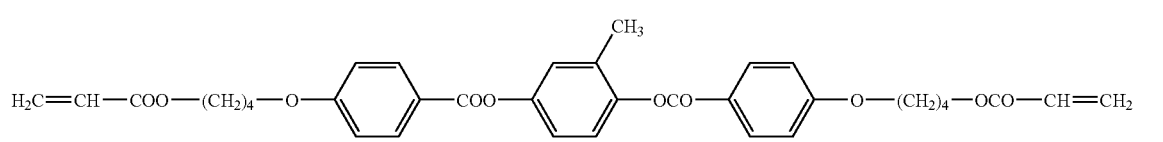

(3-2)

-continued (3-3)
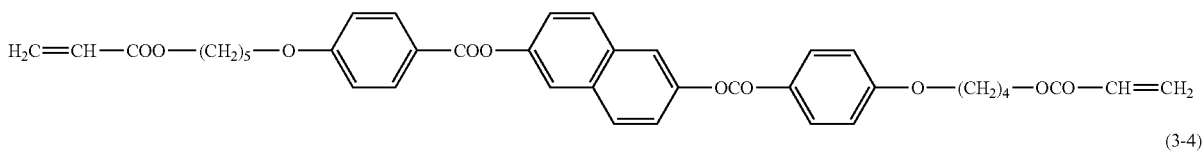

(3-4)
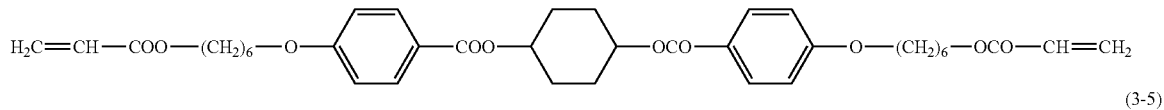

(3-5)
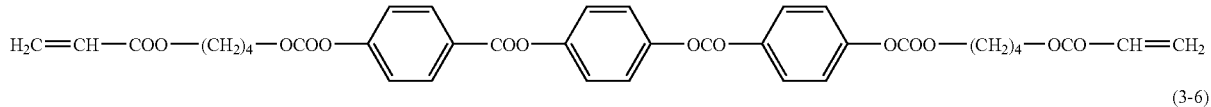

(3-6)
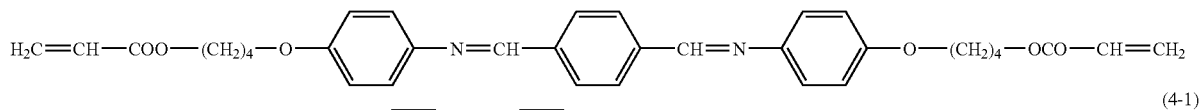

(4-1)
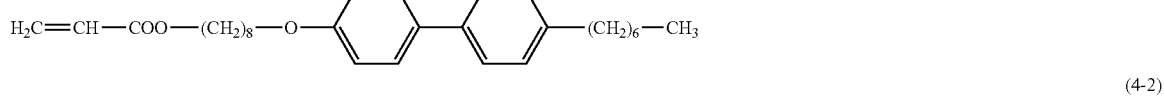

(4-2)
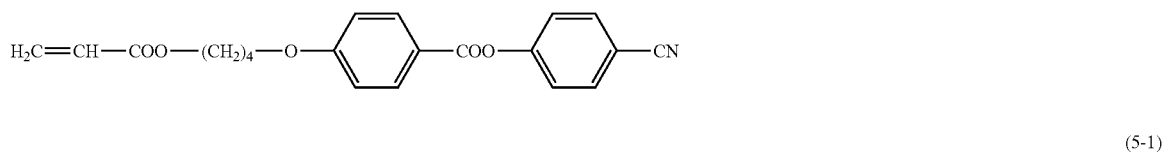

(5-1)
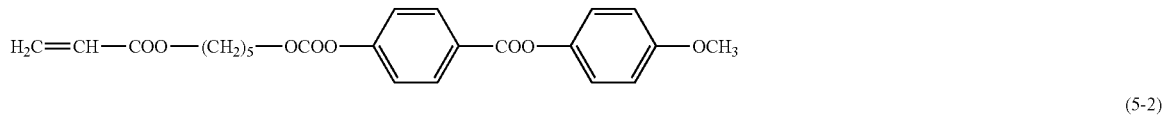

(5-2)
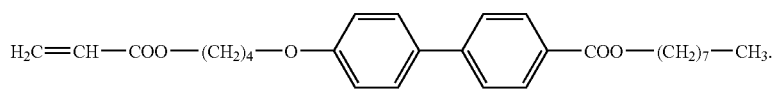

10. The composition according to claim 1 wherein the composition comprises the polymerizable compound (1) in an amount of 5 to 50 parts by weight based on 100 parts by weight of the total amount of the polymerizable compound (1) and the rod-shaped polymerizable liquid crystal compound.

11. An un-polymerized film manifesting birefringence obtained by using the composition according to claim 1.

12. An optical film obtained by using a polymer comprising a structural unit derived from the polymerizable compound of the formula (1) recited in claim 1 and a structural unit derived from the rod-shaped polymerizable liquid crystal compound.

13. The optical film according to claim 12 wherein the retardation value Re(λ) satisfies 0.65≦Re(450)/Re(550)≦1.0 and 1.0≦Re(650)/Re(550)≦1.2 (wherein, Re(λ) represents a retardation value at a wavelength of λ nm).

14. The optical film according to claim 12 or 13 showing reverse wavelength dispersion.

15. The optical film according to claim 12 wherein Re(550) is for a λ/4 plate of 113 to 163 nm.

16. The optical film according to claim 12 wherein Re(550) is for a λ/2 plate of 250 to 300 nm.

17. A flat panel display comprising the optical film according to claim 12.

18. A method for producing an optical film wherein a polymerizable compound of the formula (1) recited in claim 1, rod-shaped polymerizable liquid crystal compound and organic solvent are mixed to prepare a mixed solution, then, the solution is applied on a supporting substrate, dried and polymerized.

19. The method for producing an optical film according to claim 18 wherein the mixed solution further comprising a polymerization initiator is photo-polymerized.

20. The method for producing an optical film according to claim 18 or 19 wherein the mixed solution is applied on an alignment layer formed on the supporting substrate.

21. A method for producing a λ/4 plate wherein a polymerizable compound of the formula (1) recited in claim 1, rod-shaped polymerizable liquid crystal compound and organic solvent are mixed to prepare a solution which gives an optical film satisfying 0.65≦Re(450)/Re(550)≦1.0 and 1.0≦Re(650)/Re(550)≦1.2, and the solution is applied on an alignment layer to give membrane thickness at which Re(550) shows 113 to 163 nm, and dried and polymerized.

22. A method for producing a λ/2 plate wherein a polymerizable compound of the formula (1) recited in claim 1, rod-shaped polymerizable liquid crystal compound and organic solvent are mixed to prepare a solution which gives an optical film satisfying 0.65≦Re(450)/Re(550)≦1.0 and 1.0≦Re(650)/Re(550)≦1.2, then, the solution is applied on an alignment layer to give membrane thickness at which Re(550) shows 250 to 300 nm, and dried and polymerized.

23. A method for producing an un-polymerized film wherein a mixed solution comprising the composition according to claim 1 and an organic solvent is applied on an alignment layer, and the organic solvent is distilled off at 10 to 120 C.

24. A polymerizable compound of the formula (1):

P2-E2-X2-B2-A2-(G2)$_t$-Y-(G1)$_s$-A1-B1-X1-E1-P1 (1)

(in the formula (1), s and t represent each independently an integer of 0 or 1, G1 and G2 when s and t are 1 represent each independently —CR$^1$R$^2$—, R$^1$ and R$^2$ represent each independently an alkyl group having 1 to 4 carbon atoms, halogen atom or hydrogen atom, A1 and A2 represent each independently a di-valent cyclic hydrocarbon group, di-valent heterocyclic group, methylenephenylene group, oxyphenylene group or thiophenylene group, and to A1 and A2, an alkyl group having 1 to 5 carbon atoms, alkoxy group having 1 to 5 carbon atoms or halogen atom may be bonded, and B1 and B2 represent each independently a di-valent group selected from the group consisting of —CRR'—, —C≡C—, —CH═CH—, —CH$_2$—CH$_2$—, —O—, —S—, —C(═O)—, —C(═O)—O—, —O—C(═O)—, —O—C(═O)—O—, —C(═S)—, —C(═S)—O—, —O—C(═S)—, —O—C(═S)—O—, —CH═N—, —N═CH—, —N═N—, —N(→O)═N—, —N═N(→O)—, —C(═O)—NR—, —NR—C(═O)—, —OCH$_2$—, —NR—, —CH$_2$O—, —SCH$_2$—, —CH$_2$S—, —CH═CH—C(═O)—O—, —O—C(═O)—CH═CH—, and single bond, R and R' represent each independently a hydrogen atom or alkyl group having 1 to 5 carbon atoms, X1 and X2 represent each independently a di-valent group of the formula (2):

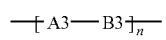
(2)

[in the formula (2), A3 represents a di-valent cyclic hydrocarbon group or heterocyclic group, B3 represents the same meaning as for said B1 and B2, and n represents an integer of 1 to 4]

Y represents a di-valent group of the formula (7):

(7)

[wherein, C1 represents a quaternary carbon atom or quaternary silicon atom, D1 and D2 represent each independently a cyclic hydrocarbon group, heterocyclic group or hydrocarbon group having 1 to 5 carbon atoms, D1 and D2 may be connected via a hydrocarbon group having 1 to 5 carbon atoms, amino group, ether group, thioether group, aminoalkyl group, carbonyl group or single bond, and to groups constituting D1 and D2, a hydroxyl group, amino group, thiol group, cyclic hydrocarbon group, alkyl group having 1 to 5 carbon atoms, alkoxy group having 1 to 5 carbon atoms, trifluoromethyl group, trifluoromethyloxy group, nitrile group, nitro group or halogen atom may be bonded], E1 and E2 represent each independently an alkylene group having 2 to 25 carbon atoms, and to E1 and E2, an alkyl group having 1 to 5 carbon atoms, alkoxy group having 1 to 5 carbon atoms or halogen atom may further be bonded, and P1 and P2 represent a hydrogen atom or polymerizable group, at least one of P1 and P2 being a polymerizable group).

25. The polymerizable compound according to claim 24 wherein, in the formula (1), s and t represent 0, and B1 and B2 represent —CRR'—, —O—, —S— or —NR— (wherein, R and R' represent the same meanings as described above).

26. The polymerizable compound according to claim 24 wherein, in the formula (1), (G1)s and (G2)t represent a methylene group, and B1 and B2 represent a single bond, —C≡C—, —O—C(═O)—O—, —O—C(═O)— or —O—C(═O)—O—.

27. The polymerizable compound according to any of claims 24 to 26 wherein Y in the formula (1) represents a di-valent group selected from the group consisting of the formulae (D-1) to (D-18):

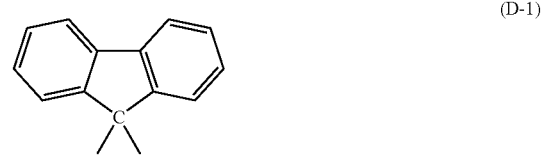
(D-1)

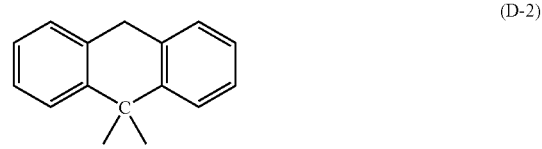
(D-2)

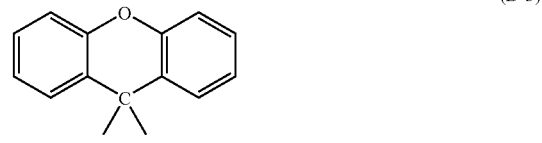
(D-3)

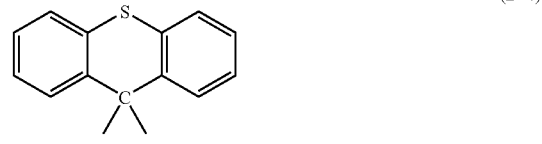
(D-4)

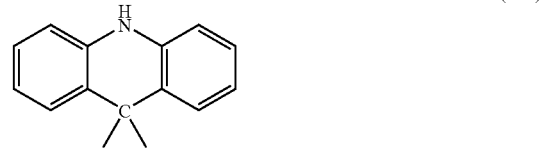
(D-5)

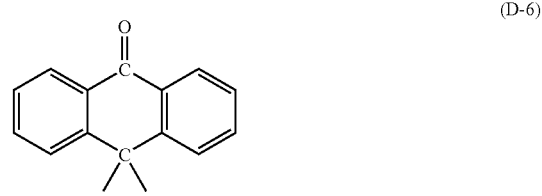
(D-6)

-continued
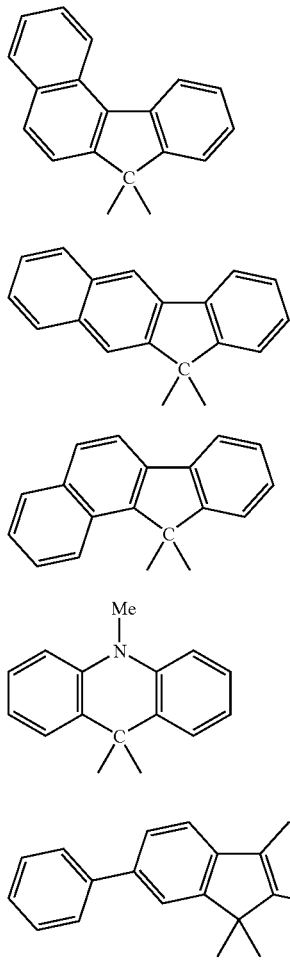
(D-7)
(D-8)
(D-9)
(D-10)
(D-11)
-continued
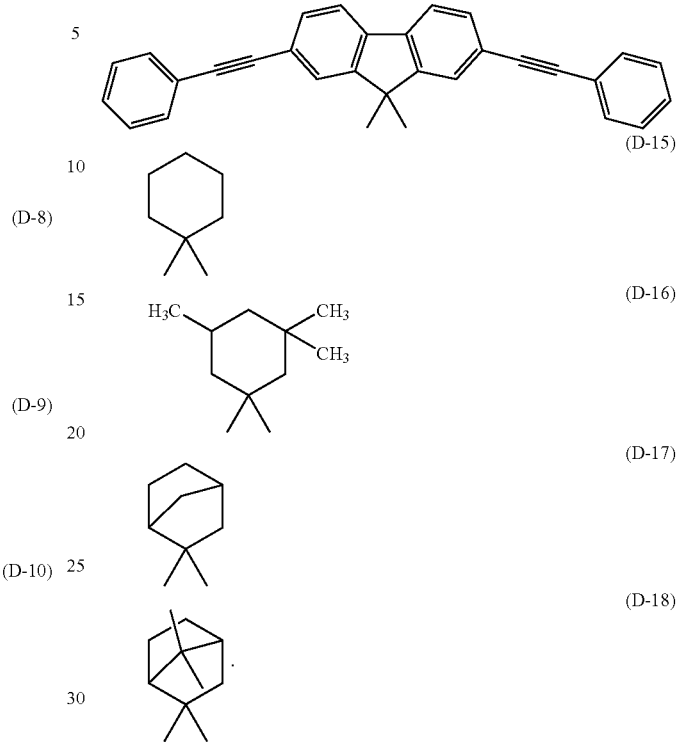
(D-12)
(D-15)
(D-16)
(D-17)
(D-18)
28. The polymerizable compound according to claim 24 wherein the polymerizable group in the formula (1) is an acryloyl group or methacryloyl group.
29. The polymerizable compound according to claim 24 wherein the polymerizable compound (1) is at least one compound selected from the group consisting of the following formulae:
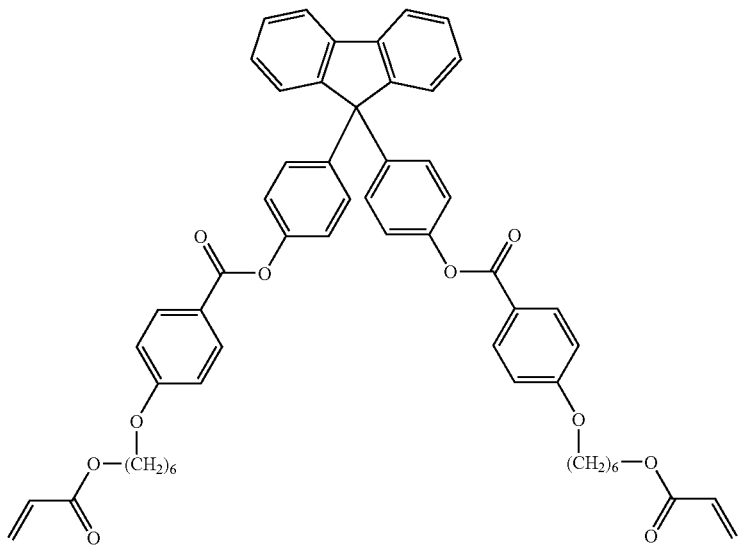
(1-1)

-continued
(1-2)
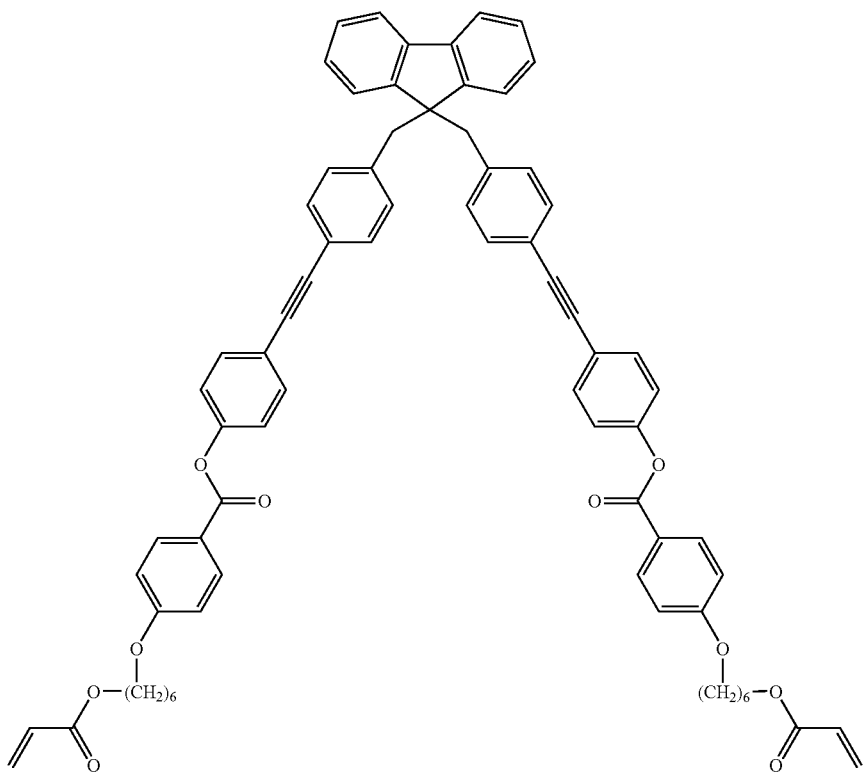
(1-3)
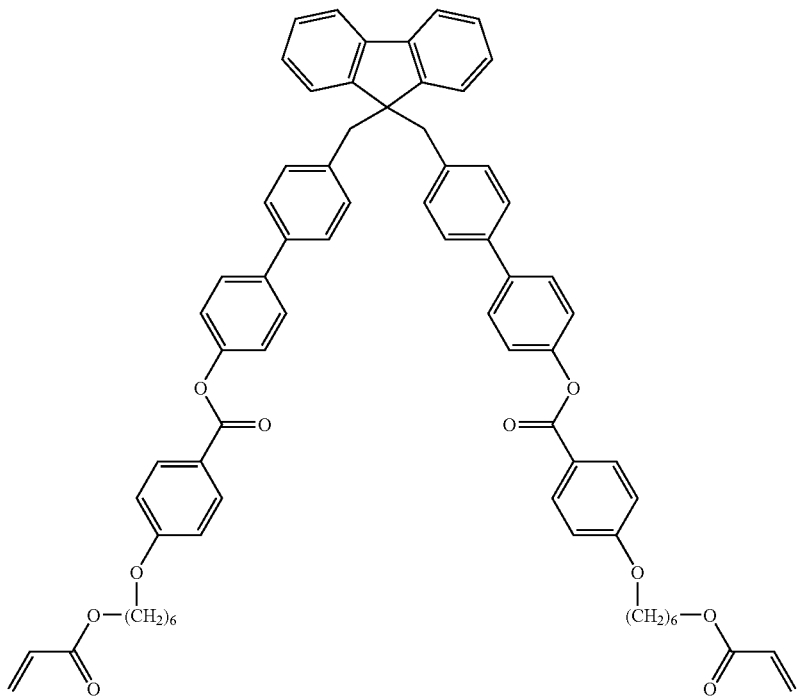

-continued
(1-5)
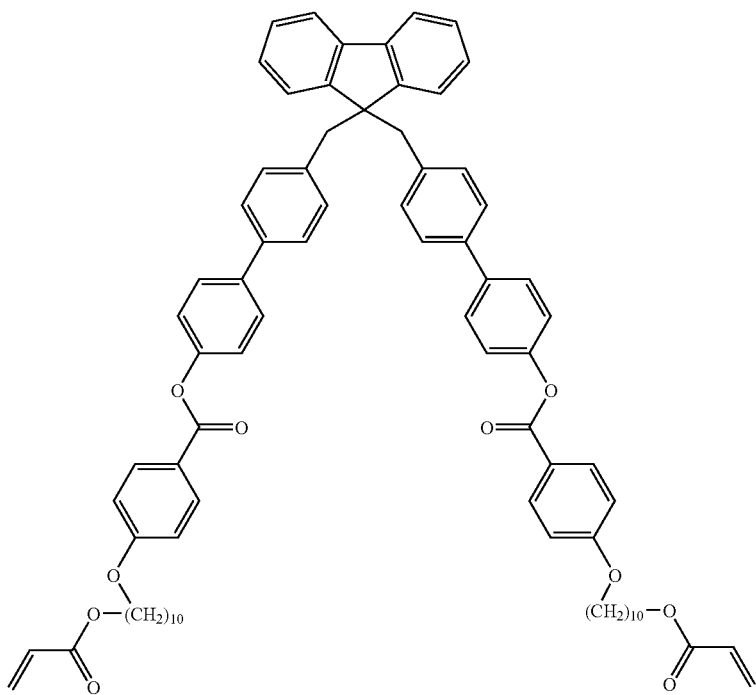
(1-4)
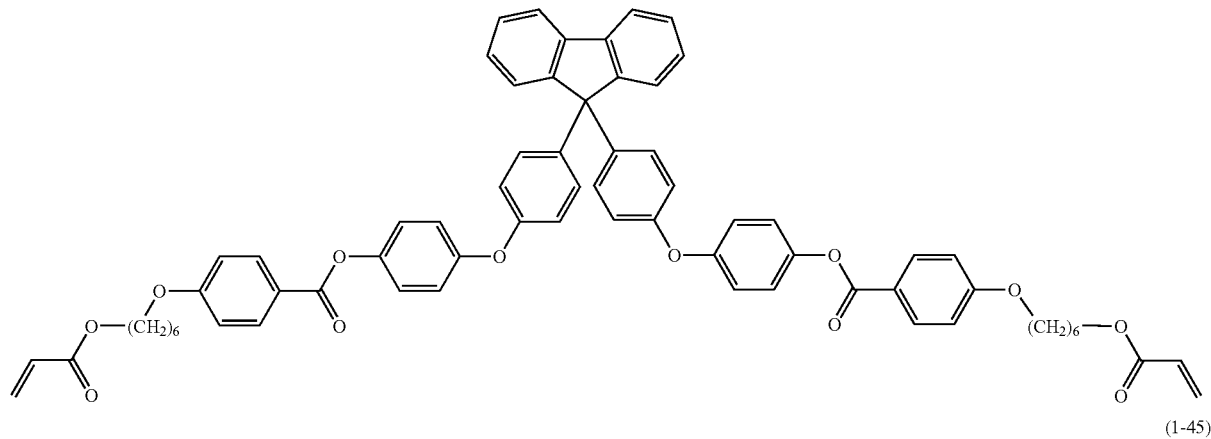
(1-45)
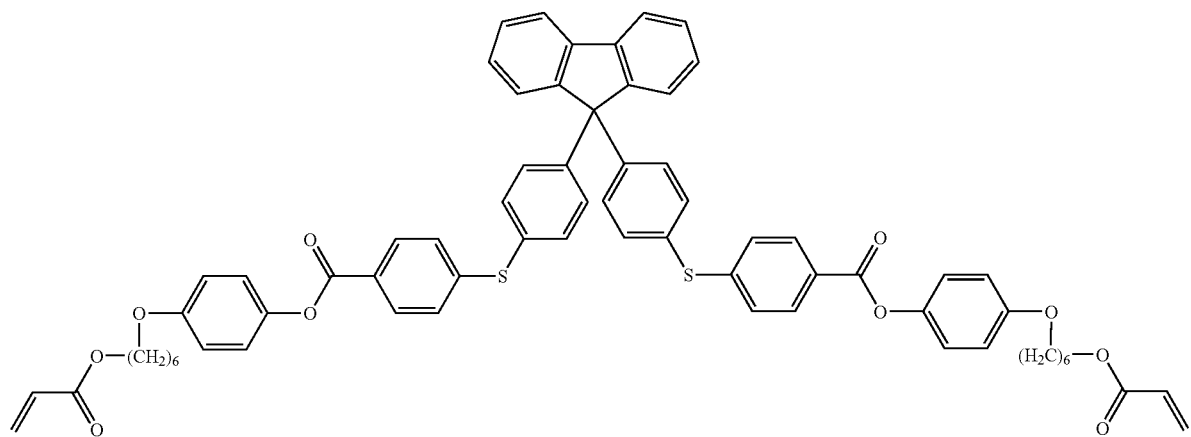

-continued
(1-50)
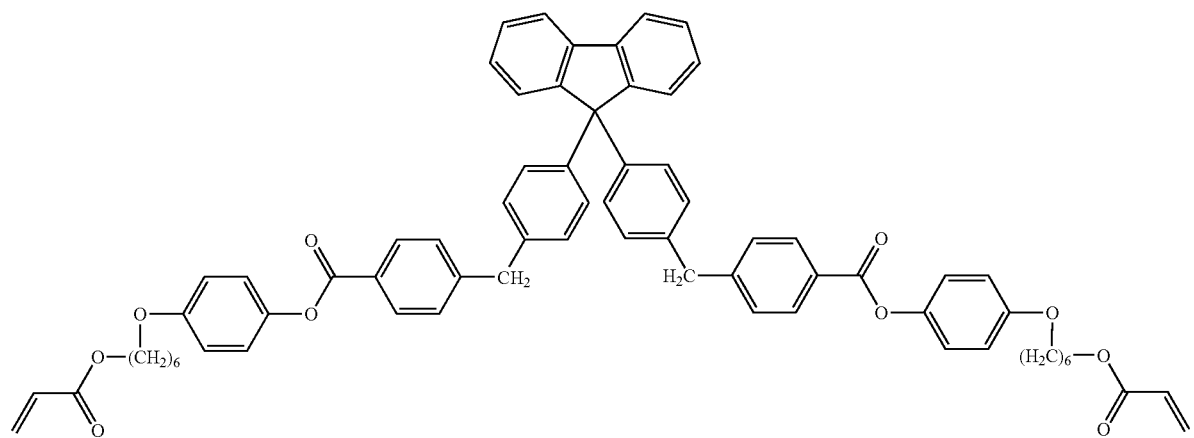
(1-49)
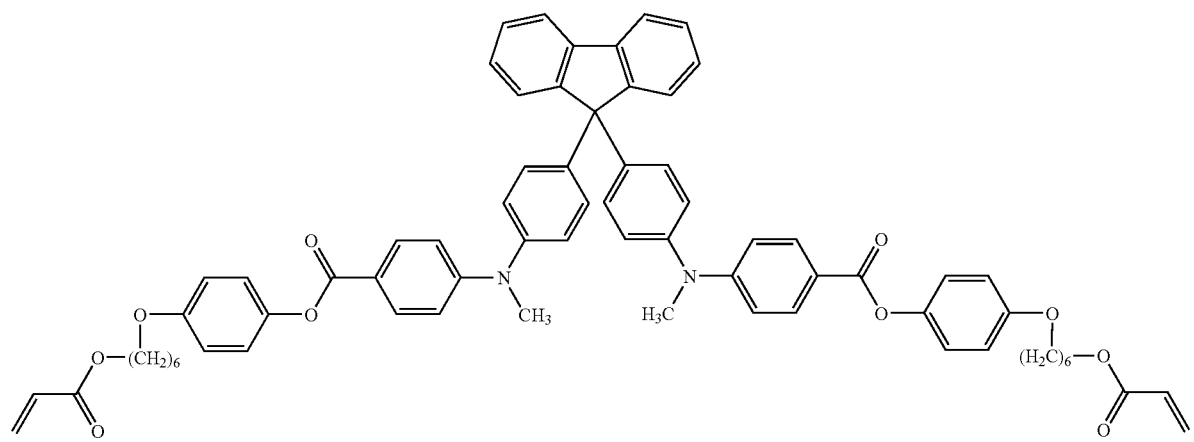
(1-11)
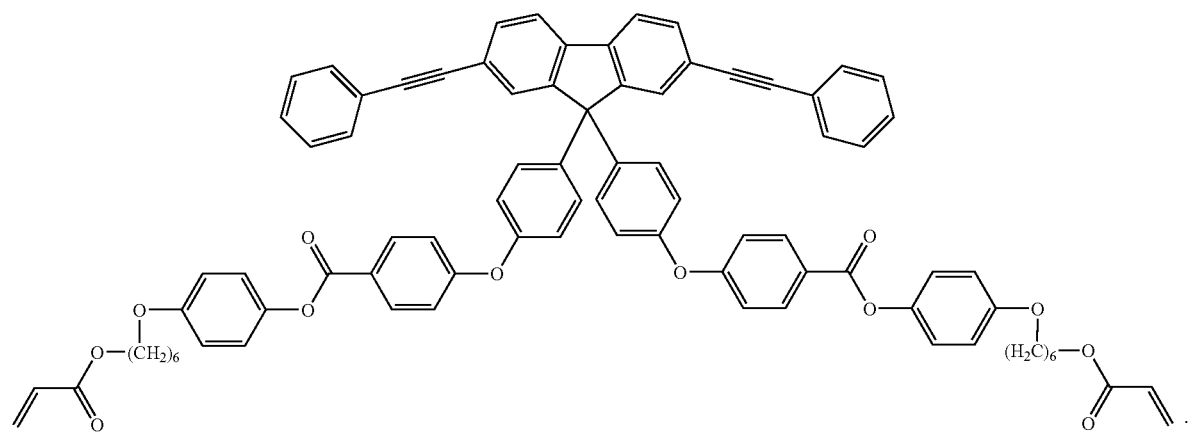

30. The composition according to claim 1, wherein the polymerizable compound (1) is a compound of the following formulae:
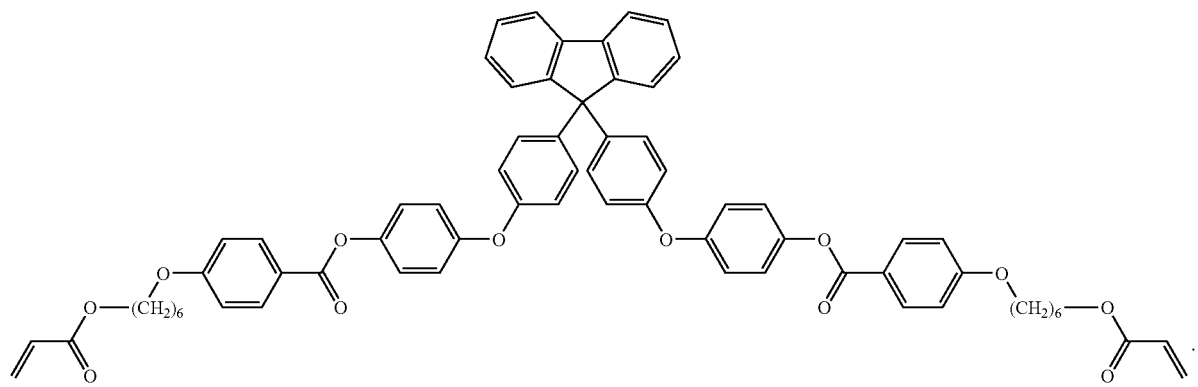
(1-4)
* * * * *